(12) United States Patent
Halcomb et al.

(10) Patent No.: US 12,552,145 B2
(45) Date of Patent: Feb. 17, 2026

(54) STARCH-BASED PADDED MATERIAL, PADDED MAILERS AND METHODS OF MAKING THE SAME

(71) Applicant: Georgia-Pacific Corrugated LLC, Atlanta, GA (US)

(72) Inventors: Andrew Geoffrey Halcomb, Johns Creek, GA (US); Gary Norman Boettcher, Juliette, GA (US); Anand Viswanath, Marietta, GA (US); Marc Gerald Zanghi, Atlanta, GA (US); Joseph Duncan, Nacogdoches, TX (US); Thomas Lucas, Goodyear, AZ (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 87 days.

(21) Appl. No.: 18/414,918

(22) Filed: Jan. 17, 2024

(65) Prior Publication Data
US 2024/0227374 A1     Jul. 11, 2024

Related U.S. Application Data

(63) Continuation-in-part of application No. 18/353,958, filed on Jul. 18, 2023.

(60) Provisional application No. 63/513,491, filed on Jul. 13, 2023, provisional application No. 63/389,953, filed on Jul. 18, 2022.

(51) Int. Cl.
*B32B 29/04*     (2006.01)
*B32B 5/16*     (2006.01)
*B32B 7/14*     (2006.01)
*B65D 81/03*     (2006.01)

(52) U.S. Cl.
CPC .............. *B32B 29/04* (2013.01); *B32B 5/16* (2013.01); *B32B 7/14* (2013.01); *B65D 81/03* (2013.01); *B32B 2307/72* (2013.01); *B32B 2439/46* (2013.01); *B32B 2553/02* (2013.01)

(58) Field of Classification Search
CPC ........ B32B 29/04; B65D 81/00; B65D 81/02; B65D 81/022; B65D 81/03
See application file for complete search history.

(56) References Cited

U.S. PATENT DOCUMENTS

2014/0117071 A1*   5/2014   Kannankeril .......... B65D 81/03
                                                                                                                        229/68.1

* cited by examiner

*Primary Examiner* — Zachary M Davis

(57) ABSTRACT

Padded materials and corresponding systems and methods for forming the same are provided herein. A padded material comprises a first web of paper-based material defining a first and a second surface, and a second web of paper-based material defining a first and a second surface. The padded material defines a plurality of consecutive panel sections formed of a first edge, a second edge, a first panel breakline and a second panel breakline. A first adhesive is positioned between corresponding portions of the first web and the second web. A starch-based padding is sandwiched between the first web and the second web with a second adhesive. The starch-based padding defines a non-uniform placement density along the first web between 15%-40%. The placement density is the ratio of area covered by the starch-based particles to the web area defined between the first edge, second edge, first panel breakline, and second panel breakline.

20 Claims, 34 Drawing Sheets

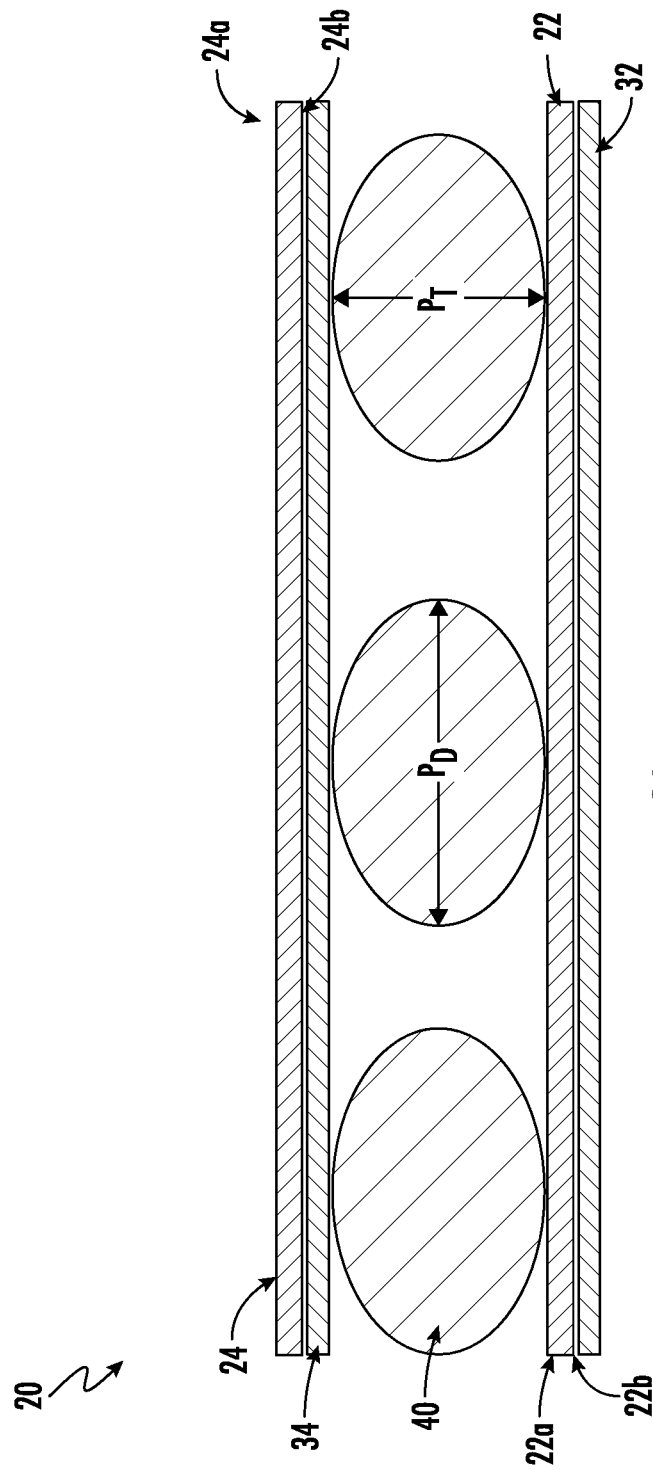

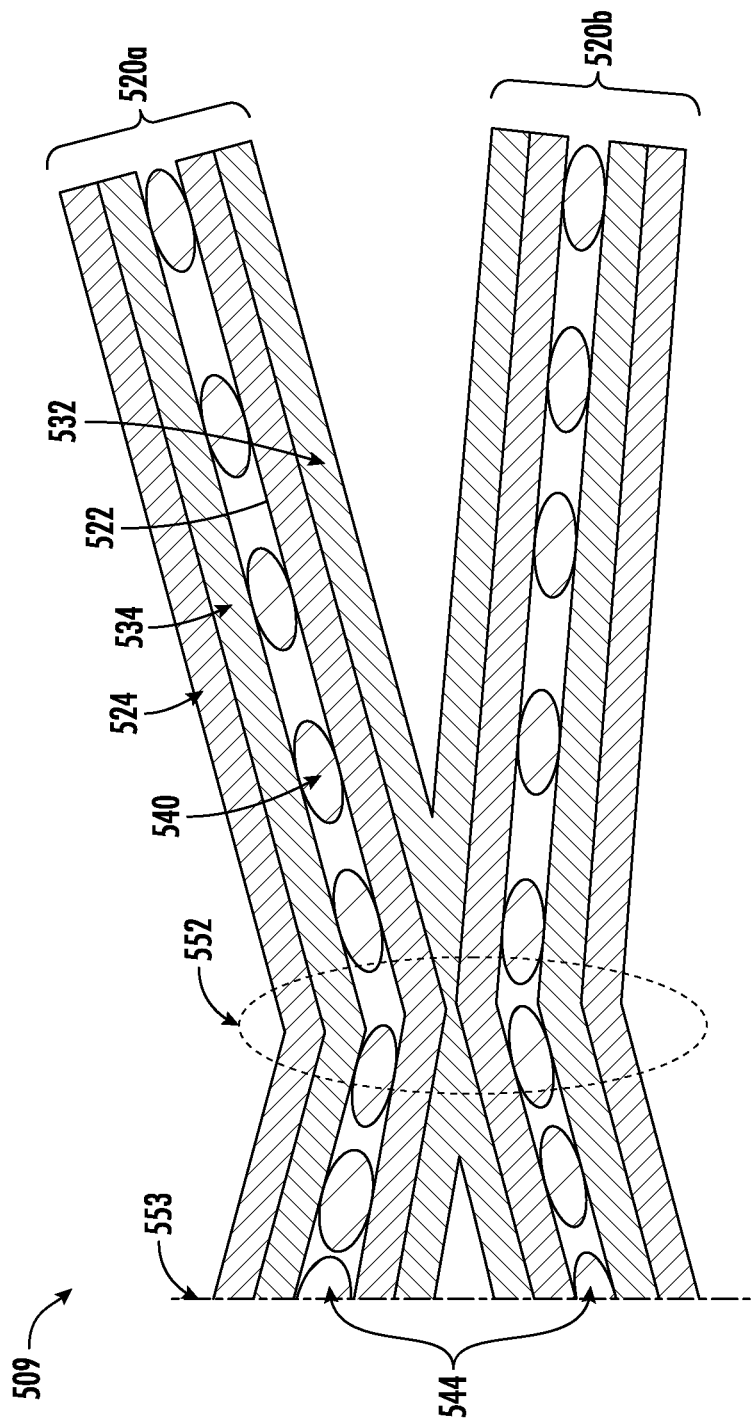

STARCH-BASED PADDED MATERIAL, PADDED MAILERS AND METHODS OF MAKING THE SAME

CROSS-REFERENCE TO RELATED APPLICATION(S)

This is a continuation-in-part application that claims priority to U.S. Nonprovisional application Ser. No. 18/353,958, entitled Starch-Based Padding For Roll Stock and Padded Mailers and Method of Making the Same", filed Jul. 18, 2023, which claims priority to U.S. Provisional Application No. 63/513,491, entitled "Starch-Based Padding for Roll Stock and Padded Mailers and Method of Making the Same", filed Jul. 13, 2023, and U.S. Provisional Application No. 63/389,953, entitled "Starch-Based Padding for Roll Stock and Padded Mailers", filed Jul. 18, 2022; the contents of each being hereby incorporated by reference in its entirety.

FIELD

Embodiments relate generally to starch-based padding, such as in roll stock form, and for padded mailers, along with methods and systems for making the same.

BACKGROUND

There is an increased demand for delivery of items, such as directly to an end user's home or office. Further, increased efficiency in the logistics of performing delivery has also driven up delivery capabilities. However, there is also a desire to provide for delivery in packaging that both prevents damage to the items being delivered and is environmentally friendly, such as for padded material and/or padded mailers.

Padded mailers are one such form of a packaging option. Some example padded mailers include two panels that attach on at least three sides to create a pocket for holding an item (e.g., document, blister pack, batteries, retail products, etc.). Some padded mailers can be formed around the item for shipping and delivery, such as using an automated mailer formation device. Other example padded mailers are formed with an open pocket (such as by attaching three sides and leaving the fourth side open). Once such a padded mailer is formed, the item can be placed inside and the fourth side can be sealed—often by folding over a flap on one of the panels and sealing it to the other panel. Additional features, such as tear strips or pull-strip adhesive can be provided on the padded mailer for ease of packaging and/or opening. Some padded mailers form the paneling or other portions from plastic or other material that is non-recyclable.

Padded mailers, notably, also include padding, such as within internal pouches in one or more of the panels to provide cushioning and protection for the item inside the pocket. Unfortunately, many padded mailers are formed using plastic for the padding, such as via air cells or other technology. Such plastic, as noted above, however is typically non-recyclable.

As such, there is a desire to form more easily recyclable padded material and/or padded mailers. Additionally, there is a desire for improvements in the formation of padded mailers, such as allowing for higher production speeds and utilization of less material.

BRIEF SUMMARY

Some embodiments of the present invention form a recyclable padded material, such as may be used to form a padded mailer. For example, the padded material may be formed into a roll for shipping and/or conversion to a desired product (such as a padding square, a padded mailer, etc.). In some embodiments, a starch-based padding is employed, where the starch-based padding has increased resilience over typical starch particles, but is also recyclable. The starch-based padding may be formed, such as via an extruder, and applied onto a web (e.g., paper-based web). A fluid, such as water, may be used to help adhere (or partially-adhere) the starch-based padding to the web. A second web may be brought into contact with the starch-based padding on the first web to form the padded material. Notably, the padded material may be curbside recyclable, biodegradable, and compostable.

In some embodiments, the starch-based padding may be configured as a plurality of starch-based particles. In some embodiments, the starch-based particles may be placed in a pattern on the first web. The specific pattern may create desired spacing between one or more starch-based particles. The specific pattern may provide beneficial properties, such as increased padding protection, reduced material usage, easier assembly or formation of products (e.g., a padded mailer), among other things.

In some embodiments, the starch-based particles may be transferred from an extruder to the first web using an apparatus. The apparatus may comprise at least a hopper and a vacuum-based placement devices, such as a wheel, belt, or other device. The hopper may store the starch-based particles after formation, and prior to adhesion, while, for example, the vacuum wheel may engage the starch-based particles, for example, via vacuum suction, to transfer the starch-based particles from the hopper to the first web.

In some embodiments, the starch-based padding may be crushed to further increase the desired padding effect (e.g., resilience) and reduce thickness of the final laminate. The crushing may occur simultaneously or near simultaneously with application of the starch-based padding onto the first web. Additionally or alternatively, the crushing may occur after the second web has been brought in contact with the starch-based padding and the first web.

In some embodiments, the padded material may be formed in a variety of ways. For example, two webs of the padded material may be brought together to form the padded mailer (e.g., with various mailer features). Such a padded mailer may be hand packed with an item, for example. Thereafter, various features of the padded mailer may be formed thereon.

In an example embodiment, a padded material for use in forming a padded mailer is provided. The padded material comprises a first web of paper-based material defining a first surface and a second surface opposite the first surface. The first web defines a first plurality of consecutive panel sections formed of a first edge and a second edge opposite the first edge and a first panel breakline and a second panel breakline opposite the first panel breakline. The padded material further comprises a second web of paper-based material defining a first surface and a second surface opposite the first surface. The second web defines a first plurality of consecutive panel sections formed of a first edge and a second edge opposite the first edge and a first panel breakline and a second panel breakline opposite the first panel breakline. The padded material further comprises a first adhesive portion positioned at least between the first edge of the first web and the first edge of the second web forming a first seam, a second adhesive portion positioned at least between the second edge of the first web and the second edge of the second web forming a second seam, a third adhesive portion positioned at least between the first breakline of the first web and the first breakline of the second web forming a third seam, and a fourth adhesive portion positioned at least between the second breakline of the first web and the second breakline of the second web forming a fourth seam. The first adhesive portion, the second adhesive portion, the third adhesive portion, and the fourth adhesive portion comprise a first adhesive. The padded material further comprises a starch-based padding sandwiched between the first web and the second web. The starch-based padding is adhered to at least one of the first web or the second web with a second adhesive. The starch-based padding defines a placement density on the first web. The placement density is defined by a ratio of an area covered by the starch-based padding and a total web area. The total web area extends between the first edge, the second edge, and the first panel breakline and the second panel breakline. The placement density is between 15%-40% and is not uniform across the first web.

In some embodiments, the placement density may be between 20%-25%. In some embodiments, the starch-based padding may be positioned away from one or more of the first seam, the second seam, the third seam, and the fourth seam. In some embodiments, the starch-based padding may be positioned at least 1 inch away from each of the first edge, the second edge, the first panel breakline, and the second panel breakline.

In some embodiments, the placement density may define a first pattern. The first pattern may comprise a plurality of rows, wherein the starch-based particles in adjacent rows of the plurality of rows are staggered. In some embodiments, the first pattern may be positioned on the first web from a vacuum wheel. The vacuum wheel may define a plurality of openings arranged in the first pattern. In some embodiments, the vacuum wheel may comprise more than one patterned section. Each of the more than one patterned sections may be separated by a pattern break which does not comprise openings.

In some embodiments, the plurality of rows may comprise at least a first row comprising a first particle and a second particle, and a second row comprising a third particle. The first row and the second row may be spaced apart between the first edge and the second edge, and the third particle may be positioned between the first particle and the second particle in the second row.

In some embodiments, the first pattern may define a gap centered between the first panel breakline and the second panel breakline. The gap may define a first half and a second half of the starch-based particles. In some embodiments, the gap may be at least 0.25 inches in width. In some embodiments, the first pattern may comprise a first shift within the first half and a second shift within the second half. Each of the first shift and the second shift may define a first column and a second column within the respective half. In some embodiments, the first shift and the second shift may be smaller than the gap. In some embodiments, the first column and the second column may have a different number of starch-based particles.

In some embodiments, the second adhesive may be one of water, a water-based adhesive, or glue.

In another example embodiment, a mailer is provided. The mailer comprises a first panel defining a top edge, a bottom edge, and two opposing side edges. The first panel is formed from a padded material. The padded material comprises, a first web of paper-based material defining a first surface and a second surface opposite the first surface. The first web defines a first plurality of consecutive panel sections formed of a first edge and a second edge opposite the first edge and a first panel breakline and a second panel breakline opposite the first panel breakline. The padded material further comprises a second web of paper-based material defining a first surface and a second surface opposite the first surface. The second web defines a first plurality of consecutive panel sections formed of a first edge and a second edge opposite the first edge and a first panel breakline and a second panel breakline opposite the first panel breakline. The padded material further comprises a first adhesive portion positioned at least between the first edge of the first web and the first edge of the second web forming a first seam, a second adhesive portion positioned at least between the second edge of the first web and the second edge of the second web forming a second seam, a third adhesive portion positioned at least between the first breakline of the first web and the first breakline of the second web forming a third seam, and a fourth adhesive portion positioned at least between the second breakline of the first web and the second breakline of the second web forming a fourth seam. The first adhesive portion, the second adhesive portion, the third adhesive portion, and the fourth adhesive portion comprise a first adhesive. The padded material further comprises a starch-based padding sandwiched between the first web and the second web. The starch-based padding is adhered to at least one of the first web or the second web with a second adhesive. The starch-based padding defines a placement density on the first web. The placement density is defined by a ratio of an area covered by the starch-based padding and a total web area. The total web area extends between the first edge, the second edge, and the first panel breakline and the second panel breakline. The placement density is between 15%-40% and is not uniform across the first web. The first panel is folded such that a first juncture is formed between the first side edge and the second side edge, a second juncture is formed between a first portion of the top edge and a second portion of the top edge, and a third juncture is formed between a first portion of the bottom edge and a second portion of the bottom edge to define a pocket therebetween. The mailer further comprises a seam adhesive positioned along at least two of the first juncture, the second juncture, and the third juncture.

In some embodiments, the placement density may be between 15%-40%. In some embodiments, the starch-based padding may be positioned away from one or more of the first scam, the second scam, the third scam, and the fourth seam. In some embodiments, the starch-based padding may be positioned at least 1 inch away from each of the first edge, the second edge, the first panel breakline and the second panel breakline. In some embodiments, the starch-based padding may define a gap between the first panel breakline and the second panel breakline.

In yet another example embodiment, a mailer is provided. The mailer comprises a first panel defining a top edge, a bottom edge, and two opposing side edges. The first panel is formed from a padded material. The padded material comprises, a first web of paper-based material defining a first surface and a second surface opposite the first surface. The first web defines a first plurality of consecutive panel sections formed of a first edge and a second edge opposite the first edge and a first panel breakline and a second panel breakline opposite the first panel breakline. The padded material further comprises a second web of paper-based material defining a first surface and a second surface opposite the first surface. The second web defines a first plurality of consecutive panel sections formed of a first edge and a second edge opposite the first edge and a first panel breakline and a second panel breakline opposite the first panel breakline. The padded material further comprises a first adhesive portion positioned at least between the first edge of the first web and the first edge of the second web forming a first scam, a second adhesive portion positioned at least between the second edge of the first web and the second edge of the second web forming a second scam, a third adhesive portion positioned at least between the first breakline of the first web and the first breakline of the second web forming a third seam, and a fourth adhesive portion positioned at least between the second breakline of the first web and the second breakline of the second web forming a fourth scam. The first adhesive portion, the second adhesive portion, the third adhesive portion, and the fourth adhesive portion comprise a first adhesive. The padded material further comprises a starch-based padding sandwiched between the first web and the second web. The starch-based padding is adhered to at least one of the first web or the second web with a second adhesive. The starch-based padding defines a placement density on the first web. The placement density is defined by a ratio of an area covered by the starch-based padding and a total web area. The total web area extends between the first edge, the second edge, and the first panel breakline and the second panel breakline. The placement density is between 15%-40% and is not uniform across the first web. The mailer further comprises a second panel, formed of the padded material defining a top edge, a bottom edge and two opposing sides. The second panel is attached to the first panel with an adhesive at the bottom edge, the first side edge and the second side edge to define a pocket therebetween.

In yet another example embodiment a system for positioning starch-based padding on a paper-based material web for use in a padded packaging material is provided. The system comprises a hopper for receiving a plurality of starch-based particles, and an infeed attached to an upper portion of the hopper. The infeed supplies the hopper with the plurality of starch-based particles. The system further comprises a vacuum wheel extending along a width of the hopper. The vacuum wheel is configured to rotate in a first direction to transfer the plurality of starch-based particles from the hopper to a first web of paper-based material. The system further comprises an acceleration device. The acceleration device is positioned within the hopper such that the acceleration device spans the width of the hopper. The acceleration device is configured to rotate in a second direction, opposite the first direction. The rotation of the acceleration device causes the plurality of starch-based particles to accelerate so as to travel at a particle rotational speed that matches a vacuum wheel rotational speed for engagement of the plurality of starch-based particles with the vacuum wheel.

In some embodiments, the vacuum wheel may comprise a plurality of openings arranged in a first pattern defining a placement density of the starch-based particles. In some embodiments, the placement density may cover between 15%-40% of a surface of the first web of the paper-based material. In some embodiments, the first pattern may define a gap within the plurality of openings. In some embodiments, the first pattern may define a seam allowance about the circumference of the vacuum wheel. The seam allowance may define an edge of the padded packaging material. In some embodiments, the vacuum wheel may be configured to move at least 400 feet per minute. In some embodiments, the vacuum wheel may provide a vacuum force for at least 90% of a period of time corresponding to a full cycle.

In some embodiments, the hopper may comprise a plurality of openings in an upper portion. The plurality of openings may provide air flow through and around the starch-based particles. In some embodiments, the system may further comprise an air source configured to provide air to one side of the plurality of openings in the upper portion. The air source may cause distribution of the plurality of starch-based particles along the acceleration device. In some embodiments, the hopper may comprise a shelf which separates the plurality of starch-based particles from the air flow. In some embodiments, the acceleration device may be a brush.

In some embodiments, the system may further comprise a level control device configured to rotate in the second direction. The rotation of the level control device may cause the plurality of starch-based particles to distribute along the width of the hopper. In some embodiments, the level control device may comprise a plurality of fins, each of the plurality of fins may extend along the width of the hopper. In some embodiments, the level control device may comprise a plurality of bristles positioned on an end of each of the plurality of fins.

In some embodiments, the vacuum wheel may comprise a plurality of openings each supplied with vacuum suctions. The vacuum suction may secure each of the plurality of starch-based particles in a corresponding each of the plurality of openings during rotation from the hopper to the first web.

In some embodiments, the system may further comprise an air knife positioned vertically above the vacuum wheel. The air knife may be configured to expel air towards the vacuum wheel and the hopper.

In some embodiments, the vacuum wheel may comprise registration marks. In some embodiments, the first web of paper-based material may comprise registration marks. The registration marks of the first web of paper-based materials may correspond to the placement of the vacuum wheel registration marks, such that a rotation speed of the vacuum wheel matches a speed of the first web of paper-based material.

In yet another example embodiment, a system for forming a padded material is provided. The system comprises a conveyor for supplying and moving a first web of paper-based material. The system further comprises an adhesive source and applicator for applying an adhesive material onto the paper-based material. The system further comprises a hopper for receiving a plurality of starch-based particles, and an infeed attached to an upper portion of the hopper. The infeed supplies the hopper with the plurality of starch-based particles. The system further comprises a vacuum wheel extending along a width of the hopper. The vacuum wheel is configured to rotate in a first direction to transfer the plurality of starch-based particles from the hopper to a first web of paper-based material. The system further comprises an acceleration device. The acceleration device is positioned within the hopper such that the acceleration device spans the width of the hopper. The acceleration device is configured to rotate in a second direction, opposite the first direction. The rotation of the acceleration device causes the plurality of starch-based particles to accelerate so as to travel at a particle rotational speed that matches a vacuum wheel rotational speed for engagement of the plurality of starch-based particles with the vacuum wheel. The system further comprises a second conveyor for supplying and moving a second web of paper-based material and positioning the second web of paper-based material onto the plurality of starch-based particles positioned on the first web of paper-based material.

In yet another example embodiment a system for forming a padded material is provided. The system comprises a conveyor for supplying and moving a first web of paper-based material. The system further comprises an adhesive source and applicator for applying an adhesive material onto the paper-based material. The system further comprises a hopper for receiving a plurality of starch-based particles, and an infeed attached to an upper portion of the hopper. The infeed supplies the hopper with the plurality of starch-based particles. The system further comprises an air supply configured to provide air flow through the upper portion of the hopper such that the air flow distributes the plurality of starch-based particles along a width of the hopper. The system further comprises a vacuum wheel extending along the width of the hopper. The vacuum wheel is configured to rotate in a first direction to transfer the plurality of starch-based particles from the hopper to a first web of paper-based material. The system further comprises an acceleration device. The acceleration device is positioned within the hopper such that the acceleration device spans the width of the hopper. The acceleration device is configured to rotate in a second direction, opposite the first direction. The rotation of the acceleration device causes the plurality of starch-based particles to accelerate so as to travel at a particle rotational speed that matches a vacuum wheel rotational speed for engagement of the plurality of starch-based particles with the vacuum wheel. The system further comprises a second conveyor for supplying and moving a second web of paper-based material and positioning the second web of paper-based material onto the plurality of starch-based particles positioned on the first web of paper-based material.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A illustrates an example cross-section of the padded material shown in FIG. 1, in accordance with some embodiments discussed herein;

FIG. 10B illustrates a cross-sectional view of a portion of the example padded mailer of FIG. 10A taken within circle B, in accordance with some embodiments discussed herein;

DETAILED DESCRIPTION

Figure 1:
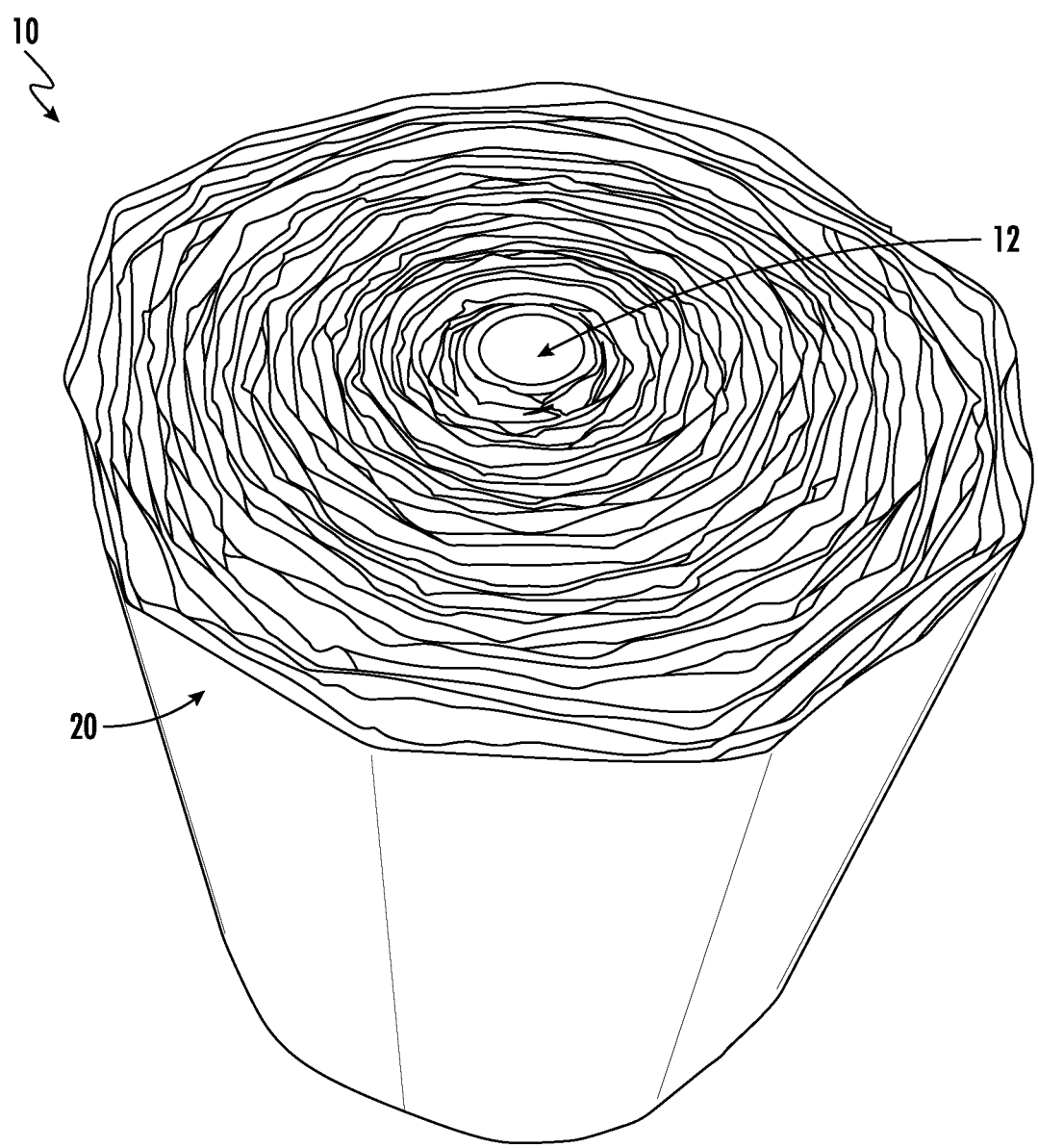
FIG. 1 shows an example roll of padded material, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

FIG. 1 shows an example roll 10 of padded material 20. The padded material 20, such as formed according to various embodiments described herein, is rolled about a center spool 12. As detailed herein, the roll of padded material 20 may be easily shipped and/or transported and converted into various products, such as padding, padded mailers, etc.

FIG. 2A illustrates a schematic view of a cross-section of the padded material 20. Notably, the padded material is formed of a first web 22 and a second web 24 with padding (such as starch-based particles 40) positioned therebetween. In some embodiments, other padded material may be used in addition to or in alternative to the starch-based particles 40, for example, a starch-based sheet shown in FIG. 7A.

Each of the first web 22 and the second web 24 define a first surface 22a, 24a and a second surface 22b, 24b opposite the first surface 22a, 24a, respectively. In regards to the first web 22, in some embodiments, the first surface 22a may be inward facing (e.g., towards the starch-based particles 40), and the second surface 22b may be outward facing. In contrast, in regards, to the second web 24, the first surface 24a may be outward facing, while the second surface 24b may be inward facing (e.g., towards the starch-based particles 40).

In the illustrated embodiment, a first layer of heat seal coating 32 is applied to the second surface 22b of the first web 22 and a second layer of heat seal coating 34 is applied to the second surface 24b of the second web 24. In some embodiments, the first layer of heat seal coating 32 may face a corresponding second surface of a second first web 22 of another padded material such that the first layers of heat seal coating 32 would be adjacent and may be utilized to adhere or otherwise connect the two padded material layers (see e.g., 552 of FIG. 10B and the corresponding description). In some embodiments, the second heat seal coating layer 34 may interact with the starch-based particles 40, and in some embodiments form a heat seal between the second heat seal coating layer 34 and the starch-based particles 40, and/or between the second heat seal coating layer 34 and the first surface 22a of the first web 22 (e.g., if the padded material 20 is cut and sealed within an automated mailer formation device, such as described herein).

In some embodiments, the heat seal coating (e.g., the first layer of heat seal coating 32 and/or the second layer of heat seal coating 34) may be suitable for recycling in a paper recovery/paper recycling system. In some embodiments, the heat seal coating may be applied to cover between 1%-100% of the surface of the first web or the second web. In some embodiments, the heat seal coating may be applied to cover between 95%-100% of the surface of the first web or second web, such as along the second surface 22b of the first web 22 for use in an automated packaging machine that may apply a cut and/or seal action anywhere along the length of the padded material.

In some embodiments, the heat seal coating may be applied to cover between 1%-25% of the surface of the first web and/or the second web, with the coverage area being localized to specific regions of the web where the machine direction and cross direction seals are to be formed for converting equipment that has control over location of heat seals. In this regard, in some embodiments, the positioning of the heat seal coating may be specific to reduce usage thereof. For example, the heat seal coating may be applied at predetermined intervals, such as every 2 in., every 6 in., etc.

In some embodiments, the heat seal coating comprises thermoplastic coatings or adhesives that enable sealing of various surfaces when a combination of heat and pressure is applied. In some embodiments, the heat seal coating may have a recyclable formulation, which may include one or more of: PVOH, PVAc, VAE, styrene acrylate, and/or thermoplastic starches. In some embodiments, the heat seal coating includes an anti-blocking agent either in the coating formulation or as a separate coating layer, such as wax.

In some embodiments, the heat seal coating may be added to the second web 24 on the second surface 24b facing the starch-based particles. That heat seal coating may cover, for example, 80%-100% of the surface.

Figure 2B:
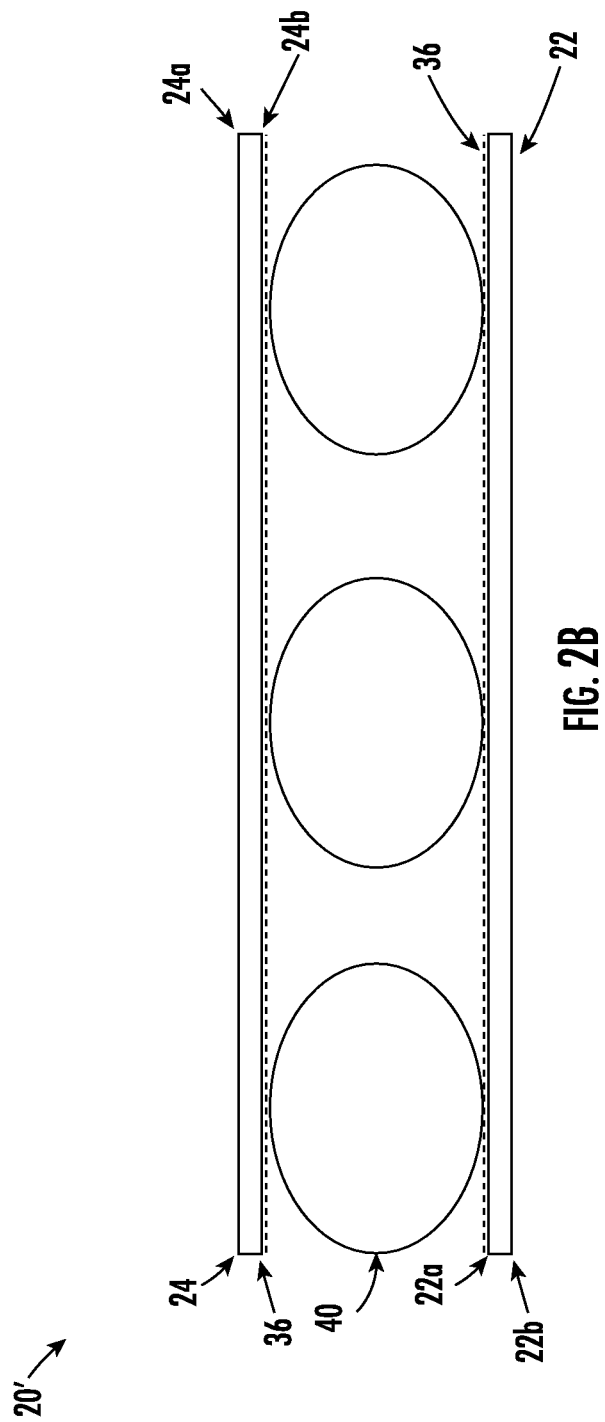
FIG. 2B illustrates an example cross-section of the padded material shown in FIG. 1, in accordance with some embodiments discussed herein.

FIG. 2B illustrates a schematic view of a cross-section of an alternative padded material 20' for use in premade padded mailers, or other prefabricated padded materials. Notably, the padded material 20' is formed with an adhesive 36 positioned on the first surface 22a of the first web 22 and/or the second surface 24b of the second web 24 in place of the heat seal coating. The adhesive 36 may be used to secure the starch-based particles 40 between the first web 22 and the second web 24. In some embodiments, other padded material may be used in addition to or in alternative to the starch-based particles 40, for example, a starch-based sheet shown in FIG. 7A.

In some embodiments, the adhesive 36 may be a water-based adhesive, a solvent-based adhesive, glue or similar. In other embodiments the adhesive 36 may be water.

In some embodiments, the first web 22 and/or second web 24 may be formed of a fiber-based material, such as: kraft paper, extensible kraft paper, fiberboard, or recycled fiberboard. The fiber, for example, may comprise wood fiber, bagasse, and/or bamboo. Notably, in some embodiments, the first and/or second web may be formed of other material. In some embodiments, the first and/or second web may be recyclable.

In some embodiments, the internal padding (e.g., shown as starch-based particles 40 in FIG. 2) may be a foam material. The foam material may be produced using one or more extruder steps to compound and expand starch-based formulations. Example starch-based formulations include starch at 60%-99.5% of the total infeed mixture by dry mass; a plasticizer (e.g., preferably biodegradable, and more preferably compostable) such as PVOH, glycerol, ethylene glycol, sorbitol, urea, PVAc, PBS, PBAT, PLA, or Lignin at 0.5%-40% of the total infeed mixture by dry mass; a nucleating agent such as talc, precipitated calcium carbonate (PCC) or Sodium Bicarbonate at 0.01%-2% of the total infeed mixture by dry mass; an optional foaming aid such as Sodium Bicarbonate at 0.01%-2% of the total infeed mixture by dry mass; and/or a color modifier such as a dye or Lignin, preferably Kraft Lignin.

In some embodiments, the foam material may be produced using an aqueous starch-based formulation that is expanded by heating via one or more of: radio frequency (RF), microwave, infrared (IR), and hot air convection. Such example starch-based formulations may include starch at 20%-60% of the total infeed mixture by wet mixture; a water-soluble plasticizer such as PVOH, PVAc, or glycerol at 0.5%-30% of the total infeed mixture by wet mixture; a foaming aid such as Sodium Bicarbonate or Lauramine Oxide at 0.01%-5% of the total infeed mixture by wet mixture; a structural filler such as cellulose pulp or wood pulp at 0.1-50% by wet mixture; and/or a color modifier such as a dye or Lignin. As will be discussed herein, color dyes such as lignin, may cause the starch-based padding to appear close in color to the first web and second web, thereby being visually more uniform, as there may be no distinction between the starch-based padding and the first and second webs. Notably, in some embodiments, water could be used instead of Sodium Bicarbonate or Lauramine Oxide as a foaming aid, such as via conversion to steam. In some embodiments, the foaming aid or a blowing agent can include water/moisture content that converts to steam, such as in a high temperature extrusion process, to create the foam material. In some embodiments, no foaming aid may be utilized.

In some embodiments, the foam may be compressed after expansion to a reduced thickness compared to the initial expanded thickness in order to improve the conformability of the material construction and resilience of the material construction to repeated impacts by removing initial plastic compression behavior. To explain, the initial foam structure experiences a relatively large ratio of plastic deformation to elastic deformation from the first impact compared to subsequent impacts. Said differently, when a foam undergoes an impact or a crushing force, the first application of force causes the foam to reduce in thickness, thereby increasing the density, as the air within the foam may be dispelled. However, when the foam undergoes subsequent impacts, the change in the density decreases with each impact. Thus, between the original form and the second impact there may be a large change in density of the foam, and a large change in thickness of the foam. These changes cause the padding characteristics to change, which may be undesirable in a package where constant padding characteristics are desired. Thus, utilizing a precrush provides a "locked-in" desired density and thickness of the starch-based foam, thereby providing the desired density, and resilience of the padded material for use in packaging.

The compression may be performed by applying pressure in the range 1-200 psi, preferably in the range of 5-30 psi. For example, one or more crush devices may apply pressure to the starch-based padding (e.g., particles, sheet form, etc.) in conjunction with or after being applied on the first web 22. In some embodiments, the starch-based padding has an initial density before compression of between 0.5 lbs/ft$^3$-2.0 lbs/ft$^3$, preferably 0.75 lbs/ft$^3$-1.5 lbs/ft$^3$, and most preferably between 0.75 lbs/ft$^3$-1.0 lbs/ft$^3$, and a final density after compression between 1.25 lbs/ft$^3$-2.75 lbs/ft$^3$, preferably between 1.5 lbs/ft$^3$-2.5 lbs/ft$^3$ and more preferably between 1.5 lbs/ft$^3$-2.25 lbs/ft$^3$ In some embodiments, other density ranges may be utilized, however, the present range provides maximum cushioning while minimizing the overall weight of the padded material, thereby keeping similar shipping costs, when compared to a conventional padding material.

In some embodiments, the starch-based padding may be formed as a plurality of starch-based particles 40, as illustrated in FIG. 2. In some embodiments, prior to compression the starch-based particles 40 may be spherical, while after compression the starch-based particles 40 may be more oblong. The starch-based particles 40 may define a particle diameter $P_D$ between about 0.15 in-0.45 in, preferably between about 0.2 in-0.40 in, and most preferably between about 0.25 in-0.35 in. In some embodiments, the starch-based particles 40 may define a particle thickness $P_T$ between about 0.05 in-0.30 in, preferably between about 0.10 in-0.25 in, and most preferably between about 0.15 in-0.20 in. In some embodiments, the particle thickness $P_T$ may be measured after the compression.

As will be discussed further herein, in some embodiments, the starch-based padding may be adhered to the first web and/or second web using a recyclable adhesive/fluid (e.g., 36 FIG. 2B), such as: a starch-based adhesive, PVAc, PVOH, guar gum, xanthan gum, arabic gum or water. In some embodiments, the recyclable adhesive or water may moisten the first surface 22a of the first web 22 prior to contact with the starch-based padding. Upon contact with the moistened first surface 22a of the first web 22, the portion of the starch-based padding may become tacky and thereby adhere to the first surface 22a of the first web 22. Similarly, the second layer of heat seal coating 34 (or the second surface 24b of the second web 24) may be moistened with either the recyclable adhesive or water prior to application onto the starch-based padding (e.g., a plurality of starch-based particles 40). Upon contact with the moistened second heat seal coating layer 34 the starch-based padding become tacky and adheres to the second layer of heat seal coating 34. However, the second layer of heat seal coating 34 may be cured prior to moistening with the recyclable adhesive or water. In this regard, the moisture from either the recyclable adhesive or the water will not reactivate the heat seal coating or cause the heat seal coating to break down. Thus, in such example embodiments, the starch-based padding is adhered to the second layer of heat seal coating 34 and second surface 22b of the first web 22.

In some embodiments, a moisture barrier coating for improving water resistance of the finished products (such as padded mailers) may be added. The moisture barrier coating, for example, may be added to the first web 22 (e.g., on the first surface 22a or the second surface 22b) and/or the second web 24 (e.g., on the first surface 24a or the second surface 24b). In some embodiments, the moisture barrier coating may be applied to cover between 80-100% of the surface of either the first web and/or the second web. The moisture barrier coating may have a formulation comprising, for example: paraffinic wax emulsion, PVOH, VAE emulsion, sterylated melamine, acrylic, and/or latex.

In some embodiments, the moisture barrier coating may be combined with the adhesive and/or heat seal coating to provide both functions in one coating layer.

In some embodiments, a moisture vapor barrier coating may be used for improving the humidity resistance of the finished products (such as padded mailers). The moisture vapor barrier coating may have a formulation comprising an acrylate.

In some embodiments, one or more of the first web 22 or the second web 24 may be printed on. The print may be applied either before or after any heat seal coating and/or water resistance coatings are applied. Such printing may correspond with downstream usage of the padded material. For example, a company name or logo may be printed on one of the webs.

Depending on the desired characteristics of the padded material, different thicknesses of the padded material may be obtained. For example, the combined thickness of the padding with the first web and the second web may be in the range of 0.05 in-0.5 in, preferably in the range of 0.125 in-0.275 in, and most preferably in the range of 0.15 in-0.2 in.

In some embodiments, the combined structure of padding, first web, and second web may have a width dimension and a length dimension which is perpendicular to the width dimension. The width dimension may be significantly smaller than the length dimension; for example, a width dimension may be in the range of 15 in-40 in and a length dimension may be in the range of 100 ft-1,500 ft.

In some embodiments, the starch-based padding (e.g., the starch-based particles) may be placed in a pattern on the first web. The specific pattern may create desired spacing between one or more starch-based particles. The specific pattern may provide beneficial properties, such as increased padding protection, reduced material usage, easier assembly or formation of products (e.g., a padded mailer), among other things.

Figure 3:
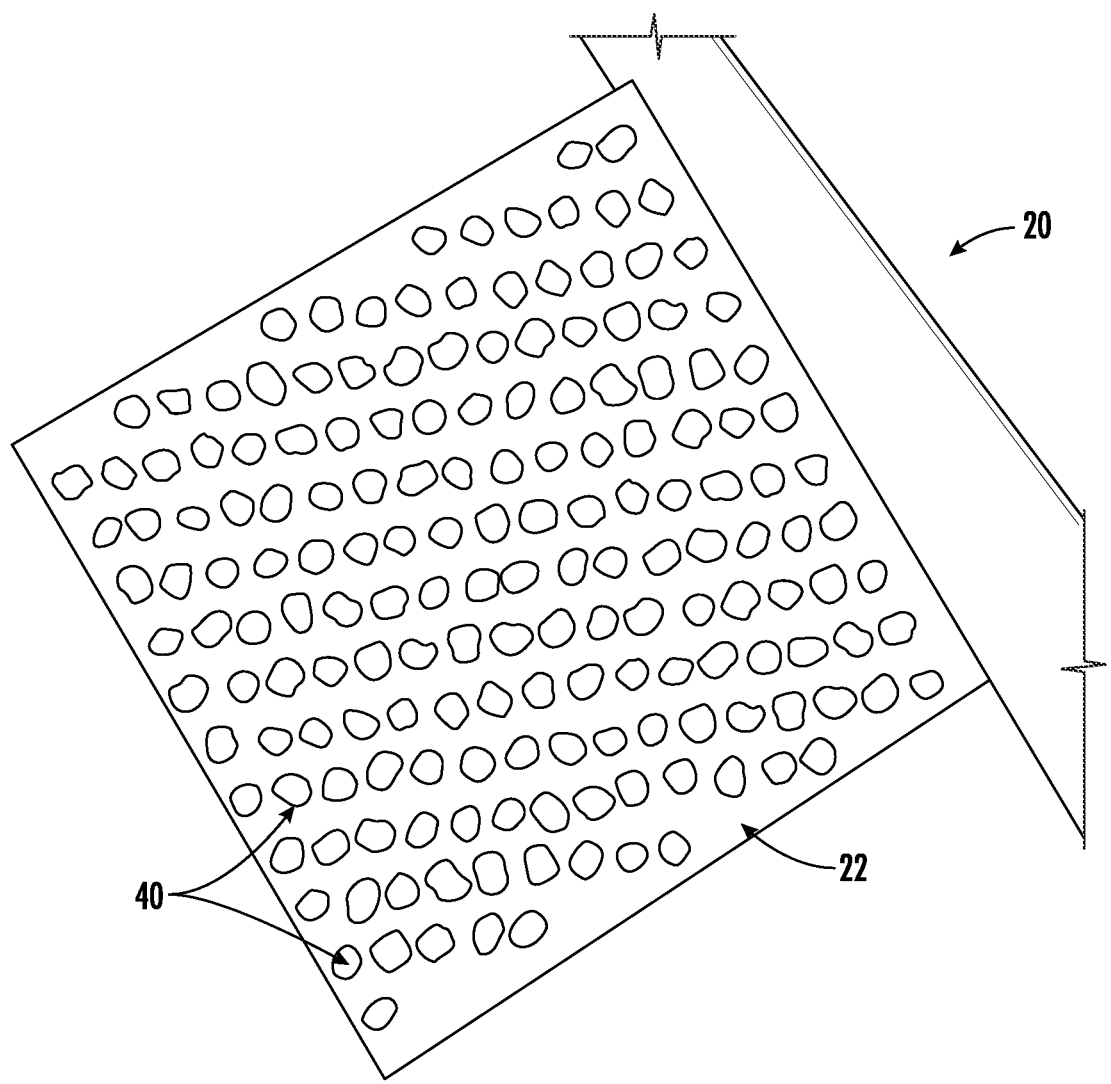
FIG. 3 shows a portion of the roll of padded material shown in FIG. 1 with a top web removed to show starch-based particles positioned on the bottom web, in accordance with some embodiments discussed herein.

FIG. 3 shows a portion of the roll of padded material shown in FIG. 1 with the second web removed to show the placement density of the starch-based particles 40 positioned on the first web 22. In some embodiments, the starch-based particles 40 may cover between 10%-60% of the first web 22, preferably between 20%-40% of the first web 22, and more preferably the starch-based particles 40 may cover about 25% of the first web 22. In some embodiments, different coverage may be required depending on the composition and density of the starch-based particles 40, such as between 25%-50% coverage. In this regard, in some embodiments, when the starch-based particles are more resilient (e.g., measured as the amount of degradation of the starch-based particles from subsequent impacts), less particles may be needed to achieve the desired cushioning properties. In contrast, for starch-based particles exhibiting low resiliency a higher number of starch-based particles may be needed to cover a larger area of the first web to achieve the desired cushioning properties.

Cushioning performance testing was performed on 5 different example coverage ratios of starch-based particles to air gaps, with each otherwise using the same starch-based particular formulation, the same pattern, the same thickness (e.g., within a range of 0.15 in to 0.3 in), and the same density (e.g., within a range of 0.8 lbs/ft$^3$-2.0 lbs/ft$^3$). The 5 different example padded material with different coverage ratios including padded material with (A) 50% starch-based particle coverage, (B) 40% starch-based particle coverage, (C) 30% starch-based particle coverage, (D) 25% starch-based particle coverage, and (E) 15% starch-based particle coverage.

Five consecutive impacts of the same amount of force were applied to each example padded material and the peak acceleration, measured as g (the standard acceleration due to Earth's gravity, equivalent to g-force), was measured for each impact. The impacts that were applied to the samples were delivered by a drop tower purpose built for testing cushion materials. The drop tower is fitted with a velocity gate for measuring impact velocity and accelerometers for measuring the acceleration at impact. The drop tower can reproducibly drop a flat platen with adjustable mass and drop height onto the samples in question. The platen is guided by two rails so that it is oriented properly at impact. Due to the nature of free fall, and some small frictional losses on the guide rails, the velocity of each impact is not exactly the same but they are very close (e.g., within +/−1 in/s). The impacts that were applied to the samples in question involved dropping a 12.8 lbs (5.81 kg) platen from an effective freefall drop height of 5 in (0.127 m), resulting in an impact velocity of 62 in/s (1.57 m/s). The energy of such an impact can be calculated as 7.2 Joules. Table 1 below illustrates the results of the consecutive impact testing on each example padded material.

TABLE 1

| SAMPLE | IMPACT 1 | IMPACT 2 | IMPACT 3 | IMPACT 4 | IMPACT 5 |
|---|---|---|---|---|---|
| (A) 50% coverage | 136.8 | 156.5 | 165.3 | 172.2 | 181.3 |
| (B) 40% coverage | 134.9 | 162.5 | 182.6 | 192.8 | 208.3 |
| (C) 30% coverage | 162.8 | 199.9 | 236.7 | 258.1 | 272.0 |
| (D) 25% coverage | 191.7 | 250.1 | 313.4 | 361.6 | 412.8 |
| (E) 15% coverage | 298.6 | 525.0 | 699.4 | 789.3 | 908.2 |

With reference to results shown in Table 1, sample (E) formed of 15% starch-based particle coverage performed the worst, where impacts 2-5 yielded undesirable peak acceleration measurements above 500 g. However, even sample (D) at only 25% starch-based particle coverage maintained good peak acceleration measurements below 500 g even during a 5$^{th}$ impact. Such testing illustrated desirable cushioning was achieved with 25%-50% starch-based particle coverage.

Figure 4A:
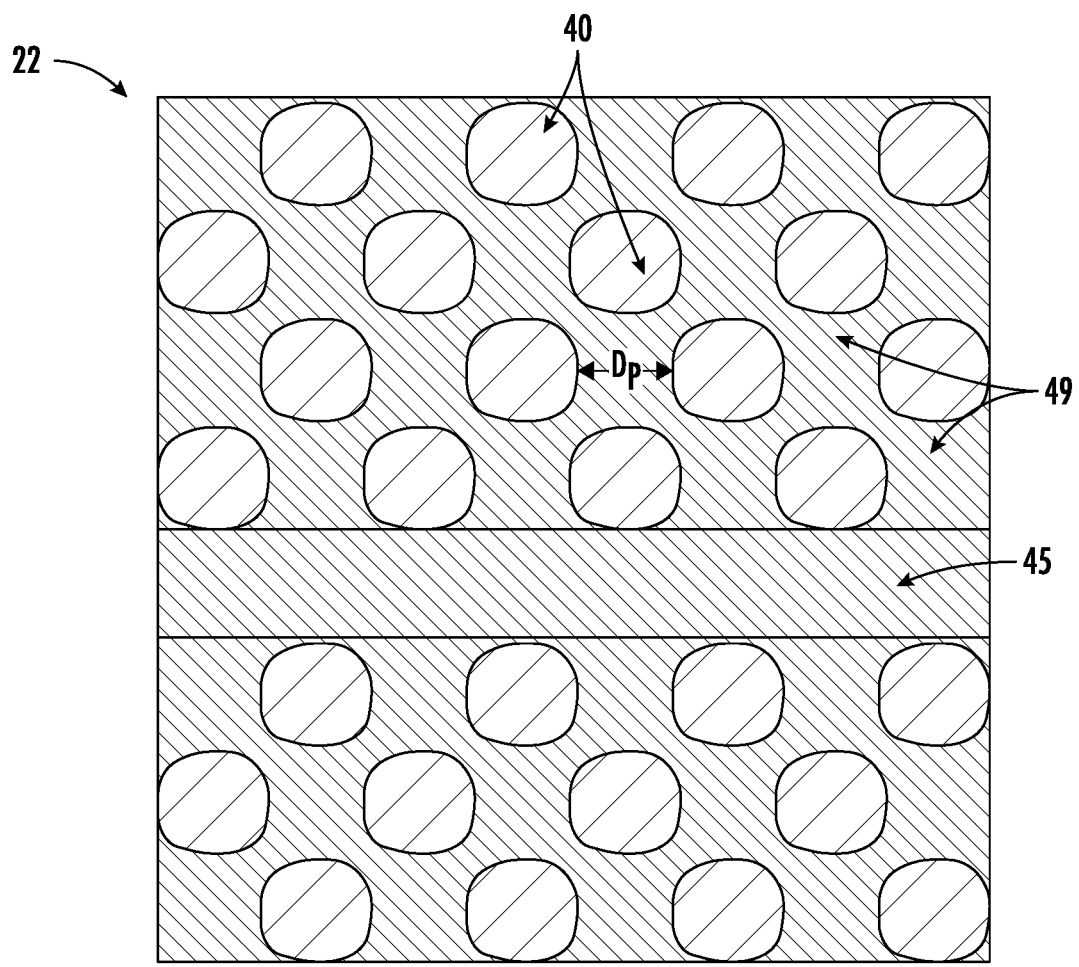
FIG. 4A shows an example schematic view of a portion of the padded material shown in FIG. 3 illustrating an example pattern of starch-based particles on the web, in accordance with some embodiments discussed herein.

FIG. 4A illustrates a close up schematic-type view of the roll of padded material. In the illustrated embodiment, the placement density is about 50%. In this regard, the starch-based particles 40 occupy about 50% of the first web 22, and about 50% of the first web 22 comprises an air gap 49, where the second surface of the first web 22 is exposed. In some embodiments, the air gap 49 may define a distance $D_P$ between each of the starch-based particles 40, in this regard, to decrease the coverage of the starch-based-particles, the distance $D_P$ between each of the starch-based particles 40 may be increased. Each of the starch-based particles 40 may be spaced apart in all directions, said differently, the starch-based particles may not overlap. In some embodiments, the distance $D_P$ may be in the range of 0.01 in-2 in, preferably in the range of 0.1 in-1 in.

In some embodiments, the first web 22 may define a fold region 45 within the pattern. In some embodiments, the fold region 45 may create a fold line for forming packaging out of the padded material. In this regard, the lack of starch-based particles 40 in the fold region 45 creates a natural fold line, as there are no starch-based particles 40 being crushed or manipulated to fold the padded material therealong. In some embodiments, the fold region 45 may be positioned at uniform increments, for example, every two (2) inches. The fold region 45 may thus, allow for variable sized padded mailer formation by providing a natural fold point every two (2) inches, while still maintaining the desired padding. In some embodiments, the fold region 45 may include registration marks, or a similar way to indicate the cut location to an automatic packaging machine, or mailer formation. Although two (2) inches is used as an example, other increments are considered.

Figure 4B:
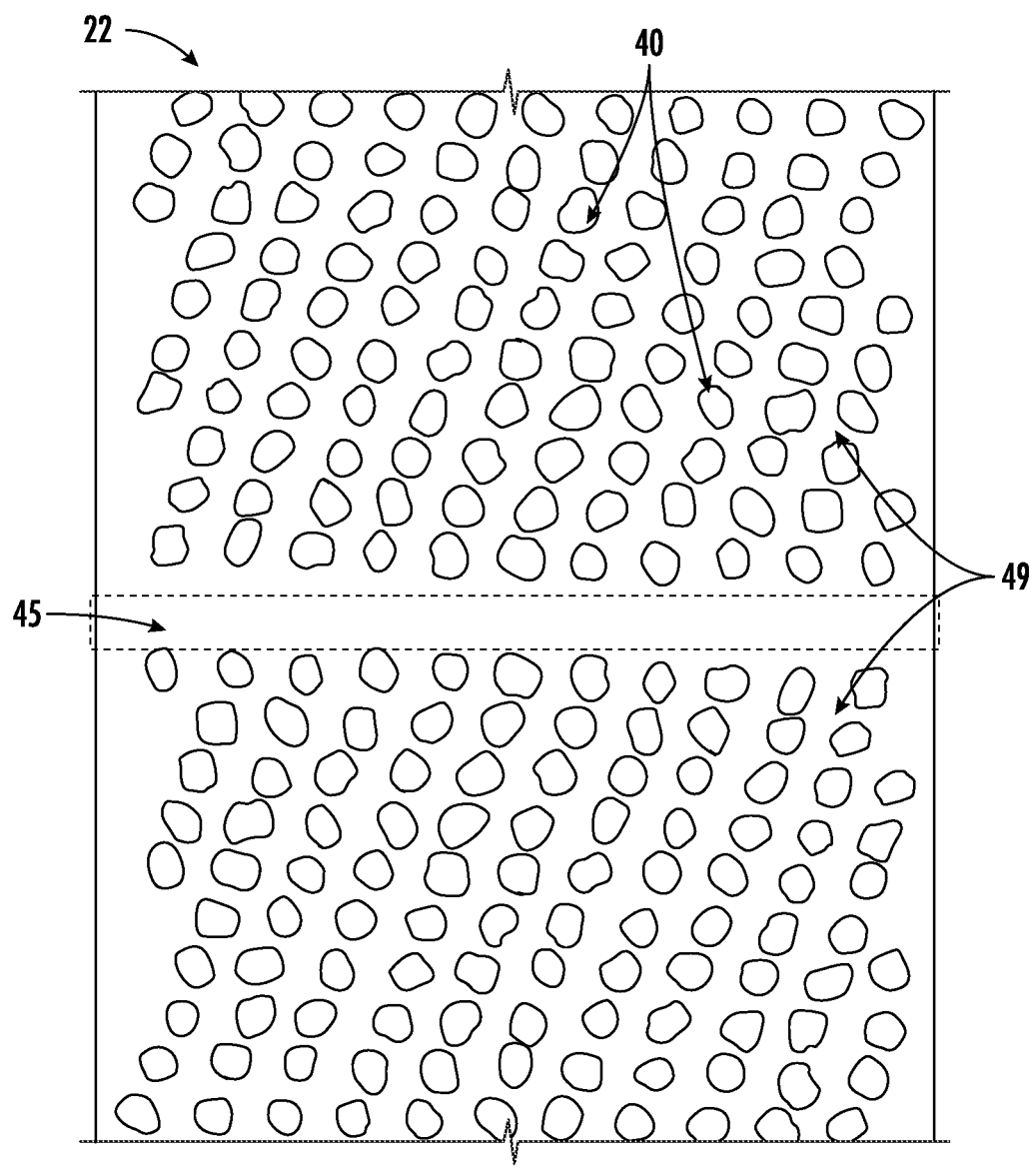
FIG. 4B shows a close-up view of a portion of the padded material shown in FIG. 3 illustrating another example pattern of starch-based particles on the web, in accordance with some embodiments discussed herein.

FIG. 4B illustrates a close up view of another example pattern for the padded material. This illustrated pattern has a placement density of about 25%, thus, the plurality of starch-based particles 40, cover about 25% of first surface of the first web 22, with about 75% air gap 49 along the first surface of the first web 22. Notably, other patterns and coverage ratios of starch-based padding to air gaps are contemplated.

Figure 4C:
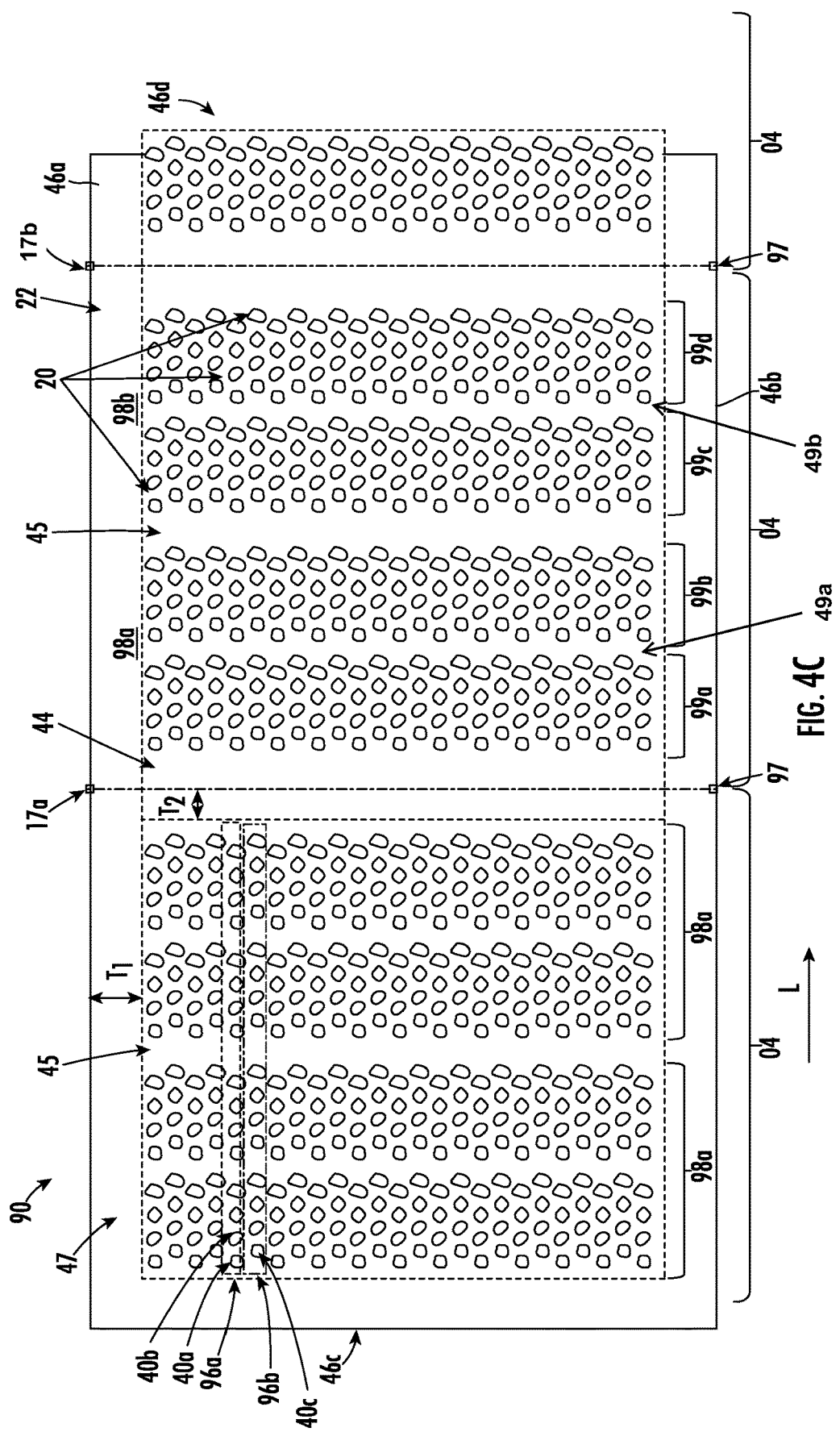
FIG. 4C shows a top view of a portion of the padded material shown in FIG. 3 illustrating another example pattern of starch-based particles on the web, in accordance with some embodiments discussed herein.

FIG. 4C illustrates a top view of a padded material (see e.g., FIG. 2B 20') as a roll stock 90, with the second web removed. The roll stock 90 shows a first pattern which corresponds to a pattern of a vacuum wheel, which deposits the starch-based particles 40 onto the web, as will be described herein.

The illustrated roll stock 90 is formed from left to right, with a leading edge 46c being the beginning of the roll stock 90, and a trailing edge 46d side indicating the roll stock source and placement of the starch-based particles 40 onto the web. The roll stock 90 comprises multiple panel sections 04 each bound by a first edge 46a, a second edge 46b opposite the first edge 46a and a first breakline 17a and a second breakline 17b opposite the first breakline 17a Each breakline, for example, may define the position where each panel section 04 may be separated from the roll stock 90 to become a panel for use in formation of a padded mailer.

In some embodiments, each rotation of a vacuum wheel may deposit the starch-based particles 40 to form three panel sections 04. In this regard, with reference to FIG. 6H, a vacuum wheel 180 may comprise three patterned sections 104 on the outer surface of the vacuum wheel 180. The vacuum wheel 180 may additionally include a pattern break 144 between adjacent pattern sections 104. In some embodiments, each of the patterned sections 104 may include a gap portion 145 and a shift 149 as will be described herein. Although discussed as having three patterned sections 104, in some embodiments, the vacuum wheel 180 may be designed to include more or less patterned sections, for example a vacuum wheel 180 with a smaller circumference may have one or two patterned sections, while a larger vacuum wheel may include more than three patterned sections. Additionally or alternatively a larger vacuum wheel may be patterned to form larger panel sections, while a smaller vacuum wheel may be patterned to form smaller panel sections.

Returning to FIG. 4C, the vacuum wheel pattern may comprise a scam or seam allowance about the perimeter of the panel section 04. To explain, the padded roll stock 90 may be used to form padded mailers, and thus, rather than utilizing a heat seal material to seal the package about the edges of packaged item, the mailer may be preformed. In order to be preformed, an adhesive may be used to glue or otherwise adhere one or more panel sections 04 together to form a pouch therein. In order to provide a surface to adhere the one or more panel sections 04 together, an edge defining a thickness may be present surrounding the starch-based particles 40, thereby defining a padded area and a non-padded area 47. In some embodiments, the non-padded area may include the area between the starch-based particles 40 and the first edge 46a, the starch-based particles 40 and the second edge 46b, the starch-based particles 40 and the first breakline 17a and the starch-based particles 40 and the second breakline 17b.

In order to account for the seam allowance, the vacuum wheel may include breaks in the pattern to provide the seam allowance. In some embodiments, the vacuum wheel may comprise holes for the starch-based particles extending along the width of the vacuum wheel, wherein the width of the vacuum wheel is smaller than the web, while in other embodiments the seam allowance may be formed into the pattern of the vacuum wheel, as illustrated in FIG. 6H.

In some embodiments, each of the vacuum wheel and the web 22 (or the conveyor of the web) may comprise one or more registration marks to indicate the location of the pattern breaks. In some embodiments, the registration marks 97 may indicate the location of the breakline, while in other embodiments the registration marks 97 may indicate the location of the pattern edge(s) between adjacent panel sections 04. In this regard, there may be one or more registration mark delineating each of panel section 04.

As discussed each of the panel sections 04 may be separated by a pattern break 44. The pattern break 44 may include the area between pattern edges of adjacent panels sections 04. The pattern break 44 may further include a demarcation of the breakline 17a, 17b indicating the location where the panel sections 04 are separated to become individual panels.

The pattern and position of the starch-based particles 40 on the web 22 may provide optimum cushioning for the padded mailer, and/or other padded materials formed from the padded roll stock 90. The pattern of the starch-based padding 40 and the placement density of the starch-based particles may provide a gradient cushioning, by providing areas of high density coverage, and areas of low density coverage.

Although the pattern is illustrated and described herein, it should be understood this is an example pattern, and other patterns are considered. In the illustrated pattern, the starch-based particles 40 are spaced apart from the edges and the breakline of each respective panel section 04, defining an seam allowance thickness $T_1$ therebetween. In some embodiments, the seam allowance thickness $T_1$ may be up to 1 inch, about 1 inch, or greater than 1 inch. In some embodiments, the seam allowance thickness $T_1$ may define a uniform width, while in other embodiments the seam allowance thickness $T_1$ between the first edge 46a and the starch-based particles 40 and the second edge 46b and the starch-based particles 40 may be greater than a seam allowance thickness $T_2$ between the first breakline 17a and the starch-based particles 40, and the second breakline 17b and the starch-based particles 40.

In some embodiments, the seam allowance thickness $T_1$ between the first edge 46a and the starch-based particles 40 and the second edge 46b and the starch-based particles 40 may be the same while the seam allowance thickness $T_2$ between the first breakline 17a and the starch-based particles and the second breakline 17b and the starch-based particles 40 may be the same.

In some embodiments, the first pattern may comprise a plurality of staggered rows. Each of the rows may comprise a set number of starch-based particles 40. In some embodiments, each of the rows may comprise the same number of starch-based particles 40, while in other embodiments the number of starch-based particles in each row may vary.

In the illustrated embodiment, the plurality of staggered rows includes a first row 96a and a second row 96b. To explain the staggered position, the first row 96a may comprise at least a first starch-based particle 40a, and a second starch-based particles 40b spaced apart from the first starch-based particle 40a, the second row 96b may comprise at least a third starch-based particle 40c. The third starch-based particle 40c may be positioned between the first starch-based particle 40a and the second starch-based particle 40b, in the second row 96b. In some embodiments, the third starch-based particle 40c may be equidistant between the first starch-based particle 40a and the second starch-based particle 40b, while in other embodiments the third starch-based particle 40c may be positioned closer to one of either the first starch-based particle 40a or the second starch-based particle 40b.

In some embodiments, the first pattern may comprise a repeating pattern of alternating first and second rows. Each of the first rows 96a may comprise a first starch-based particle adjacent a leading edge 46c side of the first pattern, while each of the second rows 46b may comprise an end starch-based particle adjacent a trailing edge 46d side of the first pattern. In some embodiments, the leading edge side 46c may correspond to the side of the panel section 04 with the first breakline 17a and the trailing edge 46d side may correspond to the side of the panel section 04 with the second breakline 17b.

In some embodiments, the first pattern may comprise a gap 45 within each of the rows. In some embodiments, the gap 45 may provide a shift in the pattern of the starch-based particles 40 in each of the rows. In this regard, the gap 45 may provide a break in the starch-based particles 40. In some embodiments, the gap 45 may be positioned along a point in the panel section 04 wherein the packaged item is unlikely to require cushioning. In some embodiments, the gap 45 may be less than 0.25 inches, about 0.25 inches, or greater than 0.25 inches in width.

The gap 45 may divide the starch-based particles 40 into a first half 98a and a second half 98b. In some embodiments, each of the first half 98a and the second half 98b may have the same number of starch-based particles 40, while in other embodiments, the first half 98a and the second half 98b may have different number of starch-based particles. In some embodiments, the first half 98a and the second half 98b may be symmetrical about the gap 45, while in other embodiments the first half 98a and the second half 98b may not be symmetrical about the gap 45. In some embodiments, the second half 98b may be a tessellation of the first half 98a.

In some embodiments, the gap 45 may be a natural fold point within the panel section 04, such that the completed panel may be folded about the gap 45 to form a padded mailer or similar padded material.

In some embodiments, each of the first half 98a and the second half 98b may be further divided by a shift 49. A first shift 49a may divide the first half 98a into a first column 99a and a second column 99b, similarly a second shift 49b may divide the second half 98b into a first column 99c and a second column 99d. In some embodiments, the first shift 49a and the second shift 49b may be configured as if a starch-based particle 40 is removed from each row at the same position. In this regard, each of the first shift 49a and the second shift 49b may be smaller than the gap 45. In some embodiments, each of the first column 99a, 99c and the second column 99b, 99d may have the same number of starch-based particles, while in other embodiments the first columns 99a, 99c, and the second columns 99c, 99d may have different numbers of starch-based particles. In some embodiments, the shifts 49a, 49b, and/or the gap 45 may provide a targeted buckling point of the padded material. In this regard, the targeted buckling point may reduce the required opening force to open a package formed of the padded material.

As discussed, the padded material, and thus, each of the panel sections 04 define a placement density of the starch-based particles. The placement density is a ratio of an area covered by the starch-based padding (e.g., the surface area of the first web the starch-based padding is adhered to) and a total web area. In this regard, the total area of the first web 22 extends between the first edge 46a and the second edge 46b and along the length L of the first web 22 between the first breakline 17a and the second breakline 17b. As mentioned above, the placement density may be between 15%-40%. Said differently, the starch-based particles 40 may cover between 15%-40% of the total area of the first web 22. Each of the gap 45, the first shift 49a and second shift 49b in addition to the seam allowance thickness $T_1$ may be adjusted to achieve the desired placement density.

Figure 5A:
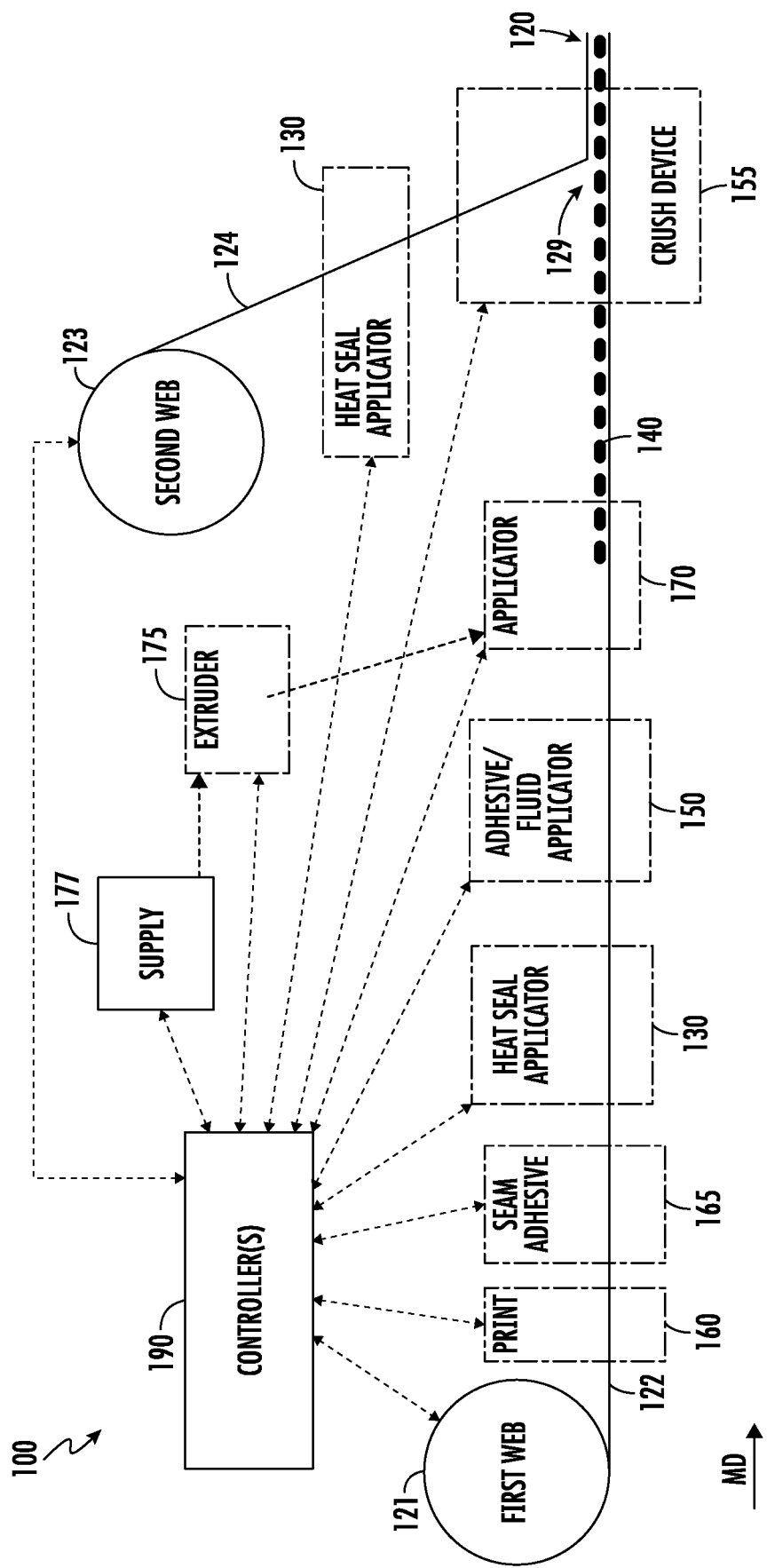
FIG. 5A shows a schematic representation of an example system for forming padded material, in accordance with some embodiments discussed herein.

FIG. 5A shows a schematic representation of an example system 100 for forming padded material, such as the padded material described herein. The system 100 may, such as through controller 190, cause conveyance of one or more paper-based webs, such as along the machine direction (MD) arrow. For example, one or more conveyor means (e.g., a conveyor belt, one or more rollers, etc.) and/or motors may be used to cause a roll 121 of a first web 122 to pass through a print phase 160, a seam adhesive application phase 165, a heat seal coating applicator phase 130, an adhesive/fluid applicator phase 150, a padding applicator phase 170, and/or a crush device phase 155. After that, the conveyor means may cause the first web 122 to combine with the second web 124 (such as from a roll 123 of the second web 124) at a combination point 129 to form the padded material 120.

Figure 5B:
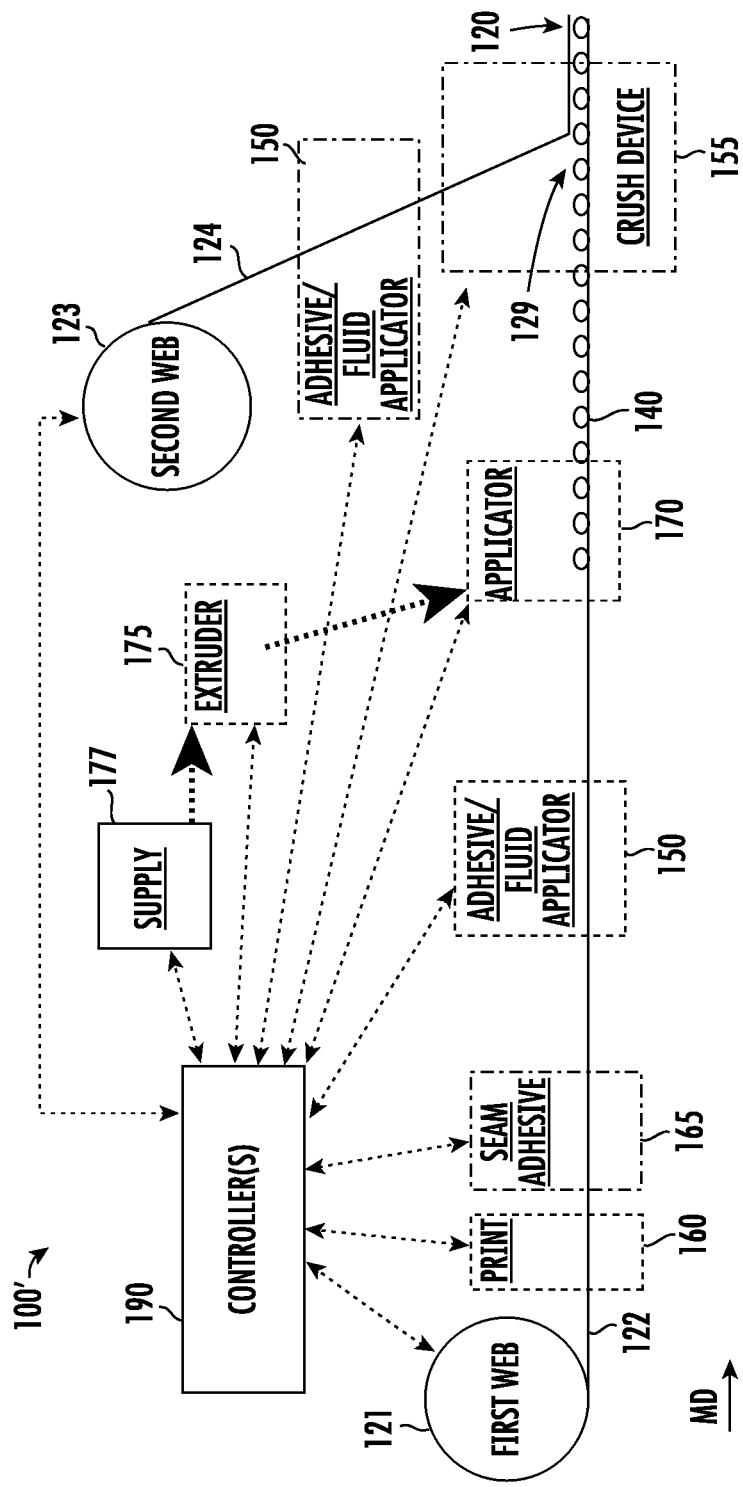
FIG. 5B shows a schematic representation of an example system for forming padded material, in accordance with some embodiments discussed herein.
Figure 8A:
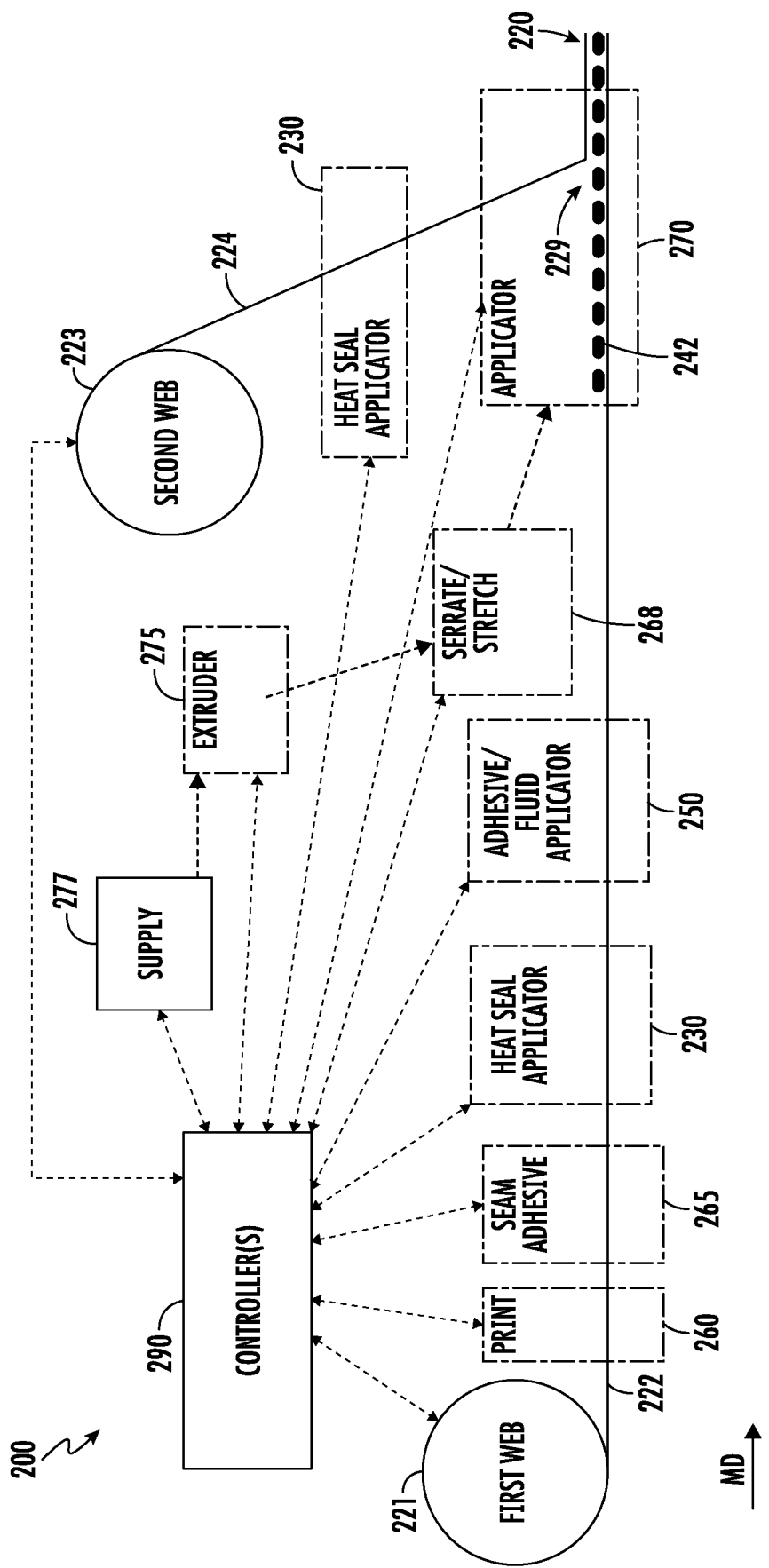
FIG. 8A illustrates a schematic representation of an example system for forming padded material illustrated in FIG. 7A, in accordance with some embodiments discussed herein.

FIG. 5B shows a schematic representation of an example system 100' form forming a padded roll stock, without a heat seal material. The system 100' may, such as through controller 190, cause conveyance of one or more paper-based webs, such as along the machine direction (MD) arrow. For example, one or more conveyor means (e.g., a conveyor belt, one or more rollers, etc.) and/or motors may be used to cause a roll 121 of a first web 122 to pass through a print phase 160, a seam adhesive application phase 165, an adhesive/fluid applicator phase 150, a padding applicator phase 170, and/or a crush device phase 155. After that, the conveyor means may cause the first web 122 to combine with the second web 124 (such as from a roll 123 of the second web 124) at a combination point 129 to form the padded material 120. FIG. 8A illustrates an additional example system 200 for forming a second padded material 220 as described herein.

Notably, in conjunction with various embodiments described herein, various of the phases can be combined, changed in order of operation, separated, or otherwise changed. In such example embodiments, the corresponding phases may be adjusted accordingly.

The following provides further example description of the various features/components and/or phases corresponding to systems 100, 100' 200. In this regard, depending on the type of padded material (e.g., starch-based particles, or expanded starch-based sheet(s)), different features/components may be employed. The controller 190 provides logic and control functionality used during operation of the system 100. In some embodiments, the functionality of the controller 190, 290 may be distributed to several controllers that each provides more limited functionality to discrete portions of the operation of system 100, 100', 200. The controller 190, 290 may comprise one or more suitable electronic device(s)/server(s) capable of executing described functionality via hardware and/or software control. In some embodiments, the controller 190, 290 may include one or more user interfaces (not shown), such as for displaying information and/or accepting instructions. The controller 190, 290 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 190, 290 may include one or more processors coupled to a memory device. Controller 190, 290 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, the controller 190, 290 may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the controller 190 may be configured to execute computer program code instructions to perform aspects of various embodiments of the present invention described herein.

The controller 190, 290 may be operably coupled with one or more components of the system 100, 200 including for example, the roll 121, 221 of the first web 122, 222 (or corresponding web management device for controlling translation of the first web 122, 222 along the web path), the roll 123, 223 of the second web 124, 224 (or corresponding web management device for controlling translation of the second web 124, 224 along the web path), various components of the printing phase 160, 260, various components of the seam adhesive application phase 165, 265, various components of the heat seal coating applicator phase 130, 230, various components of the serrate and stretch phase 268, various components of the adhesive/fluid applicator phase 150, 250, various components of the padding applicator phase (e.g., 170 utilizing the supply 177 and/or extruder 175 for, for example, starch-based particles or utilizing the supply 277, extruder 275, and serrate/stretch 268 for, for example, starch-based sheet(s)), various components of the crush device phase 155, 255, conveyance means of the system 100, 200 and other components (such as described herein). For example, depending on the components, the controller 190, 290 may be operably coupled such as through use of solid-core wiring, twisted pair wiring, coaxial cable, fiber optic cable, mechanical, electrical, wireless, radio, infrared, etc. In this regard, depending on the components, the operable coupling may be through one or more intermediate controllers or mechanical coupling, such as used for controlling some components (e.g., controlling operation and/or feeding of the roll 121, 221 of the first web 122, 222). In some embodiments, the controller 190, 290 may be configured to provide one or more operating signals to these components and to receive data from these components.

During the printing phase 160, 260, the controller 190, 290 may direct a printer to print one or more images at specific locations on the first web 122, 222. Any image (including words, markers, instructions, etc.) is contemplated by various embodiments of the present invention. For example, various labels corresponding to the padded mailer may be printed onto the first web (such as the face of the first web that will face outside of the padded mailer). As another example, a barcode or other identifier may be printed to be used, such as during shipping and/or delivery. Although the example figures show the first web undergoing printing, in some embodiments, in addition to or in the alternative, the second web 124, 224 may undergo printing through the printing phase 160, 260.

During the seam adhesive application phase 165, 265, the controller 190, 290 may be configured to cause application, such as from a seam adhesive application device, of adhesive onto the first web 122, 222. For example, such adhesive may be applied to ultimately help form the seam (e.g., within the seam allowance thickness $T_1$) in conjunction with a corresponding portion of the second web 124, 224. The seam adhesive may be any type of adhesive that enables adherence between the first web and the second web. In some embodiments, other configurations or applications of the seam adhesive are contemplated, such as applying the seam adhesive to the second web 124, 224 (e.g., in addition to or in the alternative to applying the seam adhesive to the first web 122, 222). The seam adhesive may enable edges of the first web 122 and the second web 124 to be joined together thereby sealing the plurality of starch-based particles therein.

During the heat seal coating applicator phase 130, 230, the controller 190, 290 may be configured to cause application, such as from a heat seal coating application device, of heat seal coating onto the first web 122, 222, such as described herein. Notably, a corresponding heat seal coating applicator phase 130, 230 may be utilized to apply heat seal coating to the second web 124, 224, such as described herein. As noted herein, the heat seal coating may be used to seal the webs together and/or used in later conversion stages, such as during formation of a padded mailer.

During the adhesive/fluid applicator phase 150, 250, the controller 190, 290 may be configured to cause application, such as from an adhesive or fluid application device, of adhesive or other fluid (e.g., water, water-based fluid, glue, etc.) onto the first web 122, 222, such as described herein. In some embodiments, the adhesive/fluid may be applied through a spray application, while in other embodiments the adhesive/fluid may be applied with a roller. Notably, a corresponding adhesive/fluid applicator phase 150, 250 may be utilized to apply adhesive or other fluid to the second web 124, 224, such as described herein. As noted herein, the adhesive or other fluid may be used to adhere and/or otherwise connect the starch-based particles to the first web 122, 224.

During the padding applicator phase 170, the controller 190 may be configured to cause application, such as from an applicator, of the starch-based particles 140 onto the first web 122, such as described herein. Notably, such application of the starch-based particles may be positioned according to a specific pattern. The starch-based particles (or other padding) may be formed by an extruder 175 that received materials from a supply 177 (e.g., storage area or similar). Example systems with more specific detail regarding example application processes for the starch-based particles are illustrated in FIGS. 6A-6F and are described further herein. Notably, while the crush device phase 155 is shown separate from the padding applicator phase 170, in some embodiments, it may occur in conjunction with the padding applicator phase 170.

During the crush device phase 155, the controller 190 may be configured to cause crushing of the starch-based particles 140 on the first web 122, such as described herein. Such crushing may include applying one or more instances of pressure to the starch-based particles (e.g., either directly to the particles and/or through one of the first or second web). For example, during application, a roller may act on the starch-based particles just before, during, or after application of the starch-based particles to the first web. As another example, after the second web is brought into contact (e.g., brought together) with the first web with the starch-based particles therebetween, one or more rollers (or other crush devices) may crush the padded material to the desired properties (e.g., thickness, density, etc.). In some embodiments, different stages of crushing may be applied. For example, a first set of two rollers of a first width may act on the starch-based particles (and/or webs) at a first instance, and then, downstream, a second set of two rollers of a second (shorter) width may act on the starch-based particles (and/or webs)—thereby creating a tiered crushing approach. In some embodiments, additional crushing stations or variations in widths (such as maintaining a same width or increasing in width) between rollers may be applied to the crushing approach.

In some embodiments, the padded material 120 may include one or more exhaust holes or vents, such as formed pin holes, punched holes, or similar formed on the first web 122. For example, an additional exhaust hole creation phase may be applied to the padded material 120 to form the one or more exhaust holes for vents (although, in some embodiments, the exhaust holes may be formed when the first and second webs are brought together, such as by not sealing one or more portions of the first and second webs together). Such one or more exhaust holes or vents may enable air to escape, such as during handling (e.g., during shipping, if the padded material is dropped or otherwise impacted, etc.), during passage of the padded material through a nip of rollers or other components during various manufacturing processes, among other circumstances.

In some embodiments, the one or more exhaust holes or vents may be formed in the internal web (e.g., the first web 122). In this regard, the one or more exhaust holes or vents may provide means for air to escape, while maintaining a seal about the package to prevent direct moisture ingress. Further, the one or more exhaust holes or vents may provide an escape route for released moisture during heating and/or drying of the padded material and/or package. In other embodiments, the one or more exhaust holes or vents may be positioned within the side seal to cause the internal pressure of the package to return to an equilibrium during pressure changes.

Before, after, or during the crush device phase 155, the first web 122 (and starch-based particles 140) and the second web 124 (coming from a second roll 123) may be brought together (e.g., combined) at connection point 129 to form the padded material 120. Thereafter, the padded material 120 may be rolled up into a roll, such as shown in FIG. 1.

Figure 5C:
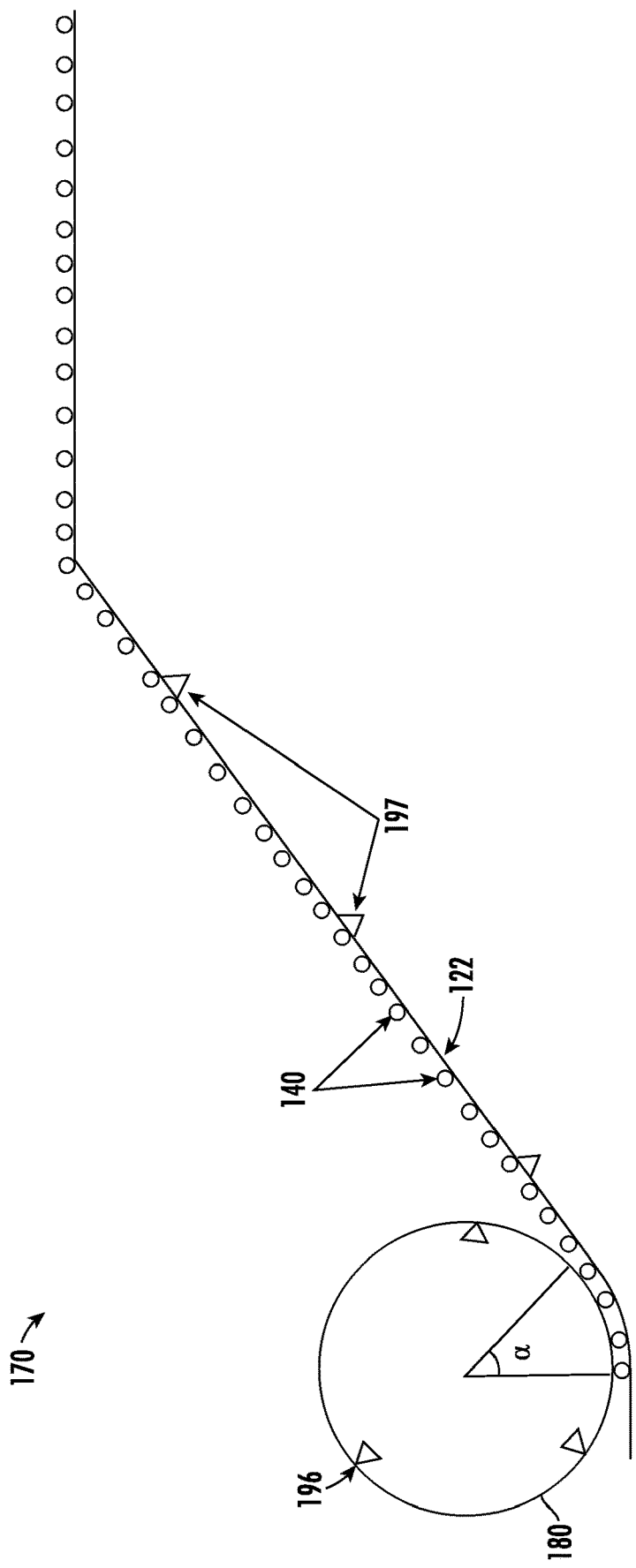
FIG. 5C shows a schematic representation of the contact angle between an example vacuum roller and the web, in accordance with some embodiments discussed herein.

FIG. 5C illustrates a schematic view of the application phase 170 of the systems 100, 100'. In some embodiments, a vacuum wheel 180 may comprise multiple patterned sections, separated by registration marks 196. Similarly, the first web 122 and/or the conveyor of the first web may comprise registration marks 197 which correspond to registration marks 196 on the vacuum wheel 180. In this regard, the registration marks should be in sync to precisely position the starch-based particles on the web. In some embodiments, when the registration marks are not in sync (such as may be determined based on one or more sensors, cameras, etc.), the controller 190, 290 may change the speed of either the vacuum wheel or the first web so as to synchronize the application phase.

In some embodiments, the first web 122 and the vacuum wheel 180 may define a wrap angle $\alpha$. The wrap angle $\alpha$ indicates the portion of the vacuum wheel 180 which contacts the first web 122 at a given time. In some embodiments, the wrap angle $\alpha$ may be between 0-40 degrees, and may preferable be between 10-30 degrees. In this regard, a larger wrap angle $\alpha$ indicates a greater contact time between the vacuum wheel 180 and the first web 122. In some embodiments, the contact time may provide the starch-based particles a greater time to form a bond with the first web 122. In some embodiments, a larger wrap angle $\alpha$ may allow the system to increase process speeds and/or be more efficient/effective in placement of the starch-based particles.

Figure 6A:
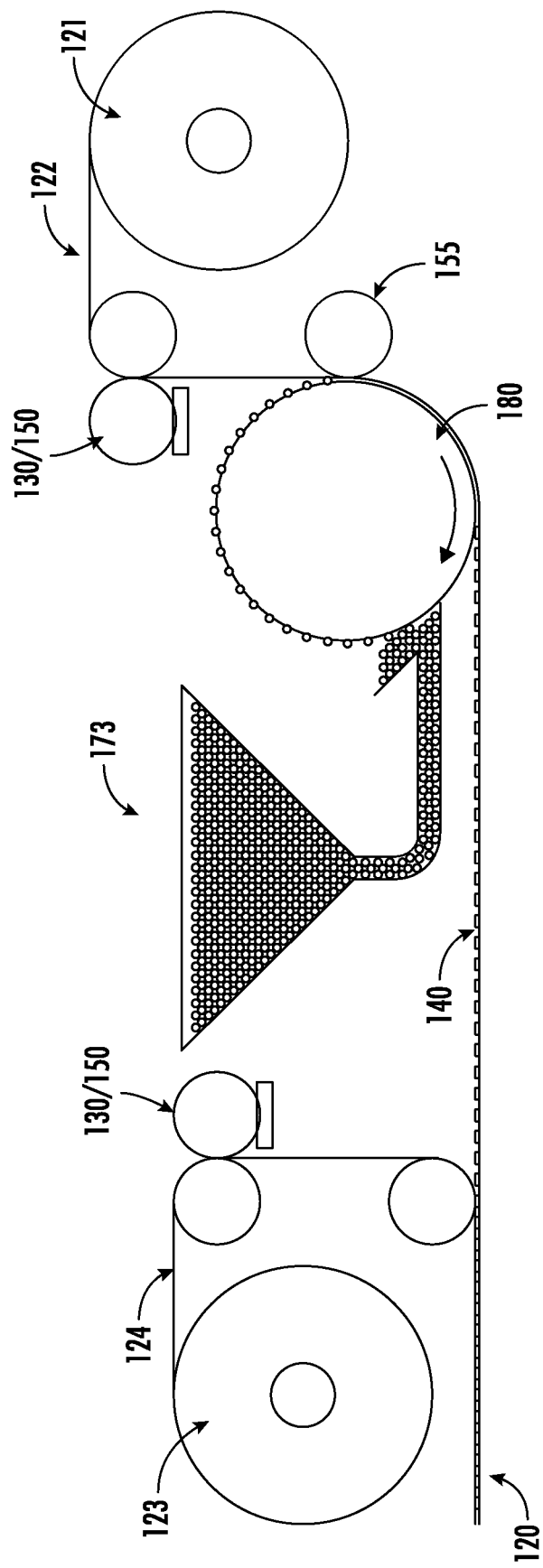
FIG. 6A illustrates a schematic representation of the example system for forming padded material, in accordance with some embodiments discussed herein.

FIG. 6A illustrates a schematic representation of a portion of the example system for forming a padded material, such as discussed herein. The system illustrated in FIG. 6A is a portion of the systems illustrated in FIGS. 5A-B, in that it includes the first roll 121 holding the first web 122, the second roll 123 holding the second web 124, starch-based particles 140, an adhesive/fluid and/or heat seal coating applicator 130/150, and a crush device 155. The system illustrated in FIG. 6A expands on the applicator phase, including a hopper 173 and a vacuum wheel 180 (although any vacuum-based device is contemplated, such as a belt or other transfer device). Notably, the vacuum wheel 180 "grabs" the starch-based particles 140 directly from hopper 173 and then deposits them on the first web 122. In some embodiments, the applicator phase 170 is configured to run up to 200 ft/min, up to 300 ft/min, or even in excess of 400 ft/min. However, at higher speeds misplacement of the starch-based particles may increase.

Figure 6B:
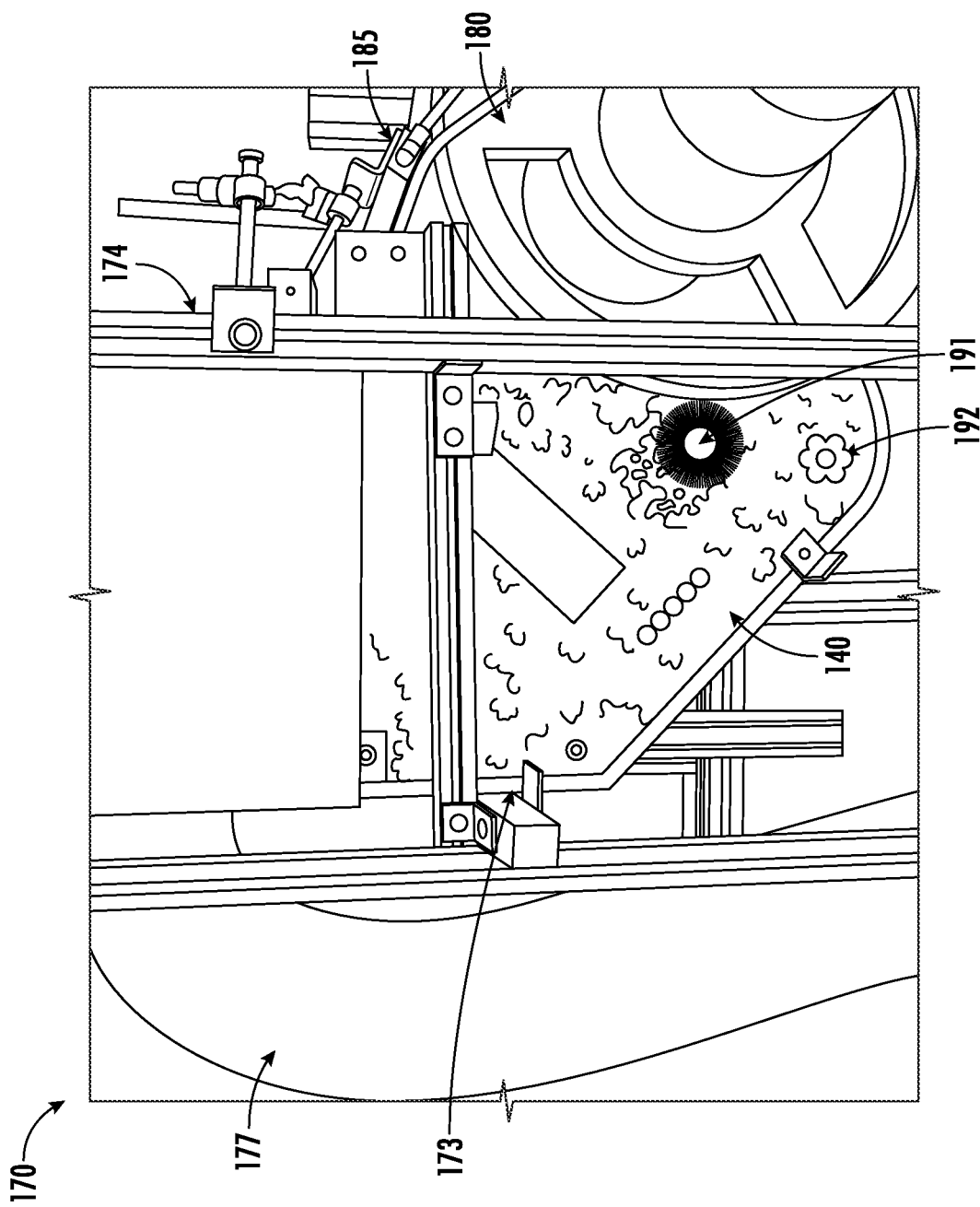
FIG. 6B illustrates a side view, of an example apparatus for positioning starch-based padding, in accordance with some embodiments discussed herein.
Figure 6C:
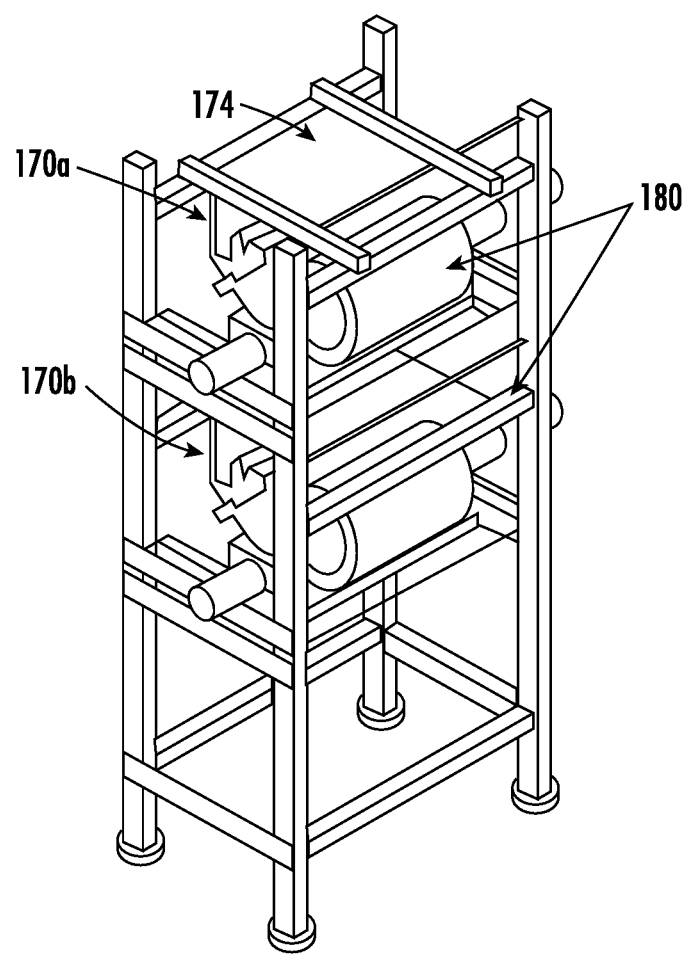
FIG. 6C shows a perspective view of an example stack utilizing two of the example apparatuses shown in FIG. 6B, in accordance with some embodiments discussed herein.
Figure 6D:
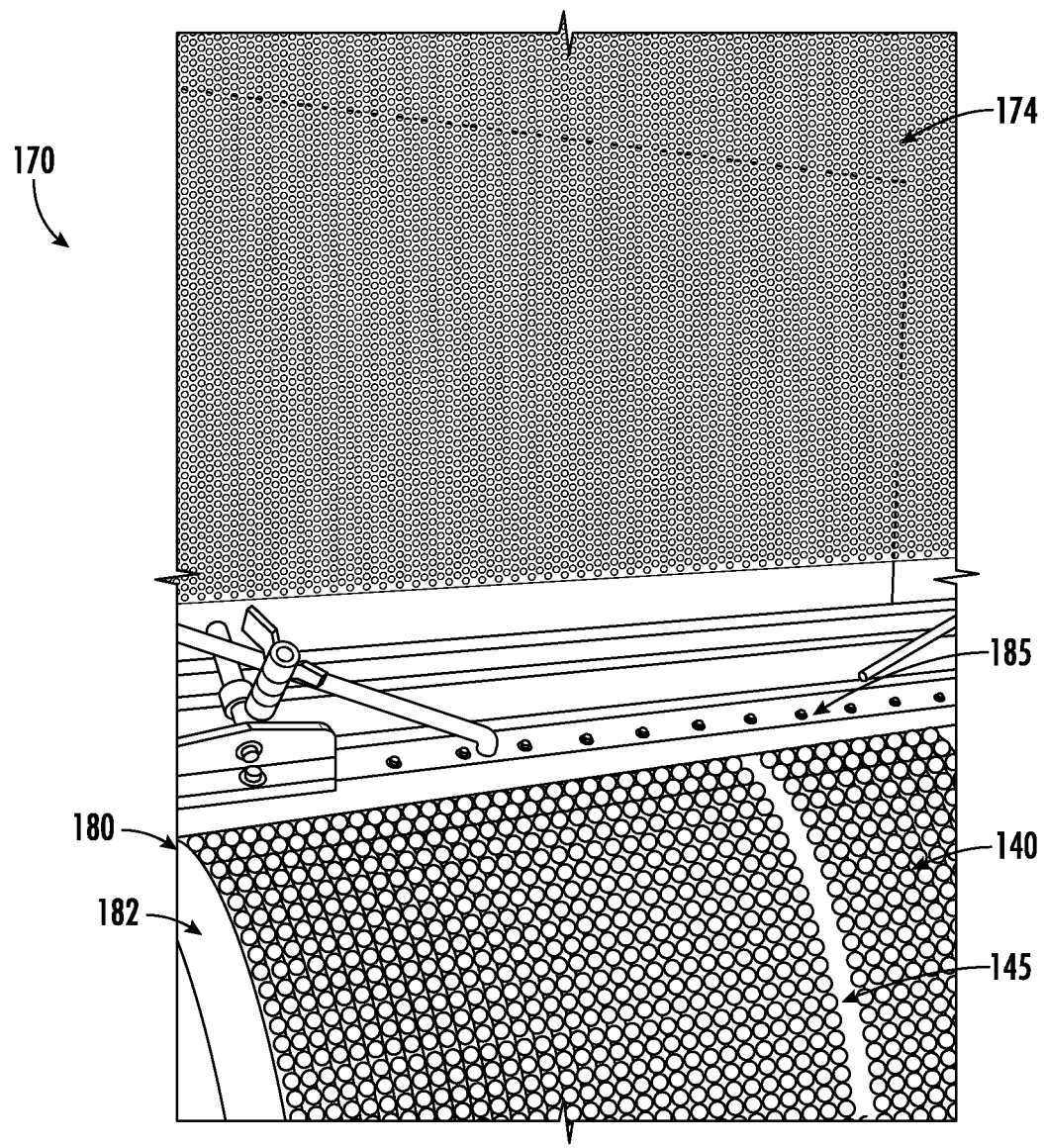
FIG. 6D shows a perspective view of a portion of the example apparatus shown in FIG. 6B, in accordance with some embodiments discussed herein.
Figure 6E:
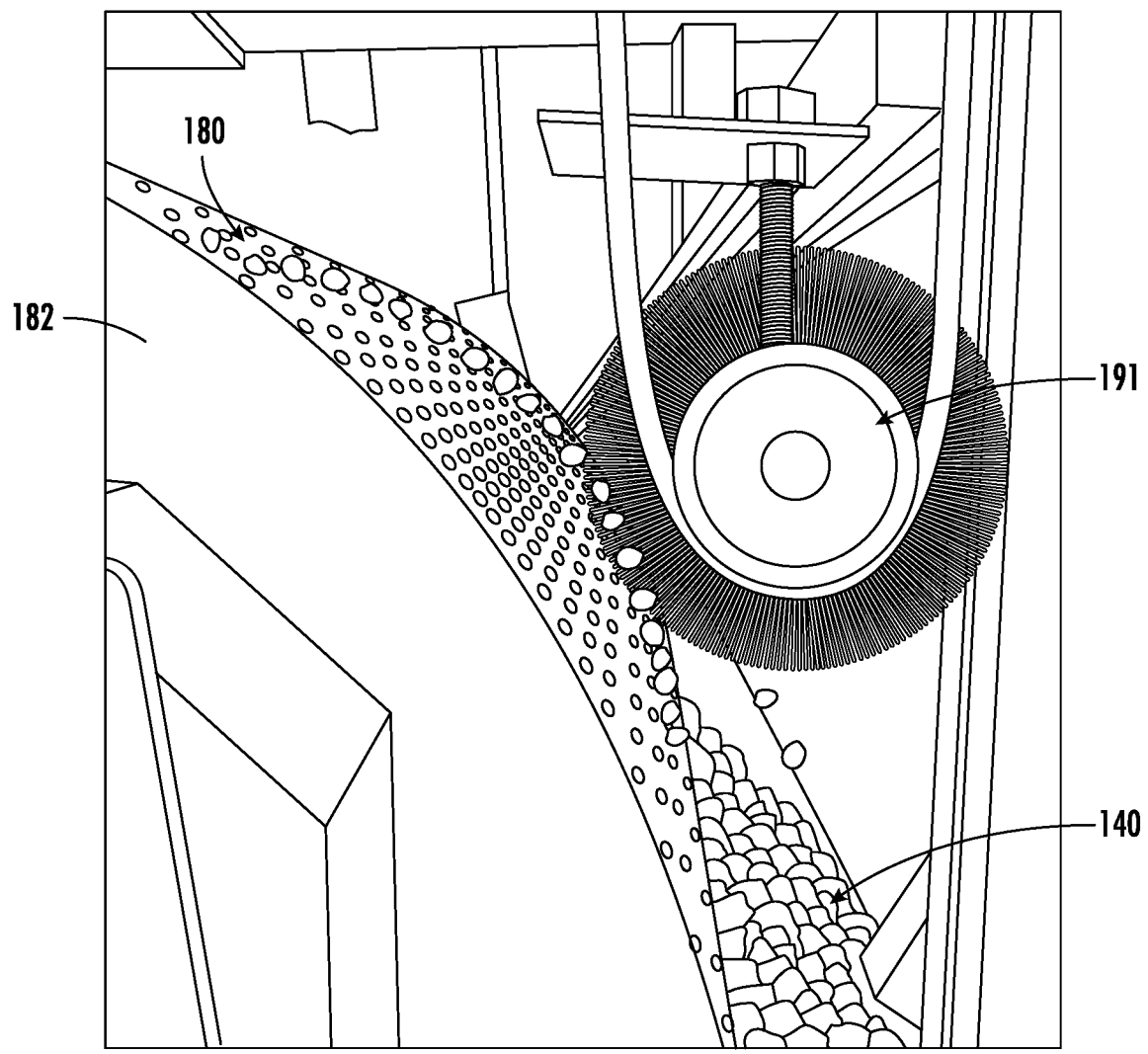
FIG. 6E shows a side view of a portion of the example apparatus shown in FIG. 6B, in accordance with some embodiments discussed herein.
Figure 6F:
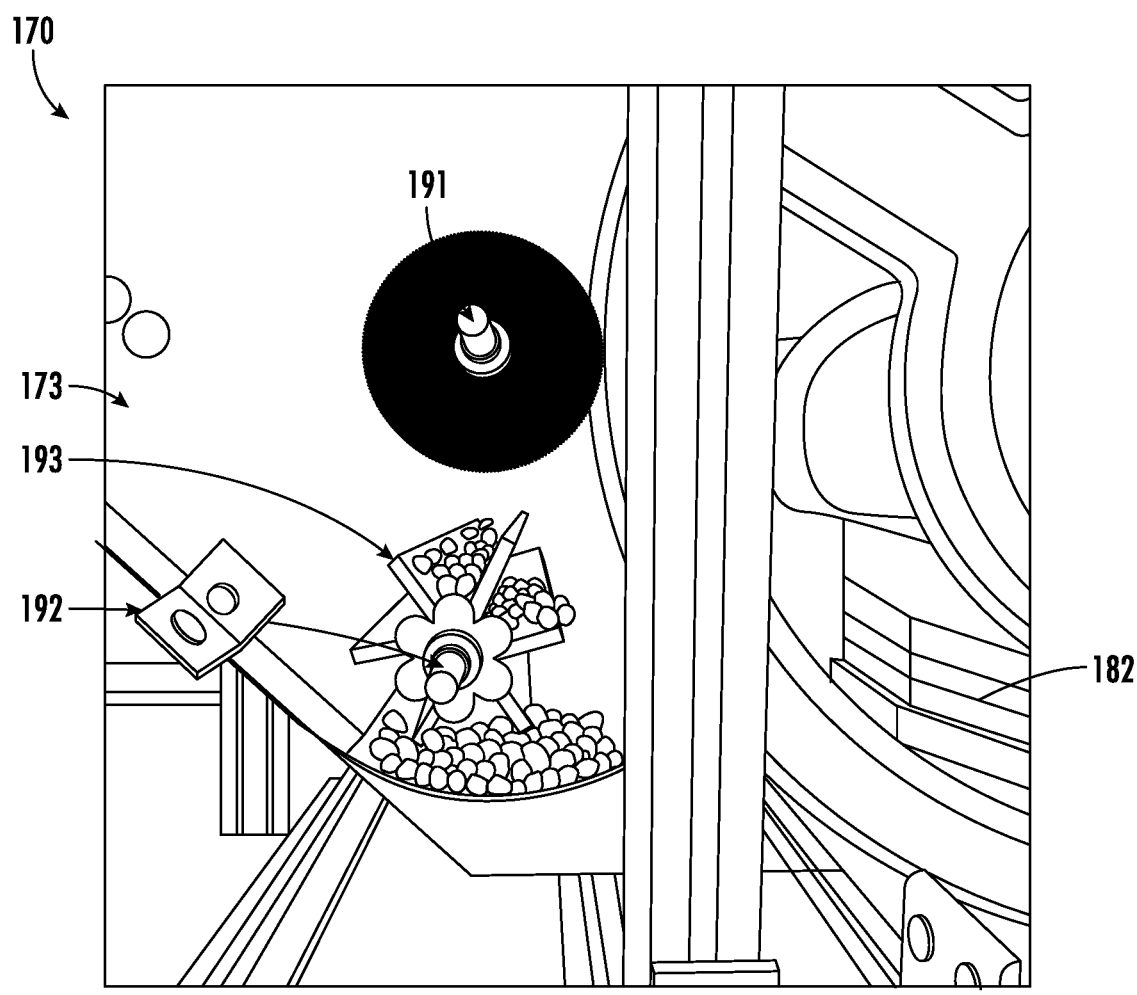
FIG. 6F shows a side view of a portion of the example apparatus shown in FIG. 6B, in accordance with some embodiments discussed herein.
Figure 6G:
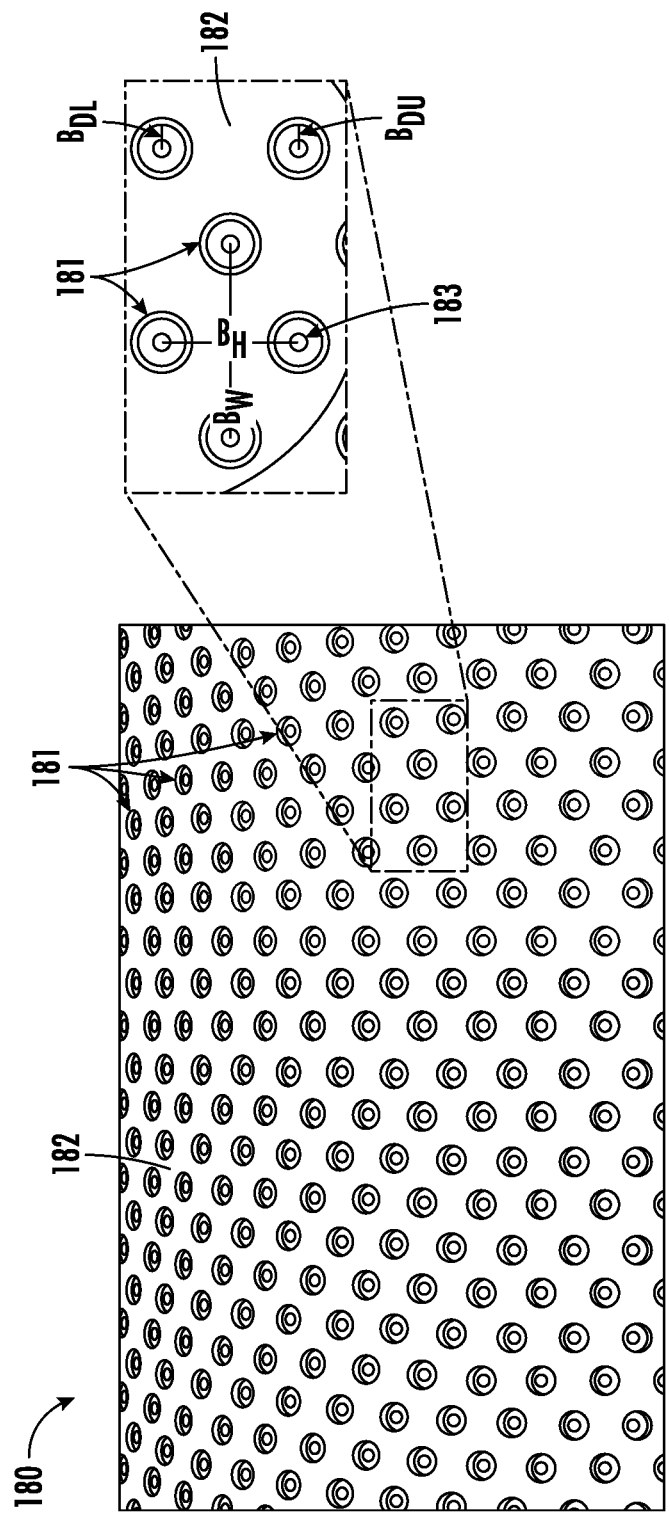
FIG. 6G illustrates a close-up perspective view of a surface of the vacuum wheel of the example apparatus shown in FIG. 6B, in accordance with some embodiments discussed herein.
Figure 6H:
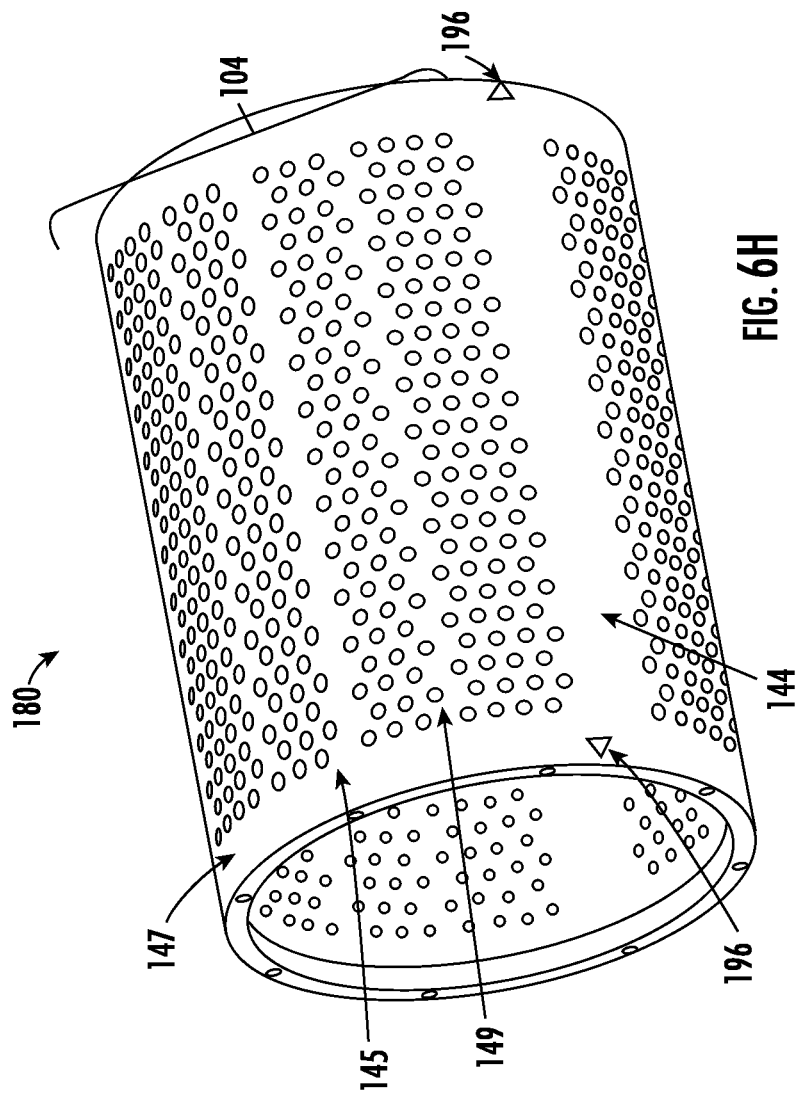
FIG. 6H illustrates a perspective view of the example vacuum wheel shown in FIG. 6B, in accordance with some embodiments discussed herein.

FIGS. 6B-6H show example devices that may be used in the applicator phase 170. FIG. 6B illustrates a side view of one or more devices utilized in the applicator phase 170. In some embodiments, the plurality of starch-based particles are supplied to the hopper 173 through an inlet 177. The inlet 177 may be connected directly to an extruder, or other supply means of the starch-based particles 140. The plurality of starch-based particles 140 may reside in the hopper 173 until transferred, via the vacuum wheel 180, to the first web.

In some embodiments, the applicator phase 170 may comprise more than one application device as illustrated in FIG. 6C. In such embodiments, a first system 170a may be stacked on top of a second system 170b. Each of the first system 170a and the second system 170b may have the same components as illustrated and discussed with reference to FIG. 6B, thus, each system may include a hopper, an inlet, and a vacuum wheel 180. In some embodiments, when more than one system is used in the applicator phase 170 the dimensions of the components may be reduced. In this regard, the hopper, the inlet and the vacuum wheel may be configured to hold and process a smaller number of starch-based particles. However, the use of more than one system may increase the overall production of the padded material.

Returning to FIG. 6B, in some embodiments, the hopper 173 comprises an acceleration device 191, which spans the width of the hopper 173 (e.g., along the width of the vacuum wheel 180). In some embodiments, the acceleration device 191 may be configured to accelerate the plurality of starch-based particles 140 such that the speed of the plurality of starch-based particles 140 is about the speed of the vacuum wheel 180 (e.g., the rotation imparted on the starch-based particles 140 by the acceleration device 191 causes the starch-based particles 140 to accelerate so as to travel at a particle rotational speed that matches a vacuum wheel rotational speed for engagement of the plurality of starch-based particles with the vacuum wheel). In this regard, the acceleration device 191 provides a point of acceleration which accelerates the plurality of starch-based particles past the terminal velocity. The acceleration of the plurality of starch-based particles 140 to about the speed of the vacuum wheel 180 increases the fill ratio by causing a higher chance of capture. In some embodiments, the acceleration device 191 may increase the velocity of the starch-based particles to over 200 ft/min, preferably over 300 ft/min, and more preferably over 400 ft/min.

In some embodiments, the acceleration device may be formed as any device that can carry, push, or feed the plurality of starch-based particles to the vacuum wheel 180, for example, a moving belt, moving plates, a brush, moving pockets, a drum, or similar.

With reference to FIG. 6E, the acceleration device 191 may be a brush spaced apart from the vacuum wheel 180. In some embodiments, the acceleration device 191 may define a diameter of about 4". The size of the acceleration device 191, may contribute to a single layer of starch-based particles 140 engaging with the vacuum wheel 180 at a given rotation. Further, the vacuum wheel 180 may rotate in a first direction (e.g., clockwise) and the acceleration device 191 may rotate in a second direction (e.g., counterclockwise). Thus, both the vacuum wheel 180 and the acceleration device 191 may drive the starch-based particles 140 upwards (e.g., away from the plurality of starch-based particles 140 within the hopper 173 as illustrated in a theoretical manner in FIG. 6E).

In some embodiments, the acceleration device 191 may be positioned between 0.1 in-0.3 in from the vacuum wheel 180. The space between the vacuum wheel 180 and the acceleration device 191 preferably allows the plurality of starch-based particles 140 to pass between the acceleration device 191 and the vacuum wheel 180 without being crushed, while preventing back slippage. In some embodiments, the distance between the vacuum wheel 180 and the acceleration device 191 may be measured from the bristles of the acceleration device 191 to the surface of the vacuum wheel 180. In some embodiments, the bristles of the acceleration device 191 are malleable such that they may encapsulate the plurality of starch-based particles 140 without crushing them. Additionally or alternatively, in some embodiments, the acceleration device 191 may comprise a plurality of fins spaced about the circumference, wherein each of the fins comprise bristles at the top of the fins. In some embodiments, the acceleration device 191 may aid in capture of each of the starch-based particles 140 within one of the bore holes present on the vacuum wheel 180.

Returning to FIG. 6B, the application phase 170 may include a level control device 192, which may span the width of the hopper 173. The level control device 192 may be positioned to work with the acceleration device 191 and may be configured to distribute the plurality of starch-based particles 140 more evenly to the acceleration device 191. In this regard, without the level control device 192, the starch-based particles may congregate towards a center of the hopper (e.g., mid width), such that the starch-based particles are not evenly distributed on the acceleration device 191, and thus, the vacuum wheel 180. Thus, the level control device 192 distributes the plurality of starch-based particles 140 to the acceleration device 191.

With reference to FIG. 6F, in some embodiments, the level control device 192 may comprise fins 193 disposed about its circumference. In some embodiments, the fins 193 may comprise bristles attached to the ends of the fins for easier engagement of the starch-based particles 140. In some embodiments, the level control device 192 may be configured as a brush. The rotation of level control device 192 may "pick up" a portion of the plurality of starch-based particles 140 within the hopper 173 and cause the plurality of starch-based particles 140 to distribute along the width of the level control device 192 and thereby be more uniformly delivered to the acceleration device 191.

In some embodiments, the level control device 192 may be positioned between 1 in-4 in from the vacuum wheel 180. The distance between the level control device 192 and the vacuum wheel 180 may prevent any of the plurality of starch-based particles 140 engaged with the level control device 192 from engaging with the vacuum wheel 180 prior to being accelerated by the acceleration wheel 180.

Returning to FIG. 6B, in some embodiments, the application phase 170 may further comprise an upper portion 174 comprising a plurality of openings. The upper portion 174 may be an extension of the hopper 173 positioned opposite the inlet 177. In some embodiments, the upper portion 174 may be about the entire perimeter of the hopper. In this regard, the plurality of openings within the upper portion 174 may allow air flow, while preventing the plurality of starch-based particles 140 from escaping. With reference to FIG. 6D, the upper portion 174 may be positioned above the vacuum 180, so as to not impede rotation of the vacuum wheel 180.

In some embodiments, the upper portion 174 may provide a vent for the pneumatic air, built up within the hopper 173. In some embodiments, the upper portion 174 may vent any excess air within the hopper 173, which may prevent entry of the air into the vacuum wheel, and further may prevent excess and/or undesirable movement of the starch-based particles within the hopper. Further, in some embodiments the openings within the upper portion 174 may allow air to be introduced into the hopper 173 to distribute and/or bias the starch-based particles within the hopper 173.

Returning to FIG. 6B, in some embodiments, the application phase 170 may further comprise an air knife 185 positioned above the vacuum wheel 180. The air knife 185 may be positioned outside of the hopper at the point where the plurality of starch-based particles 140 exit the hopper 173 on the vacuum wheel 180. The air knife 185 may direct a stream of air tangentially along the surface 182 of the vacuum wheel 180 to blow back any excess particles. Excess particles may be, for example, particles stacked on top of other particles, or particles on the surface 182 rather than in a counter bore 181 (see e.g., FIG. 6G).

Each of the plurality of particles 140 may exit the hopper 173 engaged with the vacuum wheel 180. With reference to FIG. 6D, the vacuum wheel 180 is configured to hold (e.g., via vacuum suction) one of the plurality of particles 140 within each of the counter bores (see e.g., 181 FIG. 6G) to create the desired pattern on the web. Although FIG. 6D is illustrated as though each of the plurality of starch-based particles 140 abuts one another, except within a fold region 145, it should be understood, that the surface 182 of the vacuum wheel 180 may define the desired pattern, and the plurality of starch-based particles 140 occupy the desired pattern.

FIG. 6G illustrates a spacing pattern of the vacuum wheel 180. The surface 182 of the vacuum wheel 180 may comprise a series of openings 181 formed in the desired spacing pattern. In some embodiments, the openings 181 may define a bore width $B_W$ extending latitudinally along the vacuum wheel 180, and a bore height $B_H$ extending longitudinally along the vacuum wheel 180. In some embodiments, due to the curvature of the vacuum wheel surface 182 the opening 181 spacing may be different than the desired spacing as discussed herein, however the spacing of the openings 181 creates a pattern on the first web wherein each of the starch-based particles is spaced apart from one another, said differently the spacing of the openings 181 prevents overlap between adjacent starch-based particles when positioned on the web. In some embodiments, the bore width $B_W$ may be between about 0.95 in-1.2 in, preferably between 1.0 in-1.1 in, and more preferably about 1.06 in. In some embodiments, the bore height $B_H$ may be between about 0.5 in-1.0 in, preferably between about 0.65 in-0.9 in, and more preferably about 0.74 in.

Each of the openings 181 may be configured to retain one of the plurality of starch-based particles through the rotation from the hopper to application on the first web. In this regard, in some embodiments, the openings 181 may comprise vacuum suction to secure the plurality of starch-based particles within or to the opening 181. In some embodiments, the openings 181 may define a shape configured to, with the assistance of vacuum suction, retain the plurality of starch-based particles within the opening. The openings 181 may be, for example, cylindrical, cupped, stepped, countersink, counter bore or a combination thereof throughout the vacuum wheel surface 182.

In some embodiments, the plurality of openings 181 may be configured to retain each of the starch-based particles on the vacuum wheel surface 182, while in other embodiment the openings 181 may be configured to retain each of the starch-based particles partially below the vacuum wheel surface 182. Still in further embodiments the openings 181 may be configured to retain each of the starch-based particles such that the entire starch-based particle is below the vacuum wheel surface 182. In some embodiments, the depth of the plurality of starch-based particles within the opening 181 may allow the plurality of particles to be brought into contact with the web for improved contact, compression and/or adhesion, while preventing contact between the web and the vacuum wheel surface 182. In this regard, if the web (e.g., the moistened surface of the web) is brought into contact with the vacuum wheel surface 182, the moisture may transfer from the web to the vacuum wheel surface 182, which may cause moisture ingress into the hopper and the plurality of starch-based particles therein. Moisture present in the hopper may cause the plurality of starch-based particles to stick to one another, the acceleration device 191, the level control device 192, the hopper and/or other components within the application phase 170. Thus, the depth of the openings 181 may be configured to encourage direct contact between the starch-based particle and the web, for accurate placement, while preventing contact between the web and the vacuum wheel surface 182.

As discussed, in some embodiments, the openings 181 may be formed as counter bores. In this regard, the openings 181 181 may be recessed within the surface 182 of the vacuum wheel 180. In some embodiments, the opening 181 may define an sloping surface between the vacuum wheel surface 182 and the depth of the openings 181. In this regard, the opening 181 may define an upper radius $B_{DU}$ which extends from the center of the opening 181 to the surface of the vacuum wheel 182, and a lower radius $B_{DL}$ which extends from the center of the opening 181 to the edge of the lower surface. In some embodiments, the opening upper radius $B_{DU}$ may be about 0.34 in and the opening lower radius $B_{DL}$ may be about 0.27 in. As mentioned each of the opening 181 are recessed within the surface 182 of the vacuum wheel. In some embodiments, the recess is about 0.075 in deep, thereby creating about a 25 degree draft from the opening upper radius $B_{DU}$ to the opening lower radius $B_{DL}$.

In some embodiments, the openings 181 comprise a vacuum hole 173 disposed at the center of the opening 181. The vacuum hole 183 may define a vacuum hole diameter of about 0.1 in and may define a 15 degree outward draft to the opening lower radius $B_{DL}$. In this regard, the vacuum drum 180 may be in fluid communication with a vacuum source to provide vacuum suction in each of the vacuum holes 183.

FIG. 6H illustrates the vacuum wheel 180 with multiple patterned sections 104 about the surface 180. Each of the patterned sections 104 is separated by a pattern break 144. In some embodiments, a registration mark 196 may be positioned within the pattern break 144 such that the controller can monitor the rotation of the vacuum wheel 180 in relation to the web and adjust speeds accordingly. As discussed, the patterned sections 104 may include a gap portion 145 and a shift 149 to separate the starch-based particles on the web. In some embodiments, the gap 145 and the shift 149 may further space out the starch-based particles and allow the system to continuously run without issue.

In some embodiments, for example, as illustrated in FIG. 6B, the vacuum wheel 180 may define a width of about 12 in, about 14 in, or about 16 in, thereby corresponding to a padded material with a width of between 12 in-16 in. In some embodiments, the vacuum wheel 180 may define a diameter between 10-12 in. In some embodiments, the larger the diameter of the vacuum wheel 180 the greater number of patterned sections 104 along the surface 182.

Figure 7A:
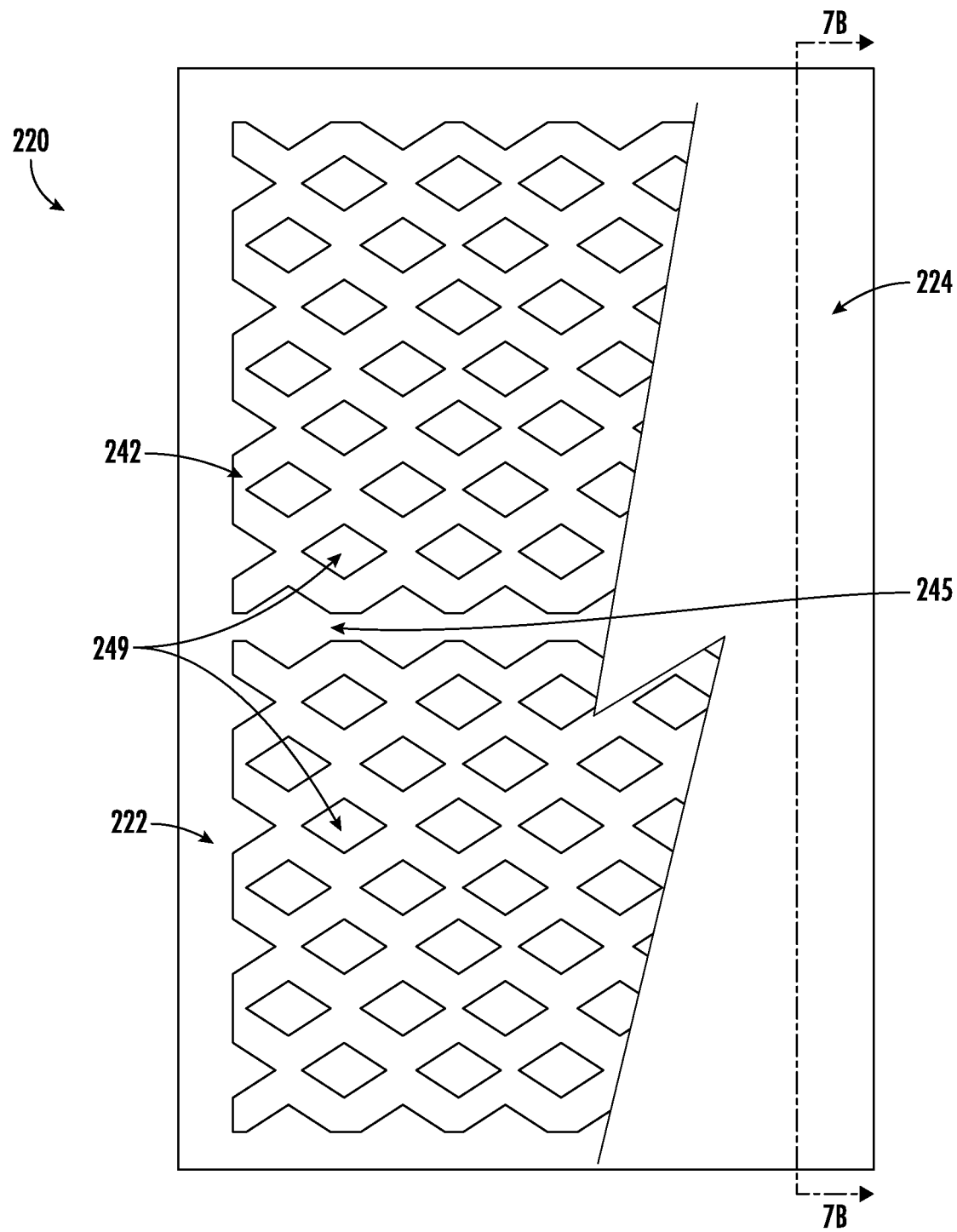
FIG. 7A illustrates a close up view of an example padded material illustrating a starch based sheet used in the padded material, in accordance with some embodiments discussed herein.
Figure 7B:
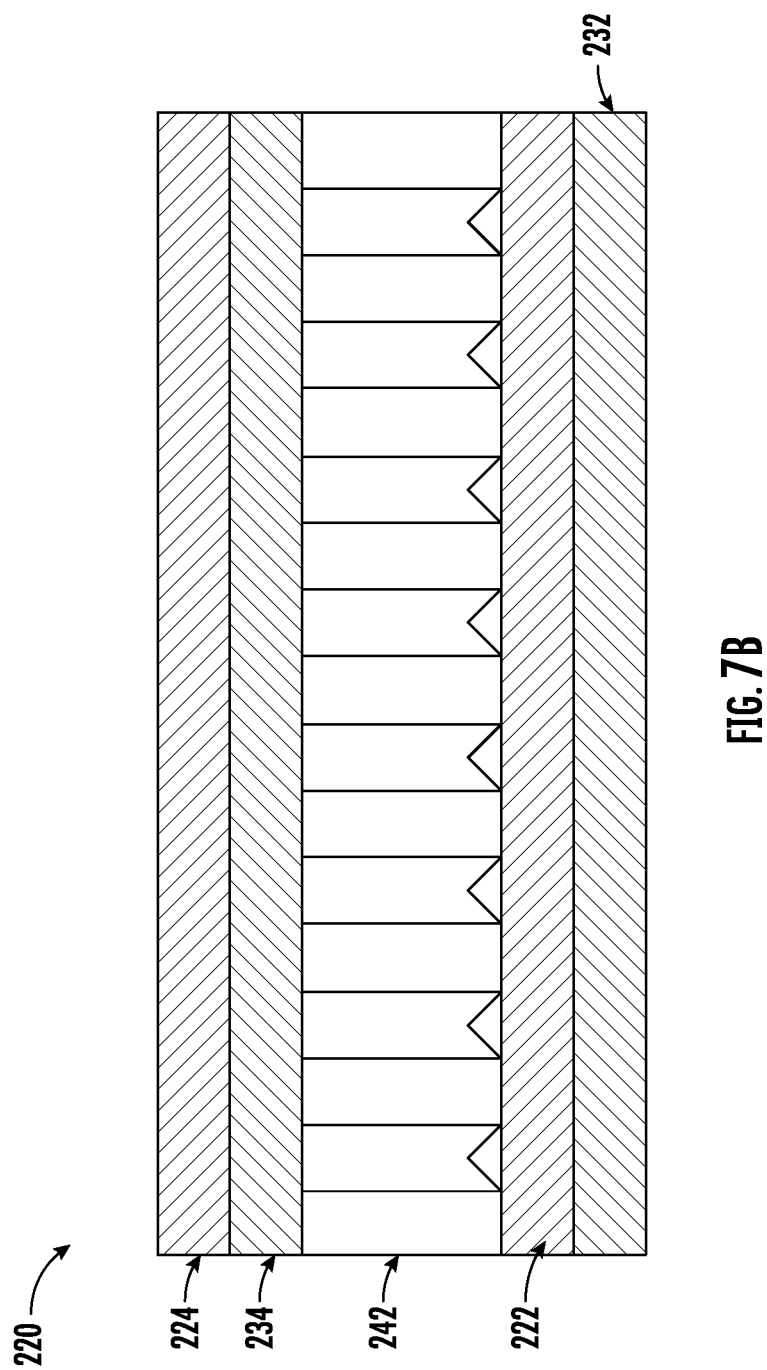
FIG. 7B illustrates a cross sectional view of the example padded material shown in FIG. 7A, in accordance with some embodiments discussed herein.
Figure 8B:
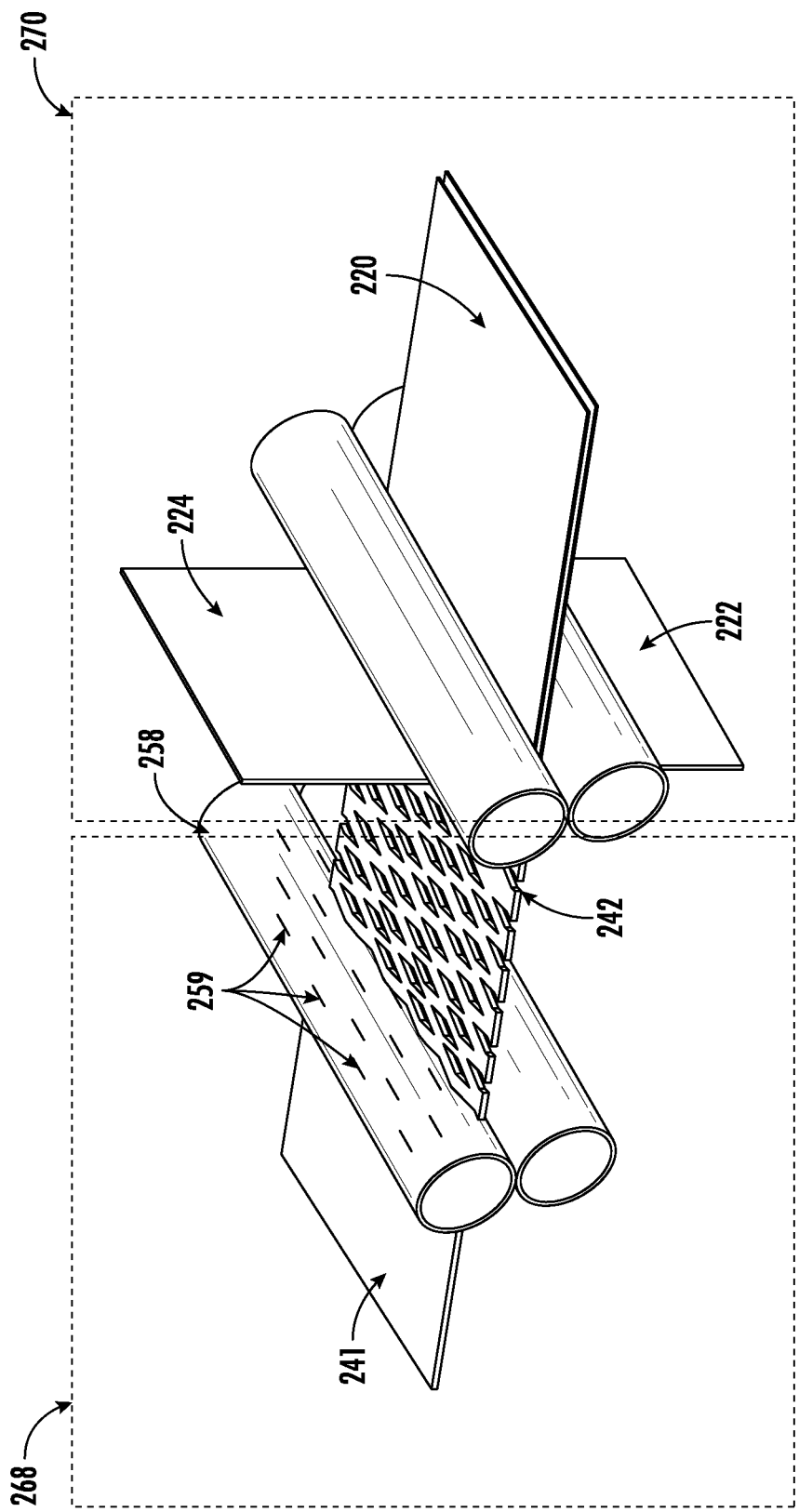
FIG. 8B shows a schematic representation of a portion of the example system illustrated in FIG. 8A, in accordance with some embodiments discussed herein.

As noted herein, the starch-based padding may be formed of many different shapes or configurations. In this regard, FIGS. 7A-8B illustrate embodiments where the starch-based padding is formed of a starch-based sheet (e.g., instead of a plurality of starch-based particles). In this regard, FIGS. 7A-B illustrate a padded material 220 formed with an expanded starch-based sheet 242. FIG. 7A illustrates the padded material 220 with a portion of a second web 224 removed to show the expanded starch-based sheet 242 on a first web 222. In some embodiments, the expanded starch-based sheet 242 may comprise air gaps 249 formed as the expanded starch-based sheet is stretched to achieve the desired padding coverage. With reference to FIG. 8B, as an example, the air gaps 249 may be formed when an extruded starch-based sheet 241 is cut with a die cut 258 comprising knives 259 disposed in a desired pattern. After the extruded starch-based sheet 241 is cut, the sheet may be pulled under tension to expand the starch-based sheet 242 to achieve the desired coverage.

Returning to FIG. 7A, multiple sheets of the expanded starch-based sheet 242 may be positioned on the first web 222 such as to form a fold region. FIG. 7B shows a cross-sectional view of the example padded material 220 taken along line 7B-7B in FIG. 7A. The padded material 220 utilizing the expanded starch-based sheet comprises a similar composition to the padded material 20 utilizing starch-based foam particles 40 (e.g., FIG. 2A). In this regard, a first heat seal coating layer 232 may be applied to an outer surface of the first web 222, and a second heat seal coating layer 234 may be applied to an inner surface of the second web 224 such that the second heat seal coating layer 234 contacts both the second web 224 and the expanded starch-based sheet 242. Additionally, in some embodiments, the padded material 220 may utilize an adhesive (e.g., 36 FIG. 2B) rather than a heat seal material as illustrated.

FIG. 8A illustrates a schematic representation of an example system 200 for forming padded material 220, such as the expanded starch-based sheet 242 described herein. The system 200 may be configured similar to system 100 as discussed with reference to FIG. 5. In this regard, as discussed the system 200 may, such as through controller 290, cause conveyance of one or more paper-based webs, such as along the machine direction (MD) arrow. For example, one or more conveyor means (e.g., a conveyor belt, one or more rollers, etc.) and/or motors may be used to cause a roll 221 of a first web 222 to pass through a print phase 260, a seam adhesive application phase 265, a heat seal coating applicator phase 230, an adhesive/fluid applicator phase 250, and/or a padding applicator phase 270. After that, the conveyor means may cause the first web 222 to combine with the second web 224 (such as from a roll 223 of the second web 224) at a combination point 229 to form the padded material 220.

Notably the print phase 260, the seam adhesive phase 265, the heat seal coating applicator phase 230, and the adhesive/fluid applicator phase 250, may be the same as the corresponding phases in system 100. The supply phase 277, extruder phase 275, serrate/stretch phase 268, and applicator phase 270 may vary from corresponding phases in system 100.

During the supply phase 277, the controller 290 may be configured to cause and/or monitor the supply of materials for the starch-based sheet being provided to the extruder. In the extruder phase 275, the controller 290 may be configured to cause the components from the supply 277 to form the extruded starch-based sheet. In some embodiments, the extruder phase 275 may produce a continuous sheet, which has a width suited for the first web 222 and the second web 224 (or a corresponding width that is desirable—such as when two or more sheets are utilized for the first and second web). In some embodiments, the width of the starch-based sheet may be between about 10 in-30 in. The starch-based sheet 224 may be formed to have a uniform thickness.

During the serrate/stretch phase 268, with reference to FIG. 8B, the starch-based sheet 241 may pass through the die cut 258 comprising knives 259 disposed to form a desired pattern. The cuts formed in the starch-based sheet 241 allow the sheet to be expanded (e.g., stretched) such that the cuts in the foam become air gaps (e.g., 249 FIG. 7A). To expand the starch-based sheet tension may be applied in the machine direction to expand the starch-based sheet to a length which is larger than the initial length. The tension creates air gaps (e.g., 249 FIG. 7A) to open up, while the starch-based sheet remains intact and is continuous along the sheet. For example, in some embodiments, the serrate/stretch phase 268 causes the starch-based sheet 241 that initially had 100% surface coverage of the first web 222 to be expanded so as to reduce the coverage down to a desired amount, for example, about 25%. Returning to FIG. 8A, during the serrate/stretch phase 268, the controller 290 may be configured to cause rotation of the die cut 258, such as to position the cuts in the desired location. Further, the controller 290 may be configured to apply tension to the starch-based sheet 241 to create the desired coverage.

During the padding applicator phase 270, the controller 290 may be configured to cause application, such as from an applicator, of the expanded starch-based sheet 242 onto the first web 222, such as described herein. Notably, a crush device phase may occur in conjunction with the padding applicator phase 270.

During the padding applicator phase 270, as illustrated in FIG. 8B, the controller 290 may be configured to cause crushing of the extruded starch-based sheet 242 on the first web 222, such as described herein. Such crushing may include applying one or more instances of pressure to the expanded starch-based sheet 242 (e.g., either directly to the sheet and/or through one of the first or second web). For example, during application, a roller may act on the extruded starch-based sheet just before, during, or after application of the expanded starch-based sheet to the first web. As another example, after the second web is brought in combination with the first web with the starch-based sheet therebetween, one or more rollers (or other crush devices) may crush the padded material to the desired properties (e.g., thickness, density, etc.). In some embodiments, different stages of crushing may be applied. For example, a first set of two rollers of a first width may act on the starch-based sheet (and/or webs) at a first instance, and then, downstream, a second set of two rollers of a second (shorter) width may act on the starch-based sheet (and/or webs)—thereby creating a tiered crushing approach. In some embodiments, additional crushing stations or variations in widths (such as maintaining a same width or increasing in width) between rollers may be applied to the crushing approach.

During the padding applicator phase 270, the first web 222 (and expanded starch-based sheet 242) and the second web 224 (coming from a second roll 223) may be brought together (e.g., combined) at connection point 229 to form the padded material 220. Thereafter, the padded material 220 may be rolled up into a roll, such as shown in FIG. 1.

Figure 9:
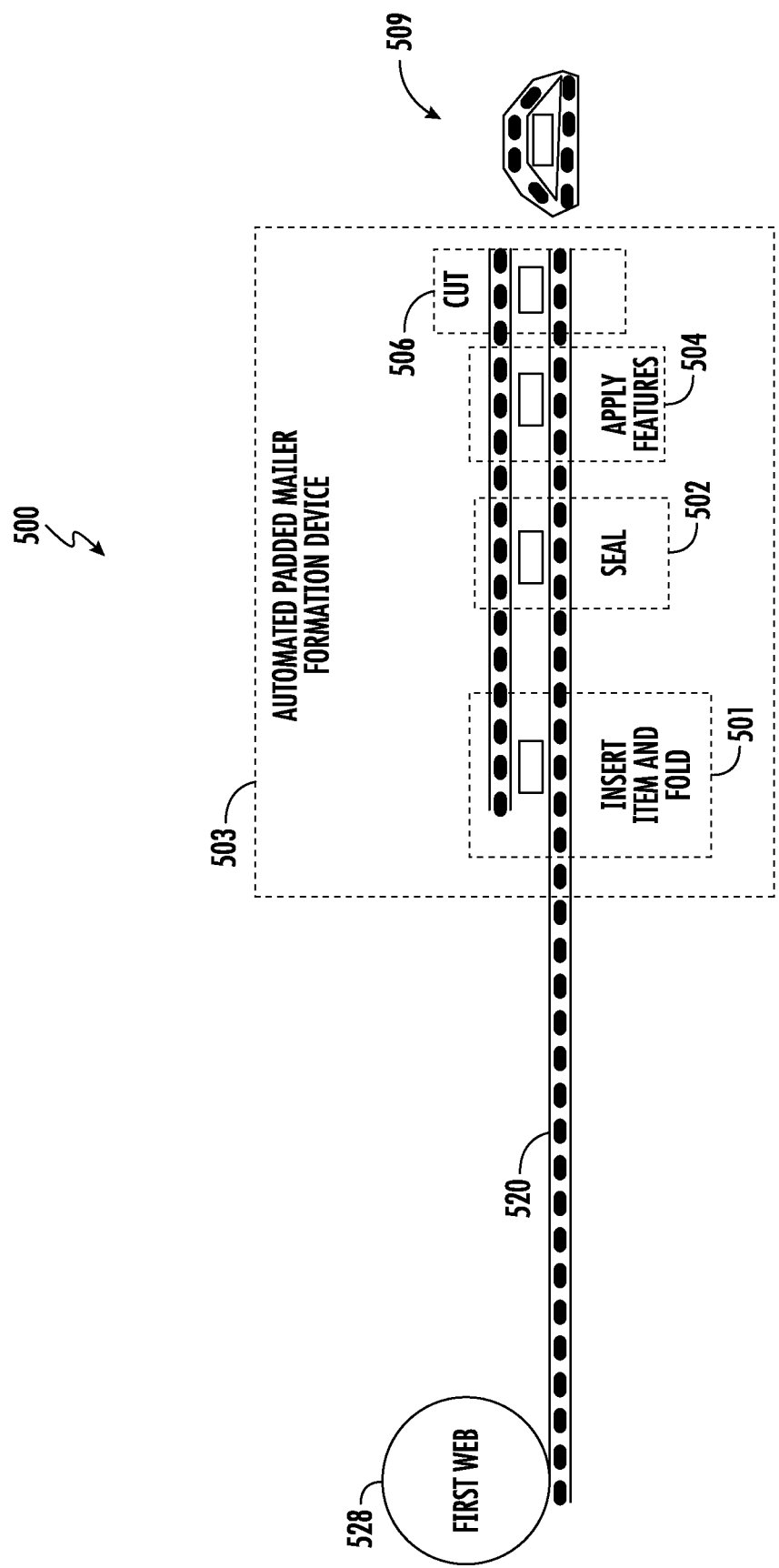
FIG. 9 illustrates a schematic representation of an example system using an automated padded mailer formation device for forming a padded mailer from the padded material, in accordance with some embodiments discussed herein.

FIG. 9 shows a schematic representation of an example system using an automated padded mailer formation device for forming a padded mailer from the padded material. The system 500 causes conveyance of the padded material 520, such as from a first roll 528 (e.g., using one or more conveyor means, such as a conveyor belt, one or more rollers, etc., and/or motors). The padded material 520 is passed into an automated padded mailer formation device 503. The automated padded mailer formation device 503 may perform various steps or phases on the padded material 520 to produce a padded mailer with an item contained therein 509. For example, the automated padded mailer formation device 503 may, during an insert item and/or fold phase 501, cause the padded material 520 be folded around an item. In some cases, the fold may occur anywhere along the width of the padded material. In some cases, the fold may occur along a fold line, such as formed in some example padded material embodiments described herein. Then, during a seal phase 502, the device 503 may cause the two portions of the padded material 520 to be scaled together in the form of a padded mailer. In some embodiments, pressure and/or heat may be applied to one or more of the edges of the padded material 520 to cause the heat seal coating and/or other adhesive on the padded material 520 to adhere together to form the padded mailer. Thereafter, during an apply features phase 504, the device 503 may cause one or more features to be applied to the padded mailer, such as a tear-strip. Finally, the device 503, such as during a cut phase 506, may cause the padded mailer to be cut away from the remainder of the padded material 520—thereby forming the padded mailer with item inside 509.

Notably, in conjunction with various embodiments described herein, various of the phases can be combined, changed in order of operation, separated, or otherwise changed. In such example embodiments, the corresponding phases may be adjusted accordingly.

Some embodiments of the present invention contemplate other ways to create products, such as a padded mailer, from the padded material, as discussed with reference to FIG. 13. For example, a padded mailer with an opening for receiving an item may be formed. Such a padded mailer may then be "hand" packed with the item.

The padded material as discussed herein may be used in automated package machines due to the configuration and position of the heat seal coating layers within the padded material. In this regard, the heat seal coating layers are configured to seal to the starch-based padding, thereby retaining the starch-based padding within the padded material regardless of where the padded material is cut and/or sealed. To explain, FIGS. 10A-11C illustrate views of mailers formed from an automated packaging machine, such as discussed with reference to FIG. 9.

Figure 10A:
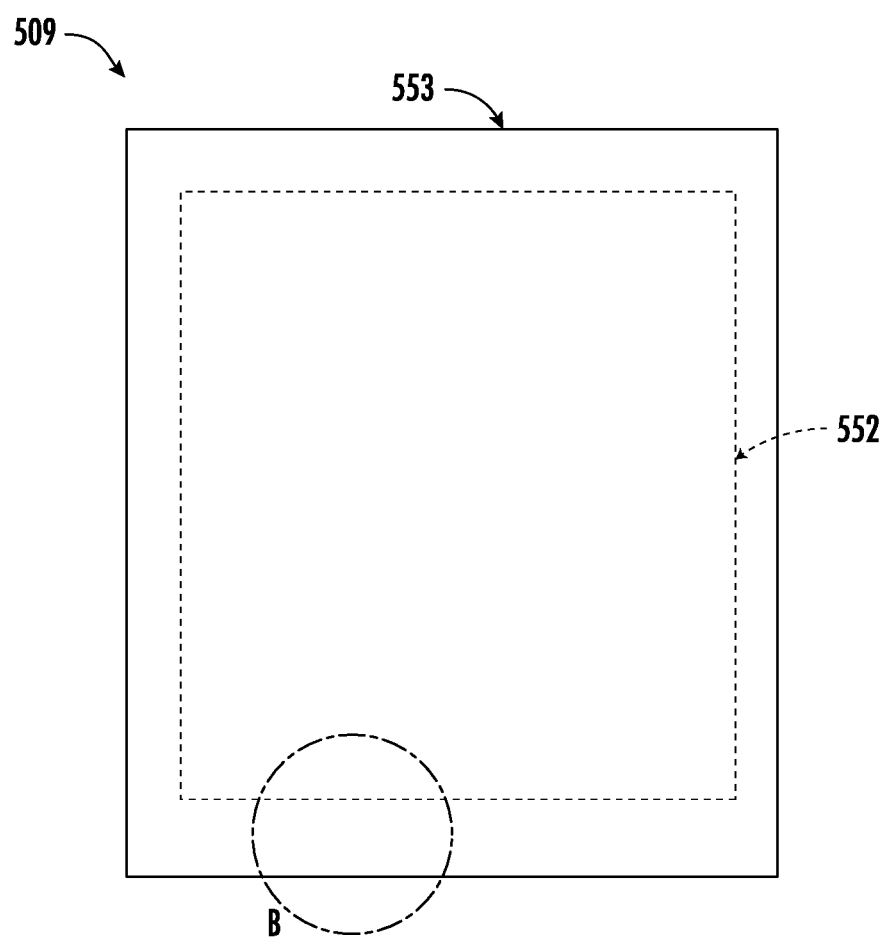
FIG. 10A illustrates a top view of an example padded mailer formed from the example automated padded mailer formation device shown in FIG. 9, in accordance with some embodiments discussed herein.

FIG. 10A illustrates a top view of an example package 509 formed with an automated packaging machine. The package 509 comprises an edge 553 extending about the perimeter of the package, and heat seal coating 552 disposed along the edge 553. Notably, the top edge 553a and bottom edge 553c may have been cut and sealed (e.g., via pressure and heat utilizing the heat seal coating layer described herein). The right side edge 553b is formed due to folding of the padded material around the item (which is positioned in the padded area 559). The left side edge 553d may have been sealed after the padded material was folded around the item.

FIG. 10B illustrates a cross-sectional view of the package 509 taken within circle B. A first padded material 520a is positioned adjacent to a second padded material 520b. In some embodiments, the first padded material 520a and the second padded material 520b may be the same padded material. In the illustrated embodiment, the first padded material 520a comprises a first web 522 and a first layer of heat seal coating 532 applied to a second surface (e.g., 22b FIG. 2) of the first web 522, a second web 524 with a second layer of heat seal coating 534 applied to a second surface (e.g., 24b) of the second web, and a plurality of starch-based particles 540 disposed between the second layer of heat seal coating 534 and the first web 522. The second padded material 520b may include a similar composition to the first padded material 520a, however, the second padded material 520b may be rotated such that the first layer of heat seal coating 532 of each of the first padded material 520a and the second padded material 520b may be in contact.

The first layer of heat seal coating 532 may be heated (and/or pressurized) to form a heat seal 552 between the first padded material 520a and the second padded material 520b. The heat seal 552 may not fully compress the starch-based particles along the bottom edge 553c. In some embodiments, one of the starch-based particles may be cut due to the cut bottom edge 553c forming one or more cut particles 544. The lignin added to the starch-based particles 540 causes the cut particle 544 to have the same approximate color as the first web 522 and the second web 524. Thus, the padded material 520a, 520b, which is visible via the cut bottom edge 553c, may not create a non-uniform appearance.

In some embodiments, the second layer of heat seal coating 534 may seal and further secure the cut particles 544 to the second web 524 and prevent the plurality of starch-based particles from detaching from the padded material 520a, 520b. Additionally the second layer of heat seal coating 534 may in some areas create a heat seal with the first web 522 between particles of the cut particles 544, thereby further encapsulating the plurality of starch-based particles within the padded material 520a, 520b.

Figure 11A:
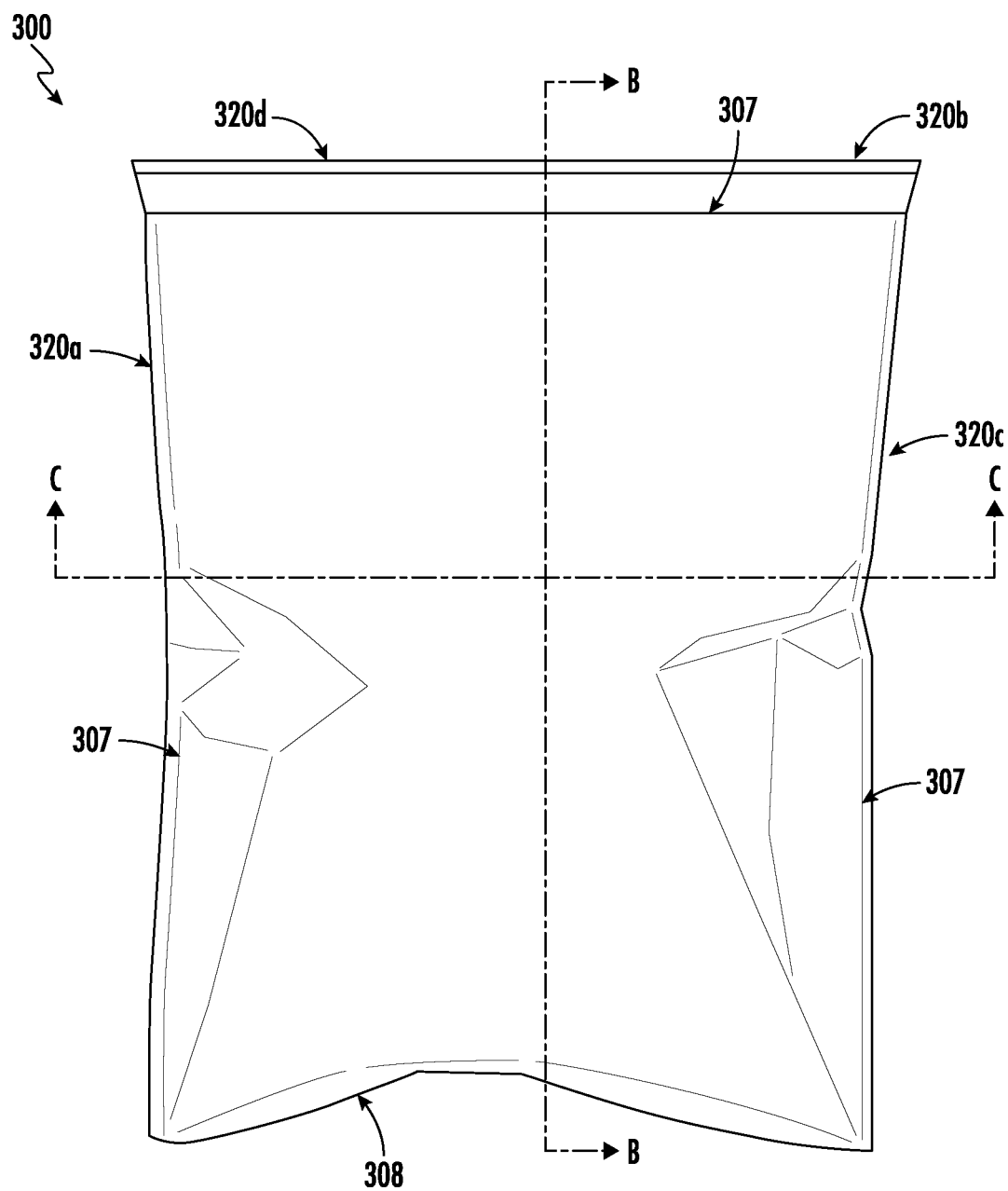
FIG. 11A shows a top view of an example padded mailer, in accordance with some embodiments discussed herein.
Figure 11B:
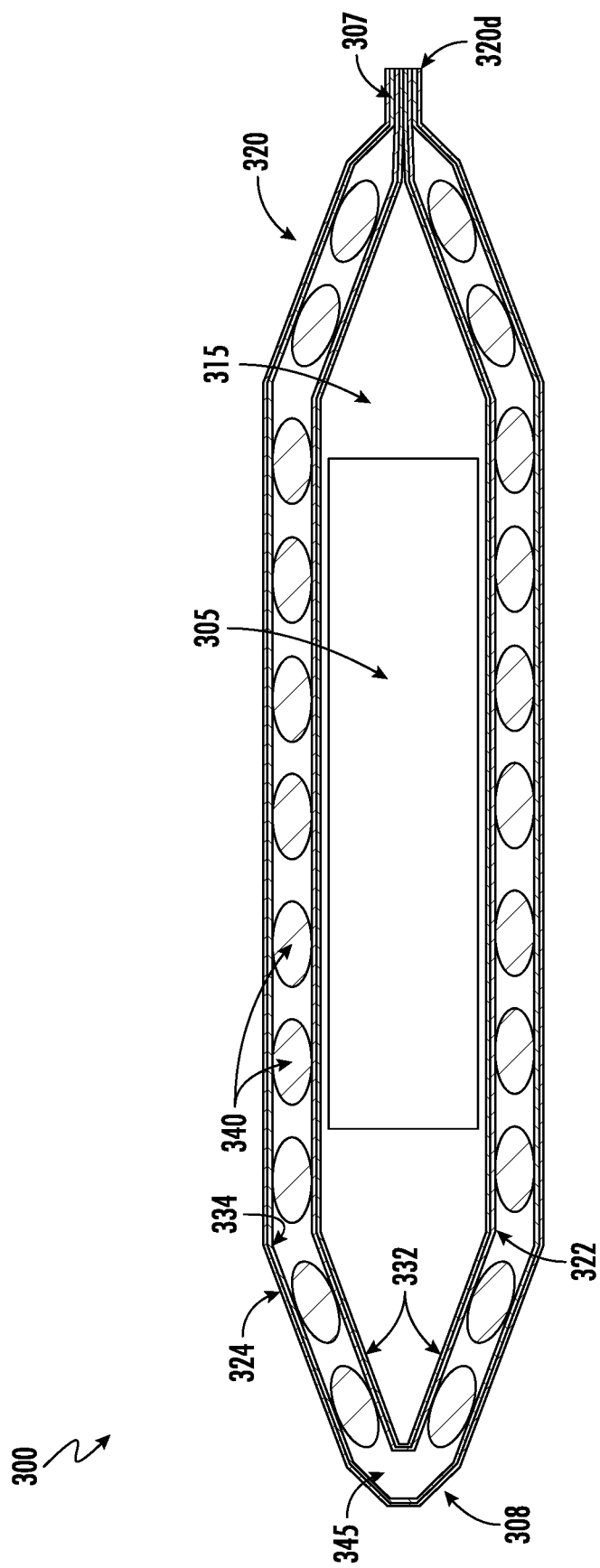
FIG. 11B shows a cross-sectional view of the example padded mailer shown in FIG. 11A taken along line B-B, with an item shown packed therein, in accordance with some embodiments discussed herein.
Figure 11C:
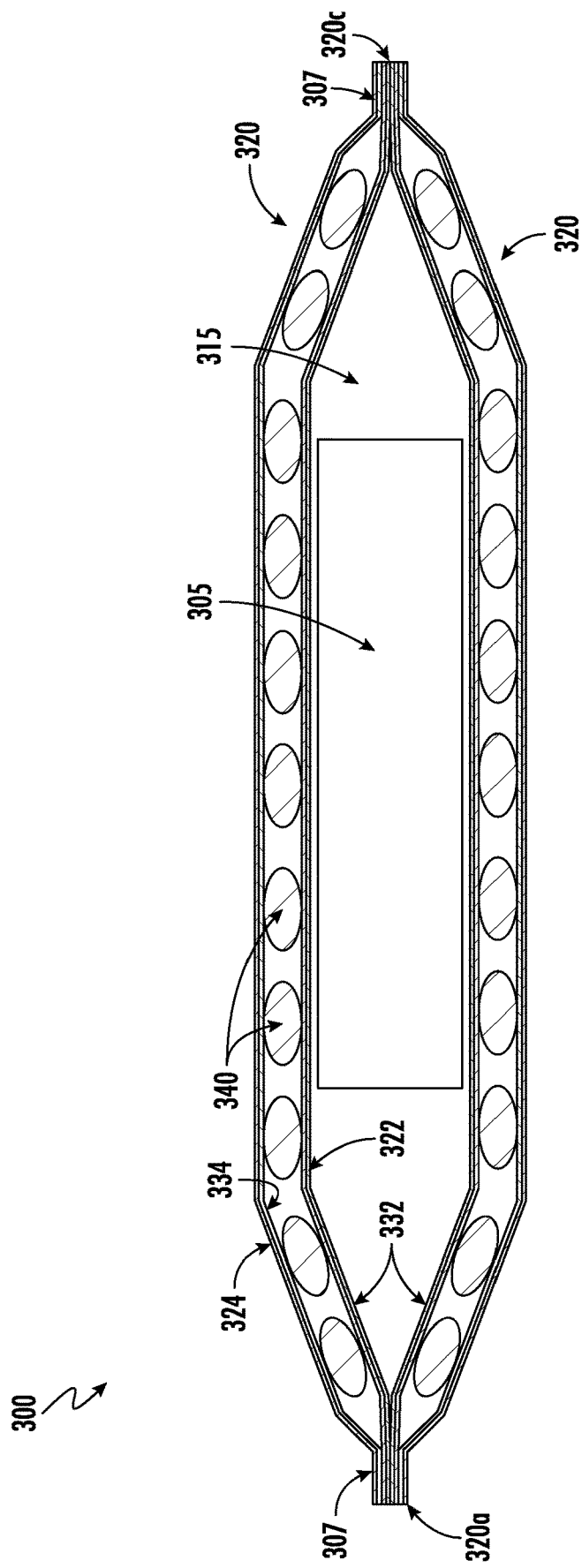
FIG. 11C shows a cross-sectional view of the example padded mailer shown in FIG. 11A taken along line C-C, with an item shown packed therein, in accordance with some embodiments discussed herein.

FIGS. 11A-C illustrate another example package 300 which may be formed from the automated package machine. The package 300 may be formed from one sheet of padded material 320 defining a first edge 320a, a second edge 320b, a third edge 320c, and a fourth edge 320d. In some embodiments, the padded material 320 may be folded (e.g., about the fold region 44 FIG. 3), bringing the second edge 320b and the fourth edge 320d together, and forming a folded edge 308 opposite thereof. A seamed edge 307 may be formed along the edges 320a, 320c, 320b/320d to seal the padded material 320 into a package 300.

FIGS. 11B-C illustrate cross-sectional views of the example package 300 taken along lines B-B and C-C respectively. FIG. 11B illustrates the package 300 formed from a single padded material 320 and folded over a fold region 345 which creates the folded edge 308. In the illustrated embodiment, the padded material 320 is folded over the fold region 345 to form a pocket 315 for receiving an item 305 to be shipped and delivered therein. The second layer of heat seal coating 332 may be facing the pocket 315, however, as the heat seal coating is sufficiently cured prior to formation of the package 300 the heat seal coating material does not transfer to any item 305 placed within the pocket 315.

As noted herein, the padded material may be converted into any number of products, such as padding cut into shapes (e.g., for placement in boxes, storage, etc.) or padded mailers.

Figure 12A:
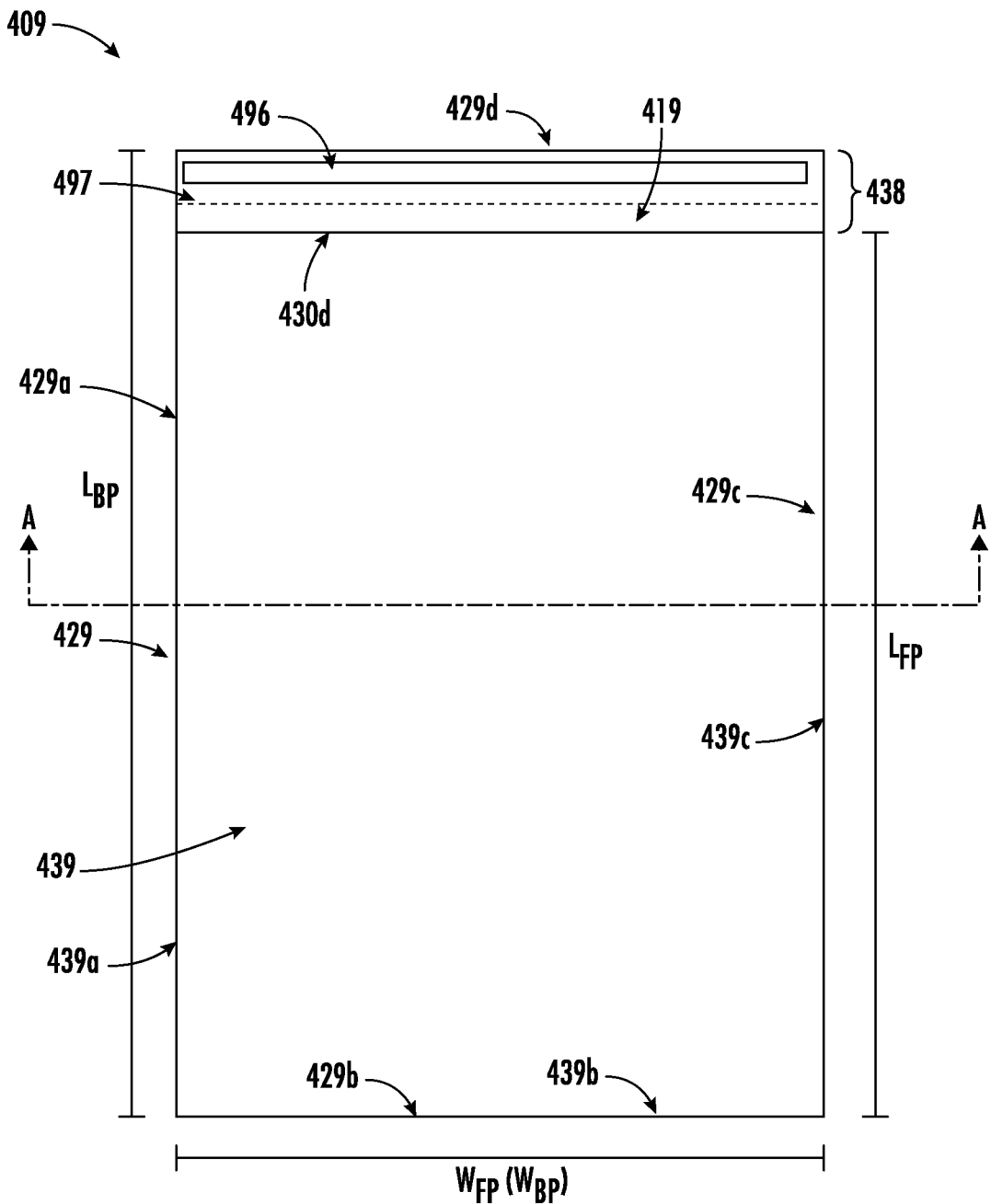
FIG. 12A shows an example padded mailer, in accordance with some embodiments discussed herein.

FIG. 12A illustrates an example padded mailer 409 contemplated by various embodiments of the present invention. The illustrated padded mailer 409, which is shown in the open, ready for packaging configuration, includes a front panel 439 and a back panel 429. The front panel 439 defines a width $W_{FP}$ and a length $L_{FP}$ and includes four edges 439a, 439b, 439c, and 439d. The back panel 429 defines a width $W_{BP}$ and a length $L_{BP}$ and includes four edges 429a, 429b, 429c, and 429d. In the open, ready for packaging configuration, the front panel 439 and the back panel 429 are attached along three edges (429a/439a, 429b/439b, and 429c/439c), such as via seam adhesive being positioned proximate the edges. Notably, in the illustrated embodiment, the fourth edge 439d of the front panel 439 is not attached to the back panel 429 (or only attached near the corners) and, instead, an opening 419 to a pocket 415 (shown in FIG. 12B) is formed—allowing insertion of the item(s) for shipping and delivery.

The dimensions of the padded mailer may vary depending on the desired application. An example padded mailer includes a back panel length $L_{BP}$ of ~20.125 in. and a back panel width $W_{BP}$ of ~14 in.

Notably, the length $L_{BP}$ of the back panel 429 is greater than the length $L_{FP}$ of the front panel 349 such that a portion 449 of the back panel 429 extends above the fourth edge 439d of the front panel 439. The portion 449 of the back panel 429 can, thus, be used in sealing the padded mailer 409, such as to seal an item to be shipped and delivered inside. In this regard, various features for aiding in packaging and opening of the padded mailer can be positioned within the portion 449. For example, FIG. 12A illustrates an example pull-strip 496 for revealing a strip of adhesive that can be used to attach the portion 449 to the front panel 439 once the portion 449 has been folded over to cover the opening 419—thereby transitioning the padded mailer into the sealed configuration. Once the sealed padded mailer has been delivered to its end destination, a tear strip 497 can be pulled to enable access to the internal pocket 415 and, thus, the item stored therein.

Notably, embodiments of the present invention contemplate various features and configurations of a padded mailer that can be utilized. Thus, the illustrated example is not meant to be limiting. For example, in some embodiments, the front panel and the back panel may have similar lengths, the front panel and the back panel may be attached around an item, and/or other configurations are contemplated. In this regard, as described herein, the padded material can be used in conjunction with a padded mailer formation machine to enclose and form around an item. One or more of the above noted features (e.g., pull-strip 496) may be utilized for such a padded mailer that is formed.

Figure 12B:
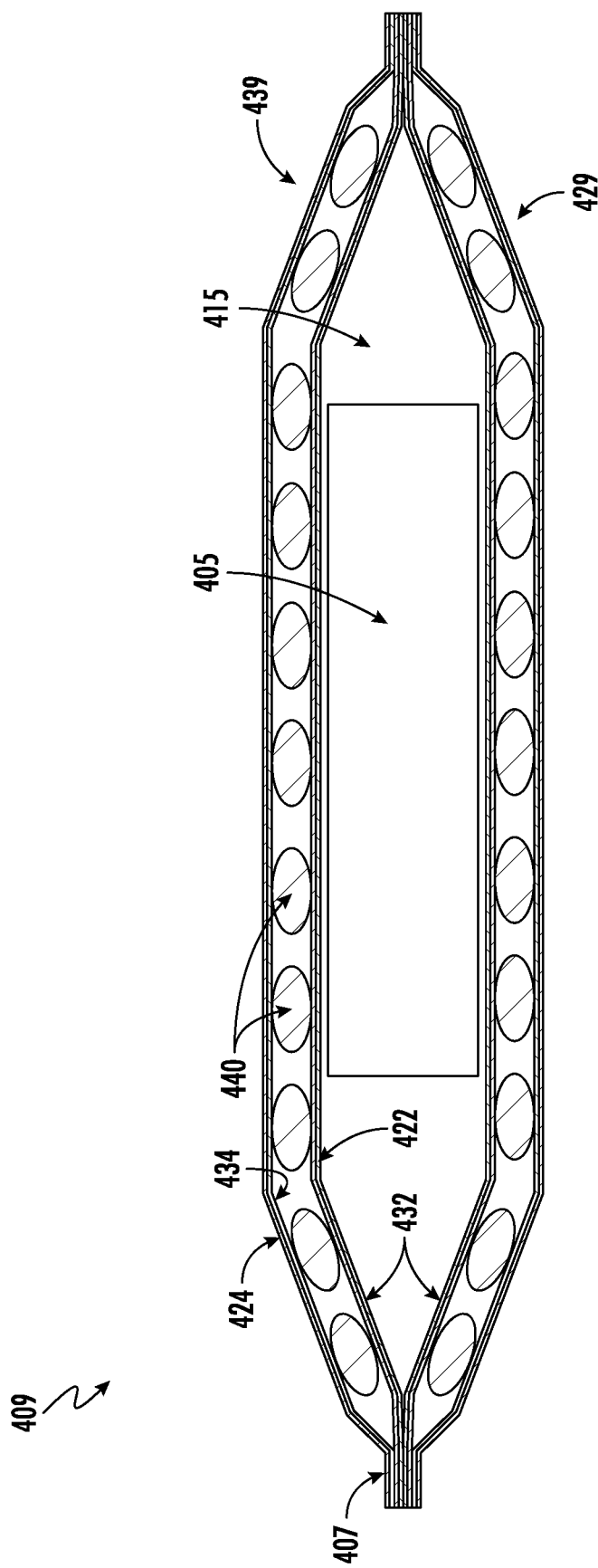
FIG. 12B is a cross-sectional view of the padded mailer shown in FIG. 12A taken along line A-A, with an item shown packed therein, in accordance with some embodiments discussed herein.

With reference to FIG. 12B (which illustrates a cross-sectional view of the padded mailer 409 taken along line A-A in FIG. 12A), in the illustrated embodiment, the panels 429, 439 connect along the edges 407 to form the pocket 415 for receiving the item 405 to be shipped and delivered therein. In this regard, in some embodiments a layer of heat seal coating 434 present on the bottom of the second webs 424 of both the top panel 439 (from a first portion of the padded material 420) and bottom panel 429 (from a second portion of the padded material 420) may be pressure sealed together (e.g., with heat, for example) along the edges 407 to form the pocket 415 for receiving the item 405. Additionally or alternatively, in some embodiments, the two side edges 407 may be adhered together along the length dimension using a recyclable adhesive.

In some embodiments, panels 429, 439 may be formed without the heat seal coatings 432, 434. In this regard, when the padded mailer 409 utilizes a recyclable adhesive, for a scam adhesive, rather than forming a heat seal between the heat seal coatings 432, 434 the heat seal coatings 432, 434 may be redundant and add unnecessary weight to the padded mailer 409. Further, as the plurality of starch-based particles 440 adhere to wetted surfaces, the plurality of starch-based particles 440 may adhere to the first web 422 and the second web 424 without the heat seal coating 432, 434 when the padded panels 429, 439 are being adhered to a pre-formed padded mailer 409.

In some embodiments, a tear-strip or similar feature may be added to the padded mailer for ease of opening. However, in some embodiments, to ensure that the padding (e.g., starch-based particles) does not escape when the tear-strip is removed, the tear-strip may preferably be located along an area of the padded material that does not overlap with starch-based particles (e.g., within the pattern noted herein).

Further, there may be one or more seals on either or both sides of the tear-strip to seal off what will then be an open area (after the tear-strip is removed).

Figure 13:
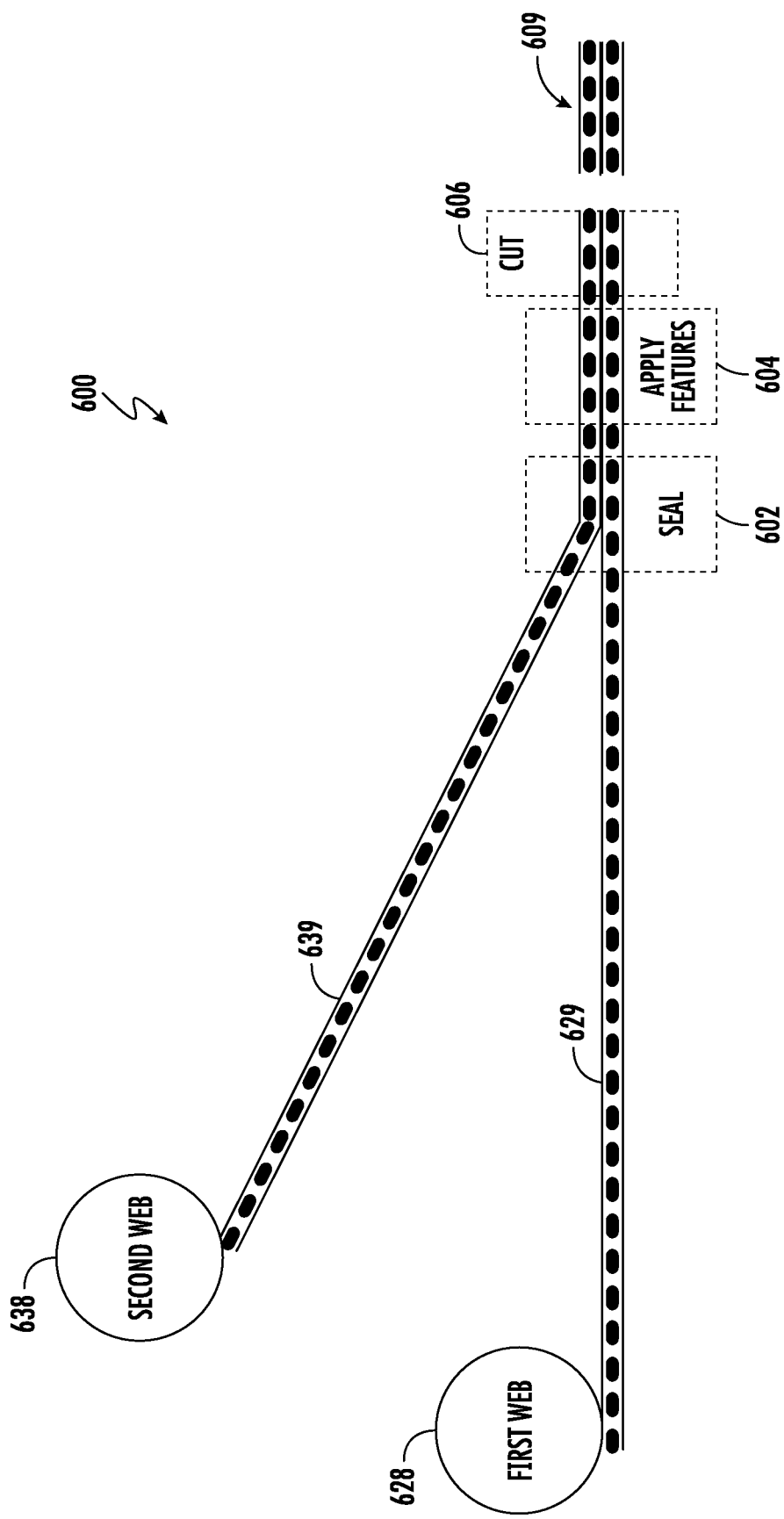
FIG. 13 illustrates a schematic representation of an example system using a hand pack mailer formation device for forming a padded mailer from the padded material, in accordance with some embodiments discussed herein.

FIG. 13 shows a schematic representation of another example system for forming a padded mailer from the padded material. The system 600 causes conveyance of first padded material 629, such as from a first roll 628 (e.g., using one or more conveyor means, such as a conveyor belt, one or more rollers, etc., and/or motors), and conveyance of second padded material 639, such as from a second roll 638 (e.g., using one or more conveyor means, such as a conveyor belt, one or more rollers, etc., and/or motors). The first padded material 629 and the second padded material 639 may be brought together and sealed together, such as during a scal phase 602. In some embodiments, pressure and/or heat may be applied to one or more of the edges of the padded material 629, 639 to cause the heat seal coating and/or other adhesive on the padded material 629, 639 to adhere together to form the padded mailer. Notably, in some embodiments the interior heat seal coating layer may not be applied for padded mailers not formed on an automated mailer formation device (as the interior heat seal coating layer may not be needed).

In some embodiments, a portion of at least one edge of each of the padded material 629, 639 may not be sealed so as to form an opening of the padded mailer. Thereafter, during an apply features phase 604, one or more features may be applied to the padded mailer, such as a tear-strip, adhesive strip, or other feature(s). Finally, during a cut phase 606, the padded mailer to be cut away from the remainder of the padded material 629, 639—thereby forming the padded mailer 609 that is ready to receive the item therein.

Notably, in conjunction with various embodiments described herein, various of the phases can be combined, changed in order of operation, separated, or otherwise changed. In such example embodiments, the corresponding phases may be adjusted accordingly.

Example Flowchart(s)

Embodiments of the present invention provide methods, apparatuses and computer program products for controlling the various components/features according to various systems described herein. Various examples of the operations performed in accordance with embodiments of the present invention will now be provided with reference to FIGS. 14-16.

Figure 14:
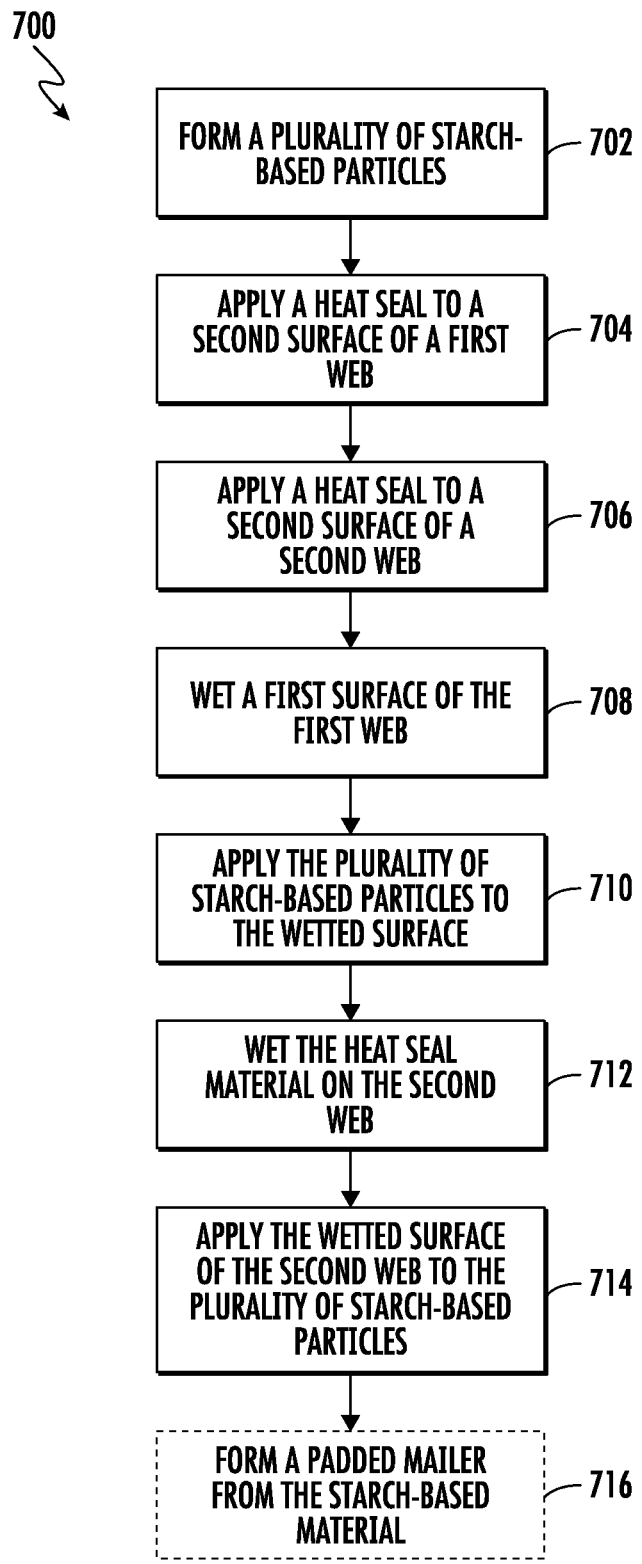
FIG. 14 illustrates a flowchart for forming a padded mailer from a padded material, in accordance with some embodiments discussed herein.

FIG. 14 illustrates a flowchart according to an example method for forming a padded based material for use in forming a padded mailer. The operation illustrated in and described with respect to FIG. 14 may, for example be performed by, with the assistance of, and/or under the control of the controller 190 and other components/features described herein, such as in system 100.

The method 700 may include forming a plurality of starch-based particles at operation 702. At operation 704, the method may comprise applying a heat seal coating to a second surface of a first web. At operation 706, the method may comprise applying a heat seal coating to a second surface of a second web. At operation 708, the method may comprise wetting a first surface of the first web. At operation 710, the method may comprise applying the plurality of starch-based particles to the wetted surface of the first web. At operation 712, the method may comprise wetting the heat seal coating material on the second web. At operation 714, the method may comprise applying the wetted surface of the second web to the plurality of starch-based particles. At operation 716, the method may comprise forming a padded mailer from the starch-based material.

Figure 15:
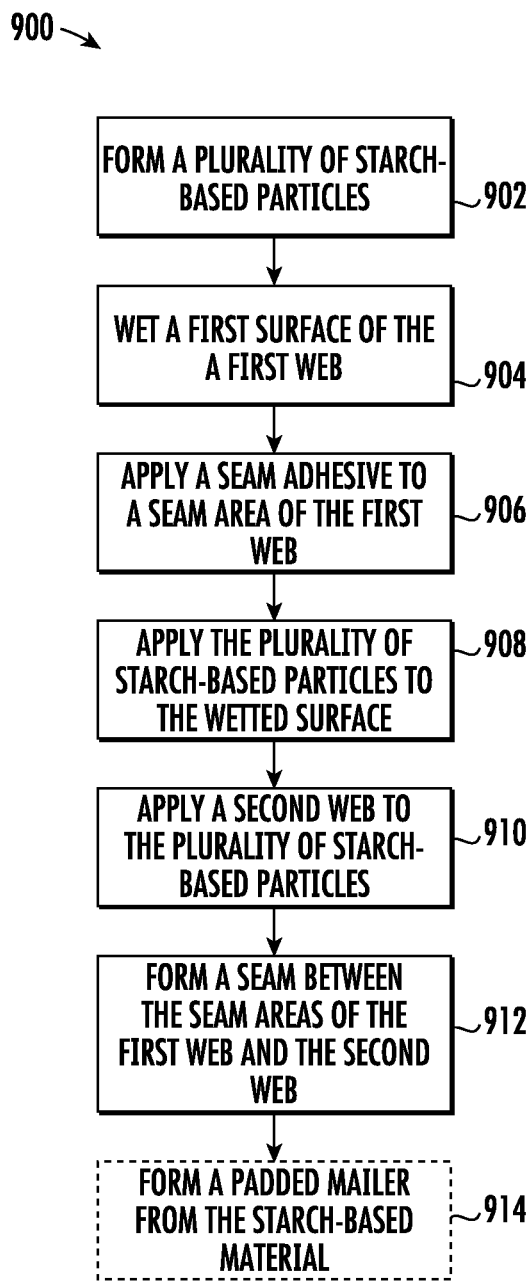
FIG. 15 illustrates a flowchart for forming a padded mailer from a padded material, in accordance with some embodiments discussed herein.

FIG. 15 illustrates a flowchart according to an example method for forming a padded material for use in forming a padded mailer. The operation illustrated in and described with respect to FIG. 15 may, for example be performed by, with the assistance of, and/or under the control of the controller 190 and other components/features described herein, such as in system 100'.

The method 900 may include forming a plurality of starch-based particles at operation 902. At operation 904, the method 900 may comprise wetting a first surface of a first web. In some embodiments, the first surface may be wetted with a first adhesive. In some embodiments, the first adhesive may be water, a water-based adhesive, a solvent-based adhesive or similar. In some embodiments, the first adhesive may provide adhesion between the plurality of the starch-based particles and the first surface of the first web. In some embodiments, the first adhesive may be applied with a spray coating, a roller, or similar method. At operation 906, a seam adhesive is applied to a seam area of the first web. In some embodiments, the seam adhesive may be a second adhesive, which may be the same or different than the first adhesive. In some embodiments, the seam adhesive may be applied in the same method as the first adhesive, while in other embodiments the seam adhesive may be applied in a different method than the first adhesive.

At operation 908, of the method 900, the plurality of starch-based particles are applied to the wetted surface of the first web. In some embodiments, the starch-based particles are applied as discussed with reference FIGS. 5B, and 6A-6H. At operation 910, a second web is applied to the plurality of starch-based particles. In some embodiments, the second web may receive an application of the first adhesive and/or the second adhesive prior to application onto the plurality of starch-based particles. At operation 912, a seam is formed between the seam allowance thicknesses of the first web and the second web. In this regard, the seam may be formed by applying pressure to the seam allowance thickness about the pattern of the starch-based particles. Optionally at operation 914, a padded mailer is formed from the starch-based material. In some embodiments, the mailer may be formed by applying one or more panel portions of the padded material together, such as described with respect to FIG. 13.

Figure 16:
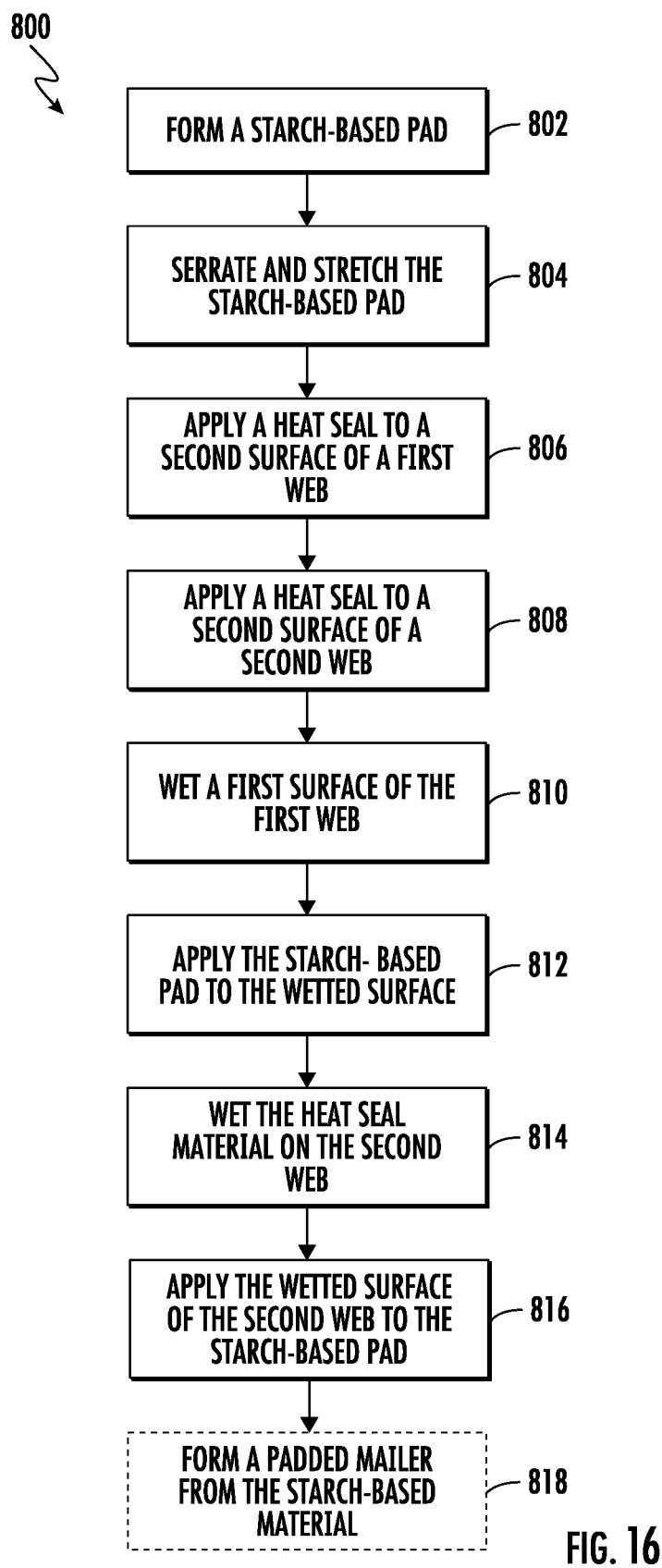
FIG. 16 illustrates a flowchart for forming a padded mailer from a padded material, in accordance with some embodiments discussed herein.

FIG. 16 illustrates a flowchart according to an example method for forming a padded material for use in forming a padded mailer. The operation illustrated in and described with respect to FIG. 16 may, for example be performed by, with the assistance of, and/or under the control of the controller 290 and other components/features described herein, such as in system 200.

The method 800 may include forming a starch-based sheet at operation 802. At operation 804, the method may comprise serrating and stretching the starch-based sheet. At operation 806, the method may comprise applying a heat seal coating to a second surface of a first web. At operation 808 the method may comprise applying a heat seal coating to a second surface of a second web. At operation 810, the method may comprise wetting a first surface of the first web. At operation 812, the method may comprise applying the starch-based sheet to the wetted surface of the first web. At operation 814, the method may comprise wetting the heat seal coating material on the second web. At operation 816, the method may comprise applying the wetted surface of the second web to the starch-based sheet. At operation 818, the method may comprise forming a padded mailer from the starch-based material.

FIGS. 14-16 illustrate flowcharts of various systems, methods, and computer program product according to various example embodiments described herein. Various operations may be performed optionally, and various operations may be performed in any order and/or simultaneously. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 190, 290. As will be appreciated, any suitable such computer program product may be loaded onto a computer or other programmable apparatus, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A padded material for use in forming a padded mailer, the padded material comprising:
   a first web of paper-based material defining a first surface and a second surface opposite the first surface, wherein the first web defines a first plurality of consecutive panel sections formed of a first edge and a second edge opposite the first edge, and a first panel breakline and a second panel breakline opposite the first panel breakline;
   a second web of paper-based material defining a first surface and a second surface opposite the first surface, wherein the second web defines a second plurality of consecutive panel sections formed of a first edge, a second edge opposite the first edge, a first panel break line and a second panel breakline opposite the first panel breakline;

a first adhesive portion positioned at least between the first edge of the first web and the first edge of the second web forming a first seam;

a second adhesive portion positioned at least between the second edge of the first web and the second edge of the second web forming a second seam;

a third adhesive portion positioned at least between the first panel breakline of the first web and the first panel breakline of the second web forming a third seam;

a fourth adhesive portion positioned at least between the second panel breakline of the first web and the second panel breakline of the second web forming a fourth seam, wherein the first adhesive portion, the second adhesive portion, the third adhesive portion, and the fourth adhesive portion comprise a first adhesive;

a starch-based padding sandwiched between the first web and the second web, wherein the starch-based padding is adhered to at least one of the first web or the second web with a second adhesive, wherein the starch-based padding defines a placement density on the first web, wherein the placement density is defined by a ratio of an area covered by the starch-based padding and a total web area, wherein the total web area extends between the first edge, the second edge, and the first panel breakline and the second panel breakline, wherein the placement density is between 15-40%, and wherein the placement density is not uniform across the first web.

2. The padded material of claim 1, wherein the placement density is between 20-25%.

3. The padded material of claim 1, wherein the starch-based padding is positioned away from one or more of the first seam, the second seam, the third seam, and the fourth seam.

4. The padded material of claim 1, wherein the starch-based padding is positioned at least 1 inch away from each of the first edge, the second edge, the first panel breakline and the second panel breakline of the first web.

5. The padded material of claim 1, wherein the placement density defines a first pattern, wherein the first pattern comprises a plurality of rows, wherein the starch-based particles in adjacent rows of the plurality of rows are staggered.

6. The padded material of claim 5, wherein the first pattern is positioned on the first web from a vacuum wheel, wherein the vacuum wheel defines a plurality of openings arranged in the first pattern.

7. The padded material of claim 6, wherein the vacuum wheel comprises more than one patterned section, wherein each of the more than one patterned sections are separated by a pattern break, wherein the pattern break does not comprise openings.

8. The padded material of claim 5, wherein the plurality of rows comprises at least a first row comprising a first particle and a second particle, and a second row comprising a third particle, wherein the first row and second row are spaced apart between the first edge and the second edge, and wherein the third particle is positioned between the first particle and the second particle in the second row.

9. The padded material of claim 5, wherein the first pattern defines a gap centered between the first panel breakline and the second panel breakline, wherein the gap defines a first half and a second half of the starch-based particles.

10. The padded material of claim 9, wherein the gap is at least 0.25 inches in width.

11. The padded material of claim 9, wherein the first pattern comprises a first shift within the first half and a second shift within the second half, wherein each of the first shift and the second shift define a first column and a second column within the respective half.

12. The padded material of claim 11, wherein the first shift and the second shift are smaller than the gap.

13. The padded material of claim 11, wherein the first column and the second column have a different number of starch-based particles.

14. The padded material of claim 1, wherein the second adhesive is one of water, a water-based adhesive, or glue.

15. A mailer comprising:
a first panel defining a top edge, a bottom edge, and two opposing side edges, wherein the first panel is formed from a padded material, the padded material comprising:
a first web of paper-based material defining a first surface and a second surface opposite the first surface, and a first edge, a second edge opposite the first edge, a first panel breakline and a second panel breakline opposite the first panel breakline;
a second web of paper-based material defining a first surface and a second surface opposite the first surface, wherein the second web defines a first edge, a second edge opposite the first edge, a first panel breakline and a second panel breakline opposite the first panel breakline;
a first adhesive portion positioned at least between the first edge of the first web and the first edge of the second web forming a first seam;
a second adhesive portion positioned between the second edge of the first web and the second edge of the second web forming a second seam;
a third adhesive portion positioned at least between the first panel breakline of the first web and the first panel breakline of the second web forming a third seam;
a fourth adhesive portion positioned at least between the second panel breakline of the first web and the second panel breakline of the second web forming a fourth seam,
wherein the first adhesive portion, the second adhesive portion, the third adhesive portion and the fourth adhesive portion comprise a first adhesive;
a starch-based padding sandwiched between the first web and the second web, wherein the starch-based padding is adhered to at least one of the first web or the second web with a second adhesive,
wherein the starch-based padding defines a placement density, wherein the placement density is defined by a ratio of an area covered by the starch-based padding and a total web area, wherein the total web area extends between the first edge and the second edge, and between the first panel breakline and the second panel breakline, wherein the placement density is between 15-40%, and wherein the placement density is not uniform, and
wherein the first panel is folded such that a first juncture is formed between the first side edge and the second side edge, a second juncture is formed between a first portion of the top edge and a second portion of the top edge, and a third juncture is formed between a first portion of the bottom edge and a second portion of the bottom edge, to define a pocket therebetween; and a seam adhesive positioned along at least two of the first juncture, the second juncture and the third juncture.

16. The mailer of claim 15, wherein the placement density is between 20-25%.

17. The mailer of claim 15, wherein the starch-based padding is positioned away from one or more of the first seam, the second seam, the third seam, and the fourth seam.

18. The mailer of claim 15, wherein the starch-based padding is positioned at least 1 inch away from each of the first edge, the second edge, the first panel breakline and the second panel breakline of the first web.

19. The mailer of claim 15, wherein the starch-based padding defines a gap between the first panel breakline and the second panel breakline.

20. A mailer comprising:
a first panel defining a top edge, a bottom edge, and two opposing side edges, wherein the first panel is formed from a padded material, the padded material comprising:
  a first web of paper-based material defining a first surface and a second surface opposite the first surface, and a first edge, a second edge opposite the first edge, a first panel breakline and a second panel breakline opposite the first panel breakline;
  a second web of paper-based material defining a first surface and a second surface opposite the first surface, wherein the second web defines a first edge, a second edge opposite the first edge, a first panel breakline and a second panel breakline opposite the first panel breakline;
  a first adhesive portion positioned at least between the first edge of the first web and the first edge of the second web forming a first seam;
  a second adhesive portion positioned between the second edge of the first web and the second edge of the second web forming a second seam;
  a third adhesive portion positioned at least between the first panel breakline of the first web and the first panel breakline of the second web forming a third seam;
  a fourth adhesive portion positioned at least between the second panel breakline of the first web and the second panel breakline of the second web forming a fourth seam,
  wherein the first adhesive portion, the second adhesive portion, the third adhesive portion and the fourth adhesive portion comprise a first adhesive; and
  a starch-based padding sandwiched between the first web and the second web, wherein the starch-based padding is adhered to at least one of the first web or the second web with a second adhesive,
  wherein the starch-based padding defines a placement density, wherein the placement density is defined by a ratio of an area covered by the starch-based padding and a total web area, wherein the total web area extends between the first edge and the second edge, and between the first panel breakline and the second panel breakline, wherein the placement density is between 15-40%, and wherein the placement density is not uniform, and
a second panel, formed of the padded material, defining a bottom edge, a top edge and two opposing side edges, that is attached to the first panel with an adhesive at the bottom edge, the first side edge and the second side edge to define a pocket therebetween.

* * * * *